(12) United States Patent
Ohtomo et al.

(10) Patent No.: US 6,947,820 B2
(45) Date of Patent: Sep. 20, 2005

(54) CONSTRUCTION MACHINE CONTROL SYSTEM

(75) Inventors: Fumio Ohtomo, Tokyo (JP); Hayashi Kunihiro, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 24 days.

(21) Appl. No.: 10/337,873

(22) Filed: Jan. 8, 2003

(65) Prior Publication Data

US 2003/0137658 A1 Jul. 24, 2003

(30) Foreign Application Priority Data

Jan. 21, 2002 (JP) ........................................ 2002-011538

(51) Int. Cl.$^7$ ............................................... H01J 3/14
(52) U.S. Cl. ..................... 701/50; 356/3.09; 356/491; 356/359; 356/141.4; 250/203 R; 250/234; 172/4.5; 56/10.2
(58) Field of Search .................... 701/50; 250/203 R, 250/353, 234, 206.1, 231.13; 172/4.5, 2, 4, 51; 356/3.09, 3.1, 491, 359, 141.4, 141.5, 72, 400, 147, 152.1, 141.1, 247, 250, 141.3, 615

(56) References Cited

U.S. PATENT DOCUMENTS

| | | | |
|---|---|---|---|
| 4,273,196 A | * | 6/1981 | Etsusaki et al. ............. 172/4.5 |
| 4,679,940 A | * | 7/1987 | Hamar ........................ 356/622 |
| 5,100,229 A | * | 3/1992 | Lundberg et al. .......... 356/3.12 |
| 5,294,970 A | | 3/1994 | Dornbusch et al. ......... 356/152 |
| 5,572,809 A | * | 11/1996 | Steenwyk et al. ............ 701/50 |
| 5,600,436 A | * | 2/1997 | Gudat ...................... 356/141.3 |
| 5,742,387 A | * | 4/1998 | Ammann ..................... 356/247 |
| 5,848,485 A | * | 12/1998 | Anderson et al. ............ 37/348 |
| 6,052,181 A | * | 4/2000 | Maynard et al. ............. 356/147 |
| 6,535,282 B2 | * | 3/2003 | Hedges et al. ............ 356/141.3 |
| 6,630,993 B1 | * | 10/2003 | Hedges et al. ............ 356/141.4 |
| 6,782,644 B2 | * | 8/2004 | Fujishima et al. ............ 37/348 |
| 2002/0154948 A1 | * | 10/2002 | Brabec et al. ................ 404/75 |
| 2002/0170210 A1 | * | 11/2002 | Ogawa et al. ................ 37/348 |

FOREIGN PATENT DOCUMENTS

| | | | | |
|---|---|---|---|---|
| JP | 08122072 A | * | 5/1996 | ........... G01C/15/00 |
| JP | 09282706 A | * | 10/1997 | ........... G11B/7/135 |
| JP | 2000094172 A | * | 4/2000 | ........... B23K/26/04 |
| JP | 2001116510 A | * | 4/2001 | ........... G01B/11/00 |

* cited by examiner

Primary Examiner—Thomas G. Black
Assistant Examiner—Tuan C. To
(74) Attorney, Agent, or Firm—Jacobson Holman PLLC

(57) ABSTRACT

The present invention provides a solution that enables a single rotary laser apparatus to control more than one construction machines so that the construction machines can simultaneously level the terrain up or down to different elevations, respectively. A construction machine control system (100) according to the present invention comprises a rotary laser apparatus (151) that emits at least two fan-shaped laser beams diverted in a plane other than horizontal plane while rotating the laser beams about a given axis, an optical sensor (154) mounted on a construction machine (502) to receive the fan-shaped laser beams, a GPS receiver mounted on the construction machine to determine a position of the construction machine, and an arithmetic operation device mounted on the construction machine, where one of the fan-shaped laser beams is emitted at different elevation or depression angle from that of the other, and the arithmetic operation device receives a detected signal from the GPS receiver to determine the position of the construction machine and also receives a delay between times when the optical sensor receives the fan-shaped laser beams, respectively, to compute and produce a control signal over the construction machine.

9 Claims, 40 Drawing Sheets

FIG.13A
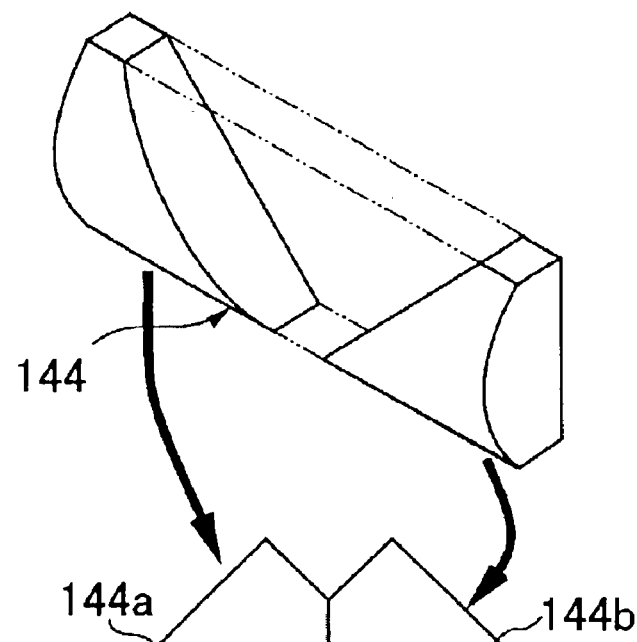
FIG.13B
144a
144b
FIG.13C
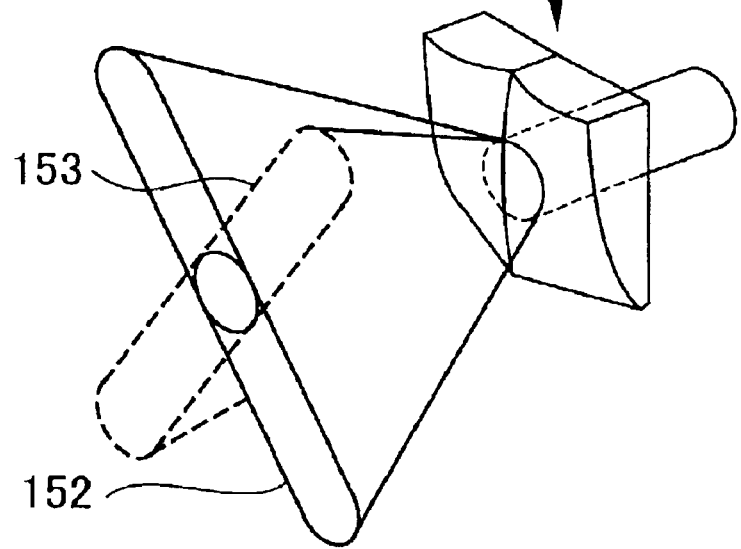
153
152

ROTATIVE DIRECTION OF FAN-SHAPED BEAM

HORIZONTAL REFERENCE PLANE

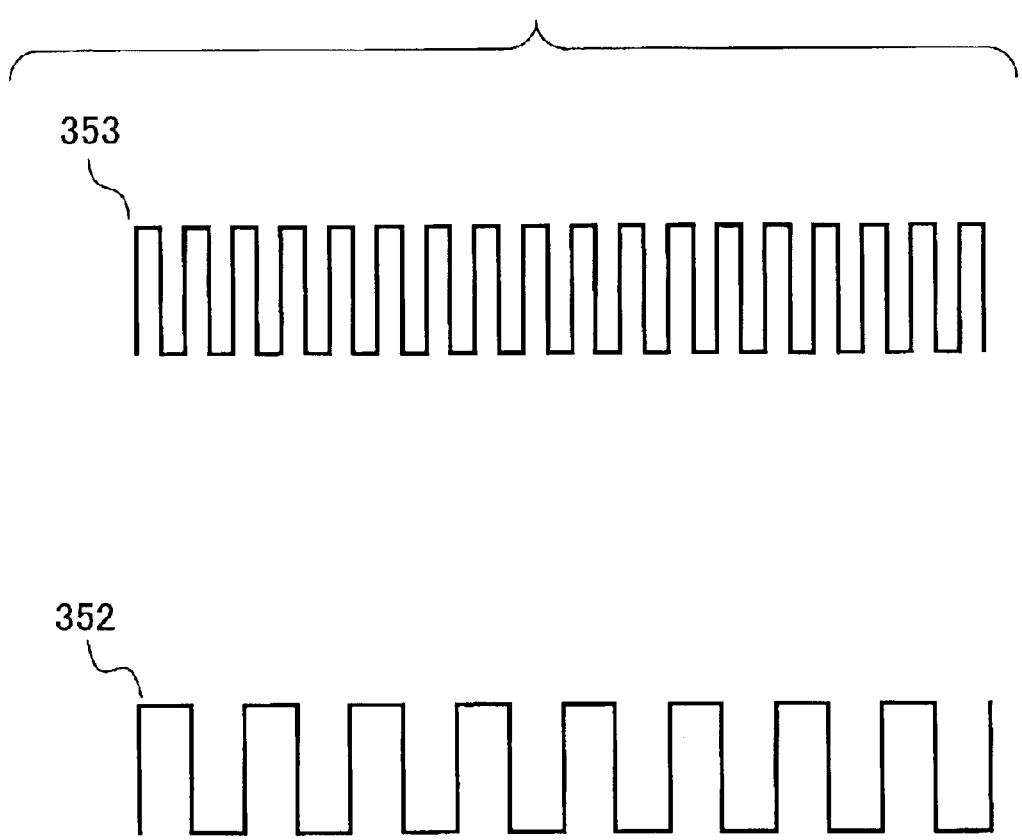

US 6,947,820 B2

CONSTRUCTION MACHINE CONTROL SYSTEM

BACKGROUND OF THE INVENTION

1. Field of the Invention

The present invention relates to a control system for various machines used in construction sites, and more particularly, it relates to a control system for construction machines that are incorporated with an elevation measuring apparatus having a rotary laser apparatus and an optical sensor in combination, and also with a horizontal 2-dimensional position measuring apparatus used in combination with a GPS receiver.

2. Prior Art

In order to use graders and bulldozers to level or shape the ground for preparing residential areas and paving roads, there is a need for a system that is capable of determining positions of such machines in horizontal plane and elevations of lands required to level. For recent years, a construction machine control system has been developed where a GPS system determines a position of a construction machine in horizontal plane while a rotary laser apparatus determines an elevation of the terrain under construction, so as to control the construction machine. In such a system, the rotary laser apparatus predetermines a reference elevation on which the construction machine may be manipulated.

Referring to FIG. 47, the state-of-the-art construction machine system will now be described. In FIG. 47, an application of the system to a bulldozer is depicted. A construction machine control system 900 is comprised of a rotary laser apparatus 951 and a bulldozer 902 having a laser sensor 907 mounted therein. The rotary laser apparatus 951 is topped on a tripod 903 settled in position. The rotary laser apparatus 951 emits laser beam 904 horizontally, having the laser beam 904 circularly sweep to define a reference plane of the laser beam.

The bulldozer 902, which is used to level and shape the ground, has a blade 905 attached thereto and vertically movable. A level sensor 907 is fixed to a pole 906 that is coupled to the blade 905. The level sensor 907 receives the laser beam 904 emitted from the rotary laser apparatus 951 and then detects a current elevation of the level sensor 907. The bulldozer 902 includes a control device (not shown). The control device (not shown) obtains the detected elevation from the level sensor 907 and then computes an altitude of the blade 905 based upon the obtained elevation to adjust the blade 905 up or down to the desired level.

As has been described, the laser beam 904 defines the horizontal reference plane, and hence, controlling a distance between the horizontal reference plane and an edge 905a of the blade 905 to keep it constant, the land can be bulldozed and leveled. Varying the distance between the horizontal reference plane and the blade edge 905a, it is also possible to level the land in terraced terrain.

With reference to FIG. 48, determination of a position of the bulldozer in the horizontal plane will be described. For the purpose of determining the position of the bulldozer 902 in the horizontal plane, a GPS is used. First, a GPS base antenna 908 is placed in a known position. An additional GPS antenna 909 is mounted on the bulldozer 902. The GPS base antenna 908 receives radio waves from a satellite 910 to detect where the GPS base antenna 908 positions itself. Similarly, the GPS antenna 909 receives radio waves from the satellite 910 to detect where the GPS antenna 909 positions itself. Comparing the detection results, a relative position of the GPS base antenna 908 to the GPS antenna 909 is computed. The known position of the GPS base antenna 908 and the computed relative position are used to further compute a position of the bulldozer 902. Based upon the resultant position of the bulldozer 902, the leveling task is performed within the required range.

Typically, more than one construction machines are used to level the identical region unless the construction site is relatively small in dimensions. As is often the case, the construction machines simultaneously level the land up or down to create sections at different elevations. In this situation, the construction machines should individually have their respective rotary laser apparatus operated to sense elevations. Simultaneous activation of more than one rotary laser apparatuses causes a level sensor mounted on one construction machine to identify a wrong laser beam that should have been received by another construction machine, which leads to undesired functions or malfunctions of the construction machines.

In order to control more than one construction machines simultaneously without undesired functions or malfunctions, it is desirable that a single rotary laser apparatus is used to coordinate level settings. With the single rotary laser apparatus to perform the level settings for more than one elevations, however, the rotary laser apparatus must emit varied levels of laser beams toward the receiver construction machines in a single circular sweep. In the prior art rotary laser apparatus, an illuminator rotating at a revolution rate of several hundreds rmp emits laser beam to define a reference plane and a reference line. It is almost impossible to regulate a vertical position of the illuminator and let it emit laser beam in more than one directions at respectively varied elevations during such a high velocity operation. Thus, there is still not the construction machine control system where, simply with the single rotary laser apparatus, more than one construction machines can be under control and respectively level the land at different elevations from one another.

In a real leveling task, the land may originally be leveled, and sometimes, it is required to grade the land which is originally inclined to some extent. Additionally, it is often intended that an artificial inclination is created to drain the land, and in paving a road, also, the original geometry of the land is intentionally exploited into a reasonable slope or shaped into a slope as required for draining the land. In the conventional leveling work, after creating the leveled land by the construction machine control system, a terrain survey is carried out to shape the land with the desired slope.

In leveling the land originally flat, use of the above mentioned construction machine control system enables untrained workers to dedicate themselves to level the land without difficulty, but grading the land or creating the sloped land as desired is still a task only for experts. Evaluation of the finished slope also highly depends upon an expertise level of the worker. Thus, expertise of the worker is a major factor of attaining the finish as desired, and is also a factor of determining how long it takes to complete the task. In this regard, the prior art control system is still disadvantageous in that a management over accuracy in finishing the task and a management over scheduling the task are not easy jobs.

In some case, one construction site is to be leveled to create a terraced terrain of more than two sections at different elevations. For that purpose, there also arises a problem that after the rotary laser apparatus is used to level a section of land, settings of the rotary laser apparatus must be changed to level the remaining section of the land, and this is a complicated and annoying task.

The present invention is made to overcome the aforementioned disadvantages and problems. Accordingly, it is an object of the present invention to provide a solution that enables a single rotary laser apparatus to control more than one construction machines so that the construction machines can simultaneously level the land up or down to sections at different elevations, respectively. It is another object of the present invention to provide solutions that enable any worker to efficiently grade a slope or to shape the land into sloped terrain as desired regardless of an expertise level of the worker and enable more than one construction machines to simultaneously grade slopes at different inclinations, respectively, and to shape the land into different slopes, respectively.

SUMMARY OF THE INVENTION

A solution to the aforementioned problems in the prior art, or namely, an improved construction machine control system according to the present invention comprises a rotary laser apparatus that emits at least two fan-shaped laser beams diverted in a plane other than horizontal plane while rotating the laser beams about predetermined optical axes, an optical sensor mounted on a construction machine to receive the fan-shaped laser beams, a GPS receiver mounted on the construction machine to determine a position of the construction machine, and an arithmetic operation device mounted on the construction machine, where one of the fan-shaped laser beams is emitted at different elevation or depression angle from that of the other, and the arithmetic operation device receives a detected signal from the GPS receiver to determine the position of the construction machine and also receives a delay between times when the optical sensor receives the fan-shaped laser beams, respectively, to compute and produce a control signal over the construction machine.

Configured as mentioned above in accordance with the present invention, the rotary laser apparatus emits the fan-shaped laser beams while rotating the laser beams. The fan-shaped laser beams are received at the optical sensor mounted on the construction machine. The GPS receiver and the arithmetic operation device are also mounted on the construction machine, and the former sends the latter the detected signal from which the latter determines the position of the construction machine. Additionally, the arithmetic operation device receives the delay between times when the fan-shaped laser beams are received at the optical sensor and then compute to produce the control signal over the construction machine.

Besides the detected signals from the optical sensor and the GPS receiver, the arithmetic operation device in the construction machine control system may obtain a signal carrying geometrical data and then compute to produce the control signal over the construction machine.

Configured in this manner according to the present invention, control over the construction machine in conformity with the specific geometrical data can be attained.

Furthermore, a drive controller may power an actuator that is built in the construction machine.

Configured in this manner according to the present invention, the drive controller permits automated actuation of the construction machine.

The rotary laser apparatus may be placed in a known location which is transferred as data to the arithmetic operation device and used for the arithmetic operation to produce the control signal.

The construction machine control system according to the present invention may further comprise a GPS base device used to determine a position of the rotary laser apparatus so that the arithmetic operation device determines a relative position of the construction machine to the rotary laser apparatus.

Preferably, an intersection(s) of the at least two fan-shaped laser beams emitted from the rotary laser apparatus is within the horizontal plane.

It is also preferable that the rotary laser apparatus emits at least two fan-shaped laser beams of different polarizations or at least two fan-shaped laser beams modulated into different frequencies or at least two fan-shaped laser beams of different wavelengths.

The optical sensor in the construction machine control system according to the present invention may have two or more light receiving sections that receives the fan-shaped laser beams.

The fan-shaped laser beams emitted from the rotary laser apparatus may be varied in intensity from one portion to another.

The rotary laser apparatus may emit three or more fan-shaped laser beams of which intersections with the horizontal plane are spaced equidistant from one another.

Preferably, the rotary laser apparatus may emit at least three of the fan-shaped laser beams which would not intersect one other within a range where they are optically received.

BRIEF DESCRIPTION OF THE DRAWINGS

FIGS. 13A, 13B, and 13C show an embodiment of a cylinder lens that generates two fan-shaped beams in the rotary laser apparatus;

FIG. 37 depicts an example of two laser beams of different modulated frequencies;

DETAILED DESCRIPTION OF THE PREFERRED EMBODIMENTS

A construction machine control system according to the present invention will be described in detail in conjunction with the accompanying drawings.

(1) Embodiment 1

(1.1) Entire Structure of Construction Machine Control System

Figure 1:
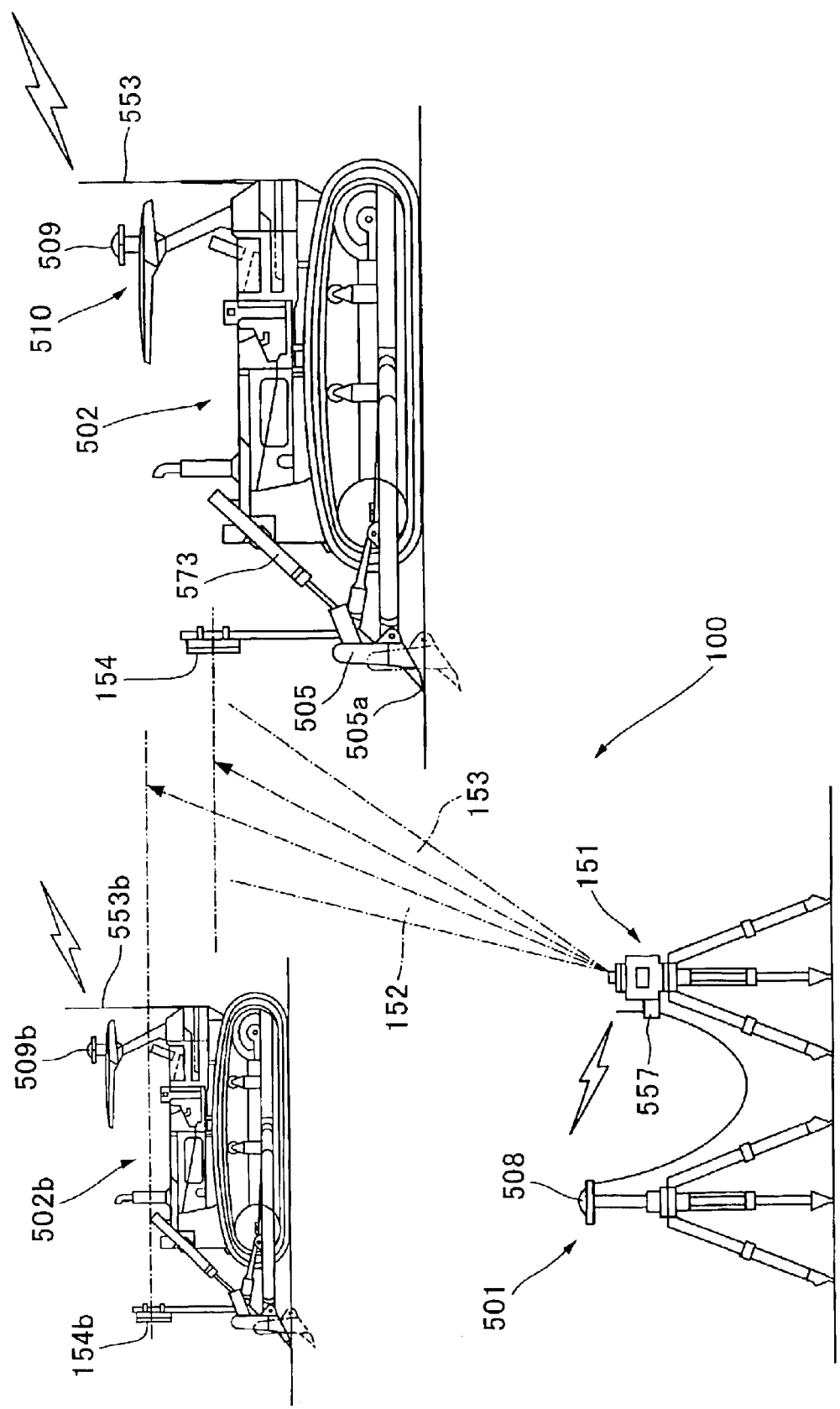
FIG. 1 is a schematic diagram showing a construction machine control system according to the present invention.

An outline of a structure of the construction machine control system of the present invention will first be described. As shown in FIG. 1, a construction machine control system 100 of the present invention has a rotary laser apparatus 151, a GPS base device 501, and an optical sensor 154 mounted on a construction machine such as a bulldozer 502. In the construction machine control system 100, laser beam is used to determine an elevation of the construction machine 502 while a GPS receiver 510 mounted on the construction machine 502 determines its position in horizontal plane. Learning the elevation and position determined on the construction machine, an attachment such as a blade 505 of the construction machine 502 is used to level terrain.

Figure 2:
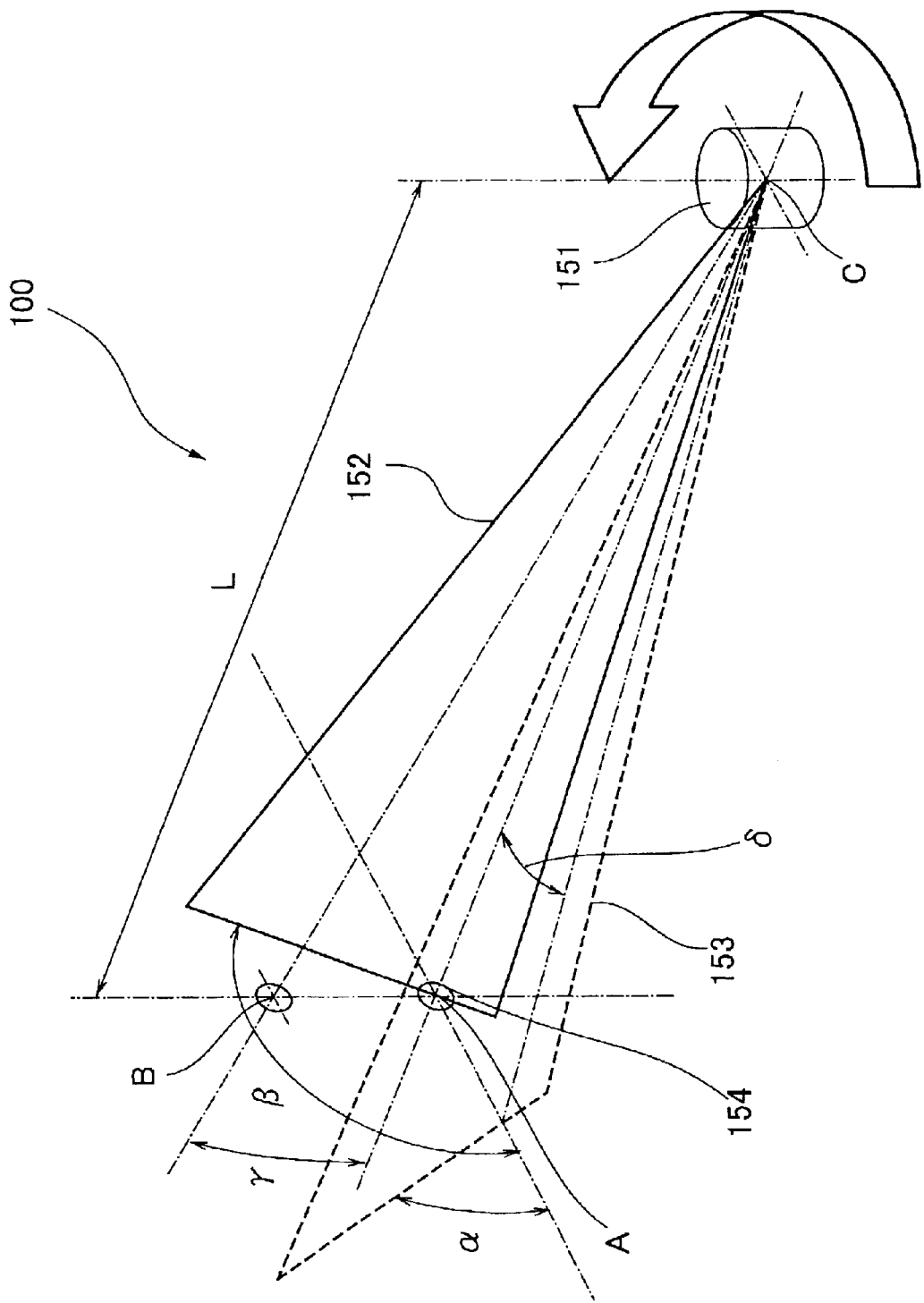
FIG. 2 is a diagram showing a positional relation of a rotary laser apparatus to an optical sensor in the construction machine control system according to the present invention.

As shown in FIG. 2, the rotary laser apparatus 151 emits two fan-shaped beams 152 and 153 while rotating the beams about a point C.

Figure 3:
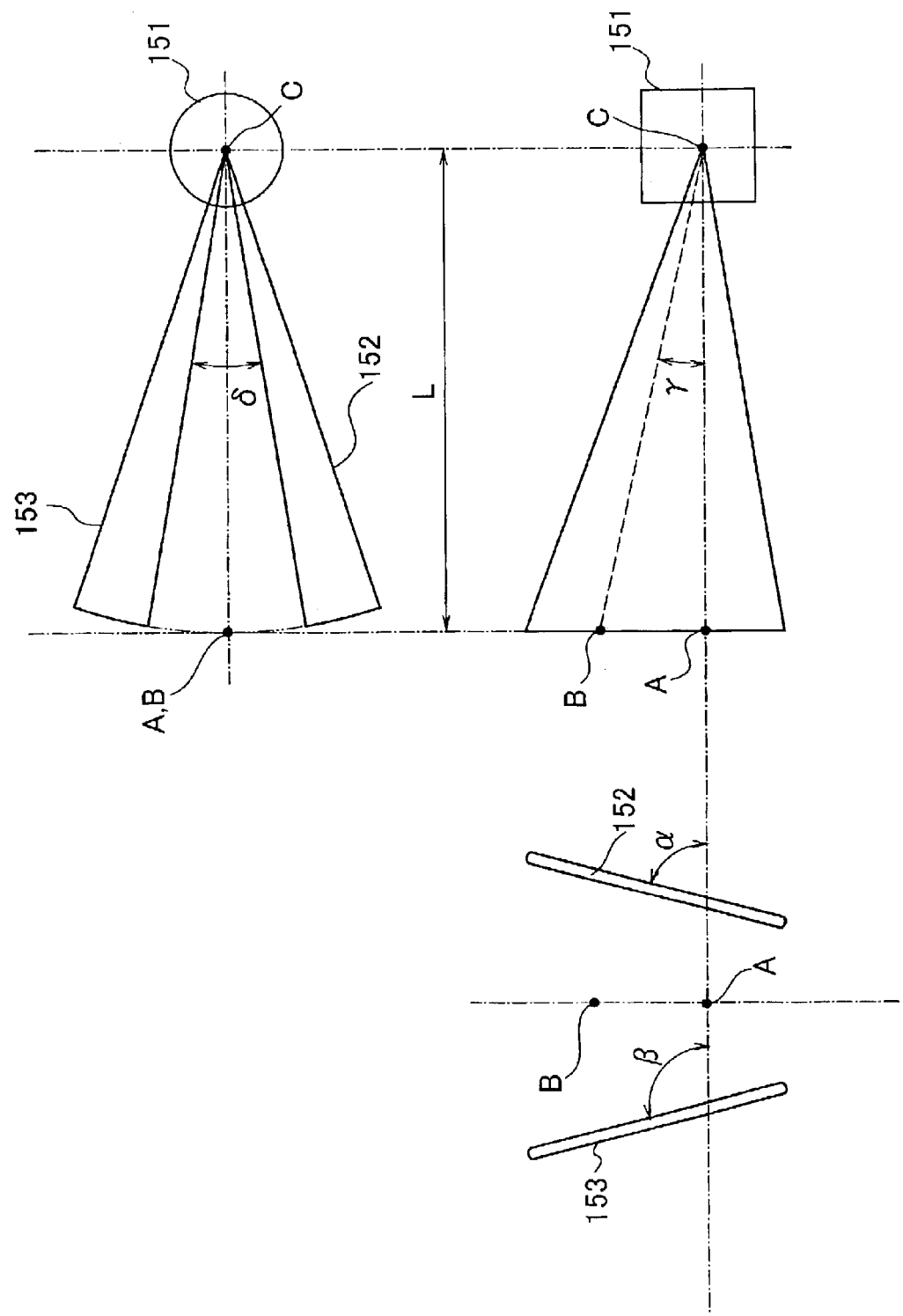
FIG. 3 is a three-fold exploded view illustrating divergence of fan-shaped beam emitted from the rotary laser apparatus.

As shown in FIG. 3, the fan-shaped beam 152 is emitted at an angle α from the horizontal plane while the fan-shaped beam 153 is emitted at an angle β from the horizontal plane. An intersection of the fan-shaped beam 152 with the horizontal plane and an intersection of the fan-shaped beam 153 with the same meet at an angle δ. The two fan-shaped beams 152 and 153, keeping inclined, revolve respectively, and then respectively sweep the optical sensor 154 at a certain delay of time. The construction machine control system of the present invention is designed to use the delay to determine an altitude of the optical sensor 154 from the horizontal plane.

(1.2) Rotary laser Apparatus (1.2.1) Rotary Laser Apparatus Emitting Two Fan-Shaped Laser Beams Discussed now will be the rotary laser apparatus that emits two fan-shaped laser beams inclined at angle to the horizontal plane while rotating the laser beams about a vertical axis.

Figure 4:
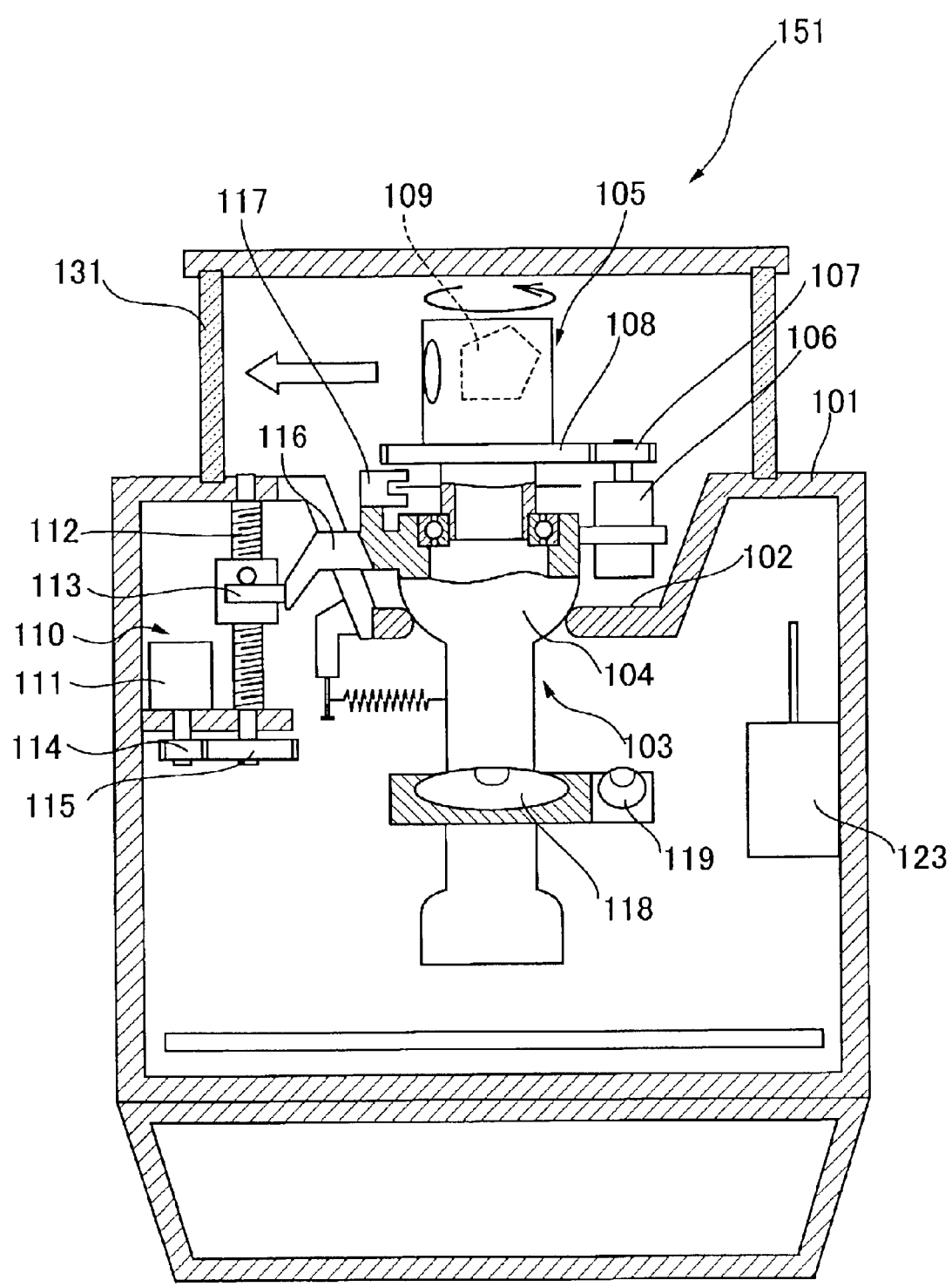
FIG. 4 is a sectional view showing the rotary laser apparatus.

As shown in FIG. 4, the rotary laser apparatus 151 according to the present invention includes a casing 101 and a laser light projector 103. A concavity 102 defined in a shape of truncated cone is provided in the center of a top of a casing 101. The laser light projector 103 extends vertically through the center of the concavity 102. The laser light projector 103 is provided with a spherical mount 104 seated and hung on the concavity 102 so that the projector 103 can tilt itself. The laser light projector 103 includes a rotary unit 105 capable of revolving and having a pentaprism 109. The rotary unit 105 is revolved through a drive gear 107 and a sweep gear 108 actuated by a motor 106

The rotary laser apparatus 151 has two sets of inclination mechanisms placed around the laser light projector 103 (one of the sets alone is shown). One of the sets of the inclination mechanisms 110 has a motor 111, a screw 112, and a nut 113 used all together for inclining feature. The motor 111 is capable of turning the screw 112 through a drive gear 114 and a tilting gear 115. Turns of the screw 112 cause the nut 113 to move up and down. Such vertical movement of the nut 113 brings about inclination of the laser light projector 103. The other of the sets of the inclination mechanisms uses similar mechanical components to incline the projector 103 in a direction orthogonal to that in which the inclination mechanism 110 tilts.

A fixed sensor 118 positioned in parallel with the arm 116, and a fixed sensor 119 positioned perpendicular to the arm 116 is located in the middle of the laser light projector 103. The arm 116 has its inclination adjusted by the inclination mechanism 10 so that the fixed sensor 118 can always assume horizontal posture. Simultaneously, the other set of the inclination mechanism is used for adjustment to permit the fixed sensor 119 to always assume its horizontal posture.

Figure 5:
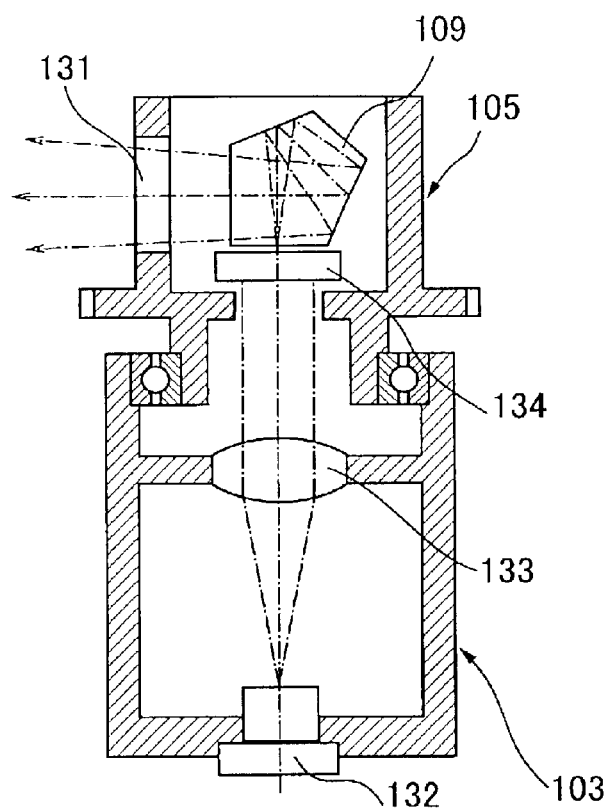
FIG. 5 depicts another embodiment of the rotary laser apparatus.

The laser light projector 103 and the rotary unit 105 attached thereto will now be detailed. As shown in FIG. 5, the laser light projector 103 has projector optics that includes components such as a laser illuminator 132 and a collimator lens 133 collimating incident laser beam from the laser illuminator 132. Laser beam from the projector optics is spread into two diverging or fan-shaped beams 152 and 153 by a diffraction grating (BOE) 134 of the rotary unit 105. The fan-shaped beams 152 and 153 are deflected horizontally by the pentaprism 109 and then illumined out of a projector window 131.

Figure 6:
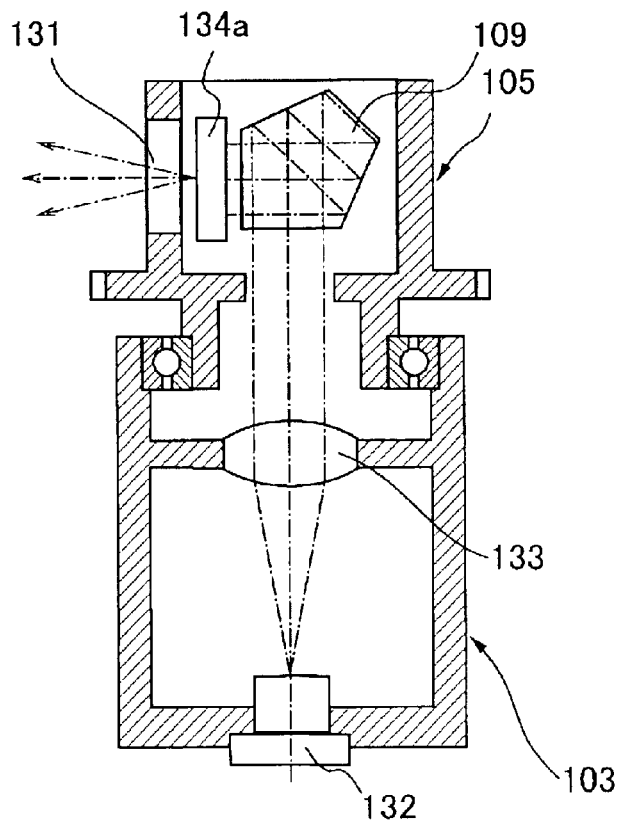
FIG. 6 depicts still another embodiment of the rotary laser apparatus.

As shown in FIG. 6, a diffraction grating (BOE) 134a may be located across an optical path where the laser beam is transmitted after deflected by the pentaprism 109. The laser light projector in FIG. 6 is configured almost the same as that in FIG. 5 except for the location of the diffraction grating 134a.

Figure 7:
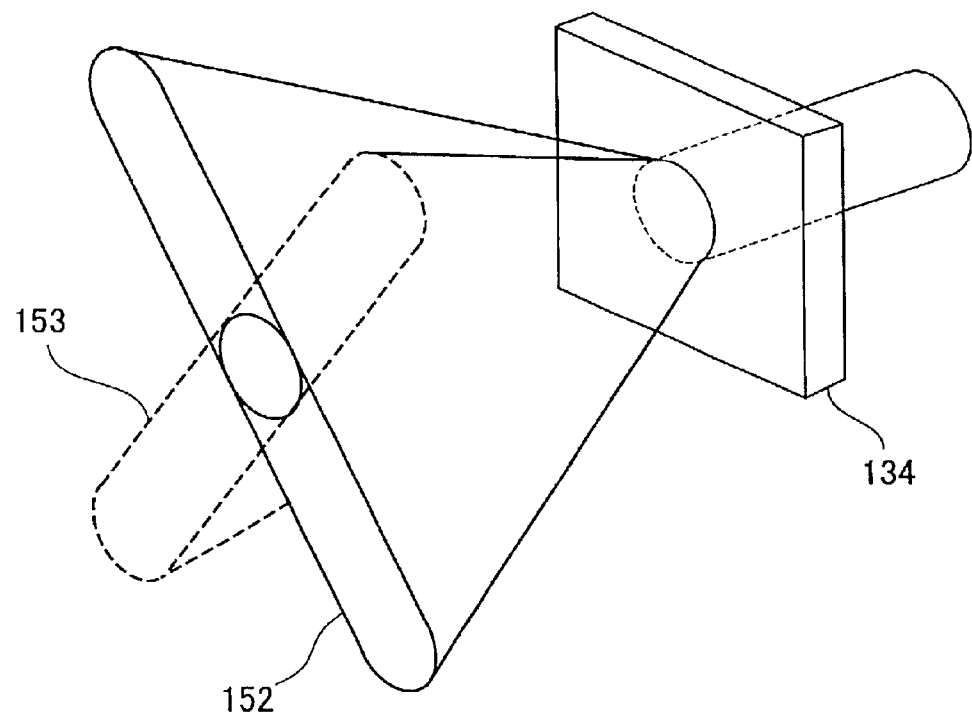
FIG. 7 illustrates a diffraction grating transmits and spreads laser beam into diverging fan-shaped beam in the rotary laser apparatus.

FIG. 7 depicts the laser beam being spread into the two fan-shaped beams 152 and 153 after transmitted through the diffraction grating (BOE).

As has been described, the laser projector 103 emits laser beam that is originally illumined by the laser illuminator 132 and then spread into the two fan-shaped beams 152 and 153 by the diffraction grating (BOE) 134. The laser beams, after deflected horizontally by the pentaprism 109, circularly sweep as the rotary unit 105 rotates, so as to define a reference plane.

(1.2.2) Rotary Laser Apparatus Emitting Two Diverging Laser Beams of Varied Polarizations from One Another Described below will be the rotary laser apparatus that emits two fan-shaped laser beams of different polarizations.

Figure 8:
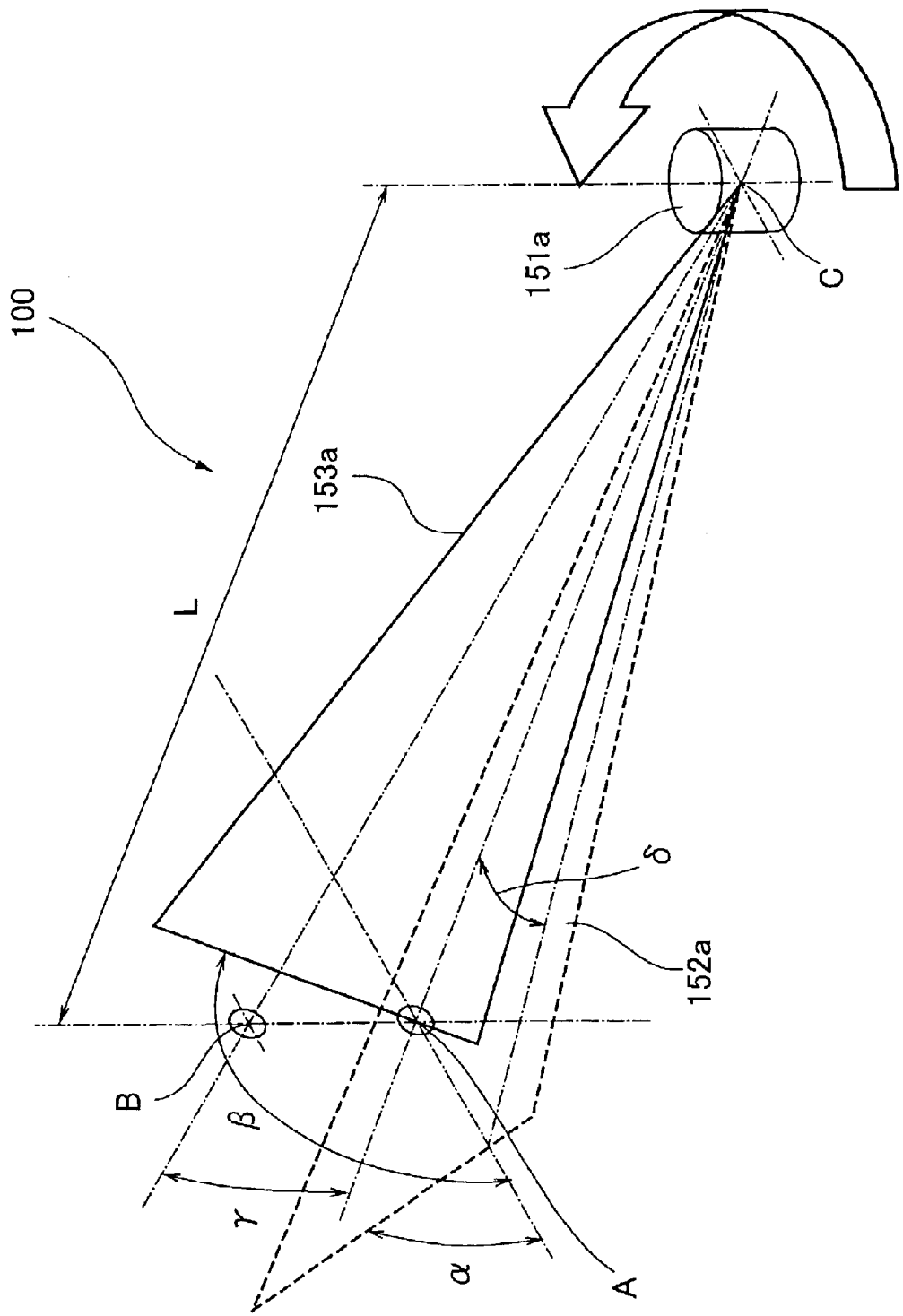
FIG. 8 is a schematic perspective view showing the construction machine control system according to the present invention where two fan-shaped beams of different polarizations are emitted.

As detailed later, to obtain measurements with high accuracy, it is advantageous to use the rotary laser apparatus that emits two fan-shaped laser beams of different polarizations. As can be seen in FIG. 8, a rotary laser apparatus 151a emits two diverging or fan-shaped laser beams 152a and 153a. Since the two beams 152a and 153a are polarized different from each other, the light receiving section of an optical sensor 154a can distinguish the two fan-shaped beams 152a and 153a one from the other.

Figure 9:
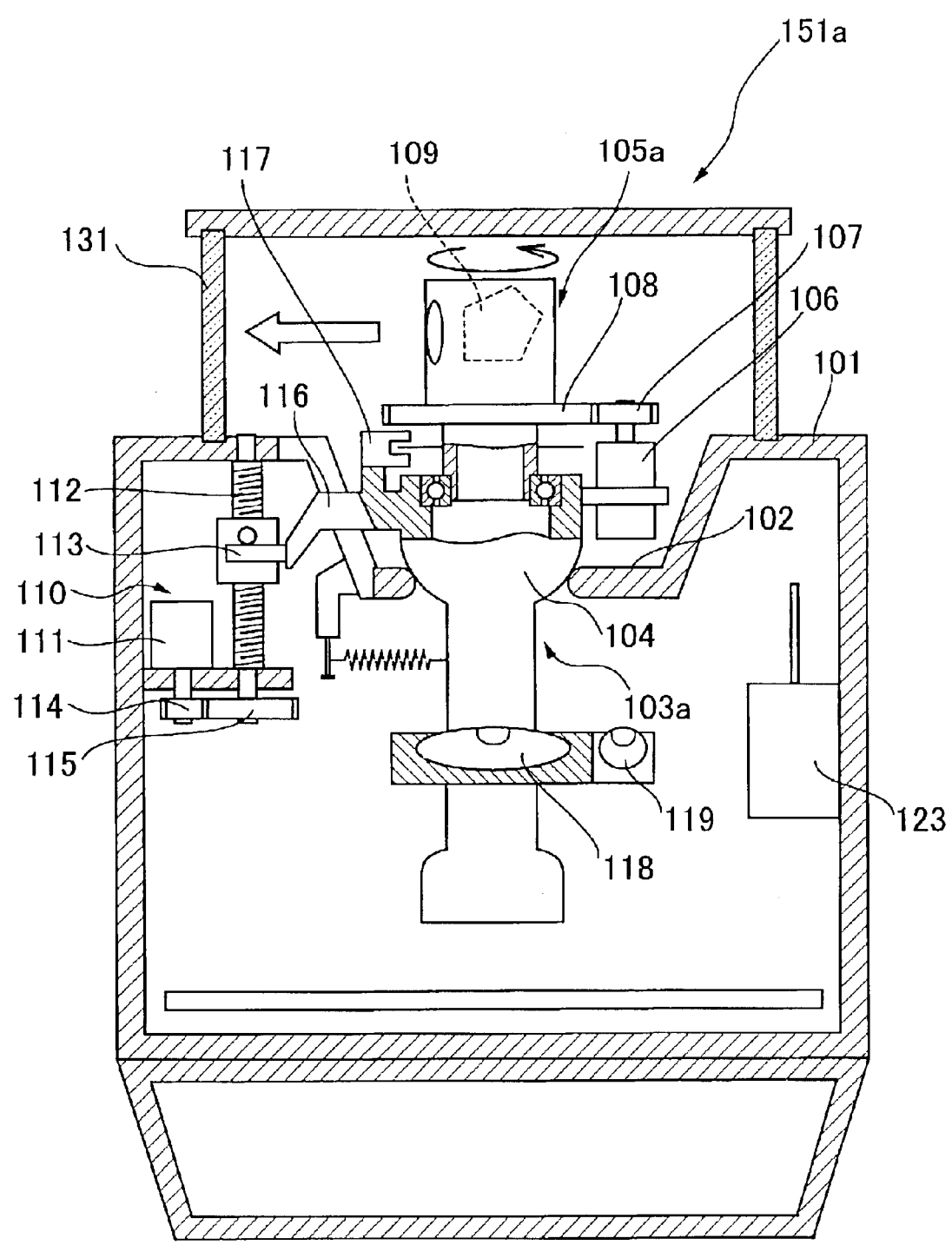
FIG. 9 is a sectional view showing the rotary laser apparatus that emits fan-shaped beams of different polarizations.

As shown in FIG. 9, a mechanism inclining the laser projector is almost similar to that in FIG. 4 except for a laser beam projector 103 built in the rotary laser apparatus 151a and a rotary unit 105a attached thereto. Thus, in the following discussion, only the laser projector 103a and the rotary unit 105 are explained.

Figure 10:
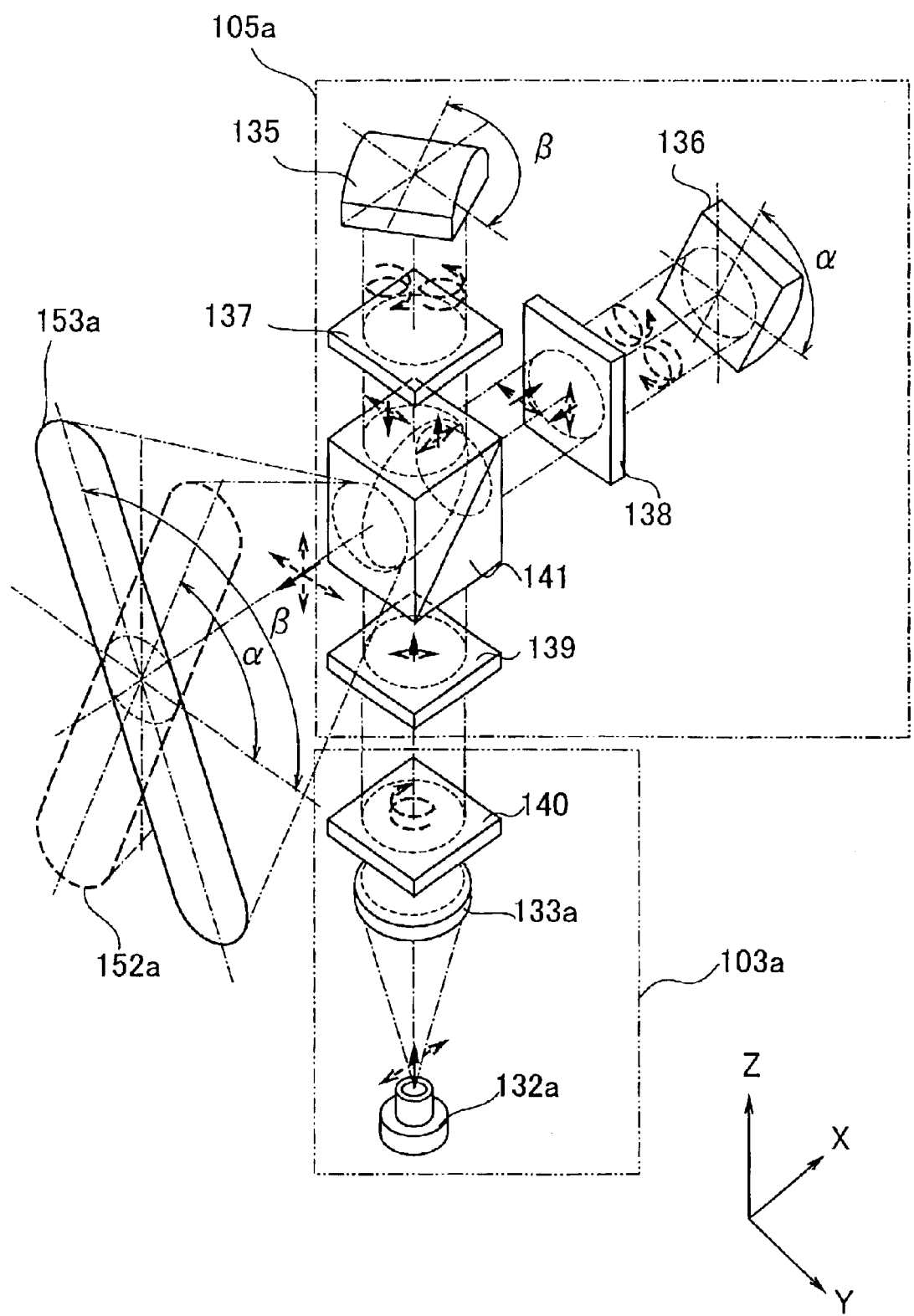
FIG. 10 is an exploded view of a laser light projector and a rotary unit in the rotary laser apparatus.

As can be seen in FIG. 10, the rotary laser apparatus 151a, which emits the fan-shaped laser beams 152a and 153a of different polarizations, includes the laser projector 103a and the rotary unit 105a. Trajectories of the laser beams transmitted through the optical devices are denoted by arrows and solid line while directions of polarization of the laser beams are designated by arrows and broken line.

When a laser illuminator 132a incorporated in the laser projector 103a is a laser diode, generated laser beam assumes linear polarization. Hereinafter, it is assumed that the laser beam is deflected in an X-direction, the laser beam is emitted in a Z-direction, and a direction orthogonal to an X-Z plane is a Y-direction. The laser beam emitted from the laser illuminator 132a is collimated by a collimator lens 133a and falls upon a one-quarter (¼) wave plate 140. The one-quarter wave plate 140 is oriented so that the laser beam from the laser illuminator 132a, after linearly polarized in the X-direction, turns to circularly polarized light. The laser beam, after passing the one-quarter wave plate 140, is transmitted through another one-quarter wave plate 139 again, and then, it is linear polarized in a direction meeting an axis in the X-direction at an angle of 45°, as shown in FIG. 9. Since the rotary unit 105a is rotatably supported, a relative position of the one-quarter wave plate 140 to the one-quarter wave plate 139 is varied. However, the laser beam after being passed through the one-quarter wave plate 140 assumes circular polarization, and hence, a deflection direction of the linearly polarized light after passing the one-quarter wave plate 139 again is not affected by a variation in the relative position of the wave plates but is determined by the one-quarter wave plate 139. The laser beam passes a polarized beam splitter 141. The polarized beam splitter 141 reflects polarization components in the Y-direction while transmitting polarization components in the X-direction. Thus, the Y-direction components of the laser beam that are linearly polarized in a direction meeting an axis in the X-direction at an angle of 45° by the one-quarter wave plate 139 are reflected by the polarized beam splitter 141 and deflected by 90°. The X-direction components of the laser beam are passed through the polarized beam splitter 141.

The laser beam reflected by the polarized beam splitter 141 falls upon a one-quarter wave plate 138 to turn to circularly polarized light, and then it is reflected by a cylinder mirror 136. The cylinder mirror 136 is oriented so that the laser beam, when emitted from the rotary unit 105a, is advanced at an angle α from the horizontal plane. Since the laser beam reflected by the cylinder mirror 136 is transmitted through the one-quarter wave plate 138 again and then linearly polarized in the Z-direction, the laser beam then can be transmitted through the polarized beam splitter 141 and then exits from the rotary unit 105a.

On the other hand, the laser beam transmitted through the polarized beam splitter 141 falls upon a one-quarter wave plate 137 to turn to circular polarized light, and thereafter, it is reflected by a cylinder mirror 135. The cylinder mirror 135 is oriented so that the laser beam, when exiting from the rotary unit 105a, meets the horizontal plane at an angle of β. Since the laser beam reflected by the cylinder mirror 135 is transmitted through the one-quarter wave plate 137 again and then linearly polarized in the Y-direction, the laser beam then can be reflected by the polarized beam splitter 141 that has transmitted it in the earlier stage, and it exits from the rotary unit 105a.

Alternative to the cylinder mirrors 135 and 136, any diffraction grating having similar effects may be taken place of them. When the diffraction grating is substituted, an intensity distribution of the fan-shaped beams can be varied as required. Light of the fan-shaped beams in the vicinity of the horizontal plane, even after propagated considerably far, must be of sufficiently higher luminous energy to be received at the optical sensor 154a. Light deviating significantly apart from the horizontal plane, as propagated farther, interferes with the ground or spreads to an elevation where it can no longer be received at the optical sensor 154a. Thus, the light diverged too far does not have to have high luminous energy because it is beyond a near range covered by the sensitivity of the optical sensor 154a.

The optical system is characterized as follows. Either of the fan-shaped laser beams is, after emitted from the laser projector 103a, twice reflected by the polarized beam splitter 141 and the cylinder mirror 135 or 136. Hence, an angle of deflection of the emergent laser beam depends upon a deflection angle in transmission through the rotary unit 105a regardless of a rotation angle of the rotary unit 105a. This attains the same effect as in the case where a typical pentaprism is used for the optical system.

Figure 11:
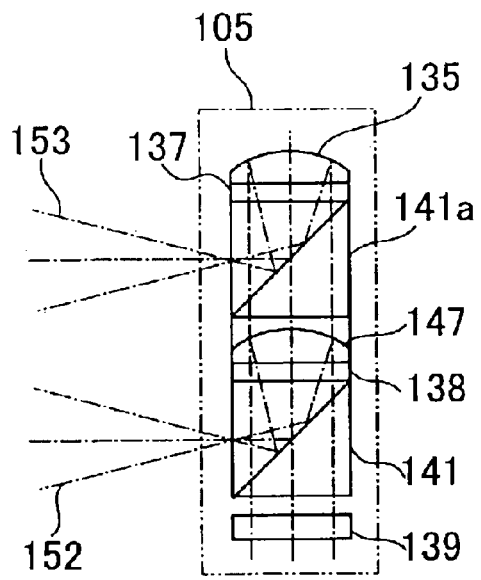
FIG. 11 shows another embodiment of the rotary laser apparatus emitting two fan-shaped beams.

FIGS. 11 and 13 depict manners of generating two diverging or fan-shaped beams.

FIG. 11 depicts another embodiment of the rotary unit 105. As will be recognized in FIG. 11, the circularly polarized laser beam incident upon the one-quarter wave plate 139 is transmitted through the polarized beam splitter 141. The light transmitted through the beam splitter 141 is transmitted through the one-quarter wave plate 138. Part of the transmitted laser beam is reflected by a cylinder half mirror 147 and thereafter transmitted through the one-quarter wave plate 138 again. The laser beam transmitted through the one-quarter wave plate 138 is then reflected by the beam splitter 141, and thus, the resultant beam or the fan-shaped beam 152 is emitted. The cylinder half mirror 147 is oriented so that the fan-shaped beam 152 propagates at an inclination angle α.

The beam transmitted through the half mirror 147 is transmitted through a polarized beam splitter 141a, and then, it falls upon the one-quarter wave plate 137. The beam is, after transmitted through the one-quarter wave plate 137, directed to the cylinder mirror 135. The beam incident upon the mirror 135 is reflected by the mirror 135 and then transmitted through the one-quarter wave plate again. Then, the beam is reflected by the beam splitter 141a, and thus, the resultant beam or the fan-shaped beam 153 is emitted. The mirror 135 is oriented so that the fan-shaped beam 153 propagates at an inclination angle β.

Figure 12A:
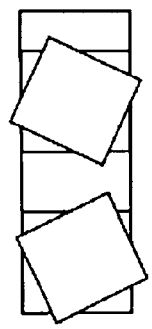
FIGS. 12A, 12B shows further another embodiment of the rotary laser apparatus that emits two fan-shaped beams.
Figure 12B:
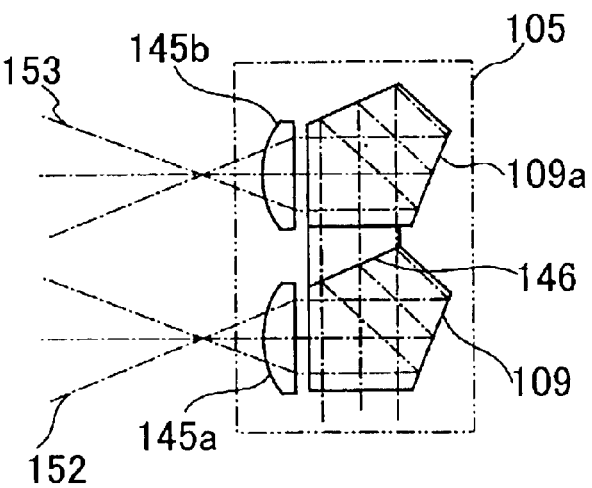

FIGS. 12A, 12B depict further another embodiment of the rotary unit 105. As will be recognized in FIGS. 12A, 12B, the beam guided into the rotary unit 105 falls upon the pentaprism 109. Part of the beam incident upon the pentaprism 109 is reflected by a half mirror 146 in an upper side of the pentaprism 109 and then deflected by the pentaprism 109. The deflected beam is shaped into the diverging beam by a cylinder lens 145a, and thus, the fan-shaped beam 152 is emitted. The cylinder lens 145a is oriented so that the fan-shaped beam 152 propagates at an inclination angle α.

The beam transmitted through a half mirror 146 in the pentaprism 109 falls on a pentaprism 109a and is deflected. The beam deflected in the pentaprism 109a is shaped into the diverging beam by a cylinder lens 145b, and thus, the fan-shaped beam 153 is emitted. The cylinder lens 145b is oriented so that the fan-shaped beam 153 propagates at an inclination angle β.

FIGS. 13A, 13B depict still another embodiment of producing the two fan-shaped beams 152 and 153. As shown in FIG. 13A, a cylinder rod lens 144 is cut into pieces, and the pieces 144a and 144b are joined together (see FIG. 13B). When light is directed at the cylinder lens, exiting light is spread into two diverging beams or the fan-shaped beams 152 and 153 (see FIG. 13C).

Figure 14:
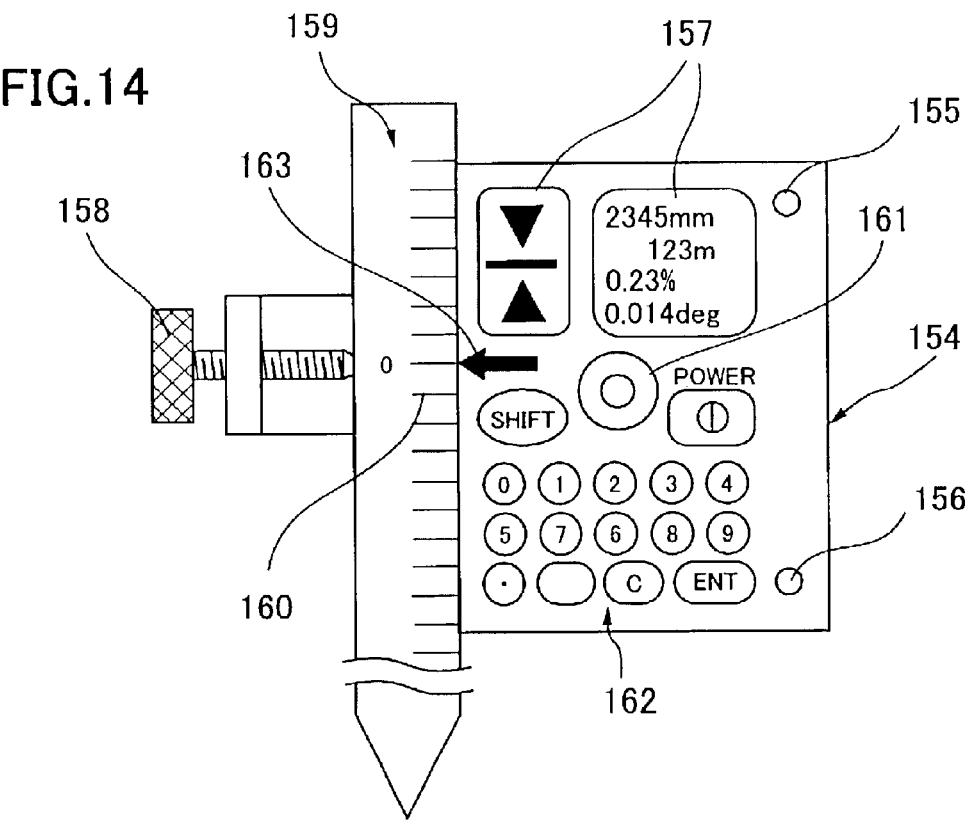
FIG. 14 is a front view showing the optical sensor included in the construction machine control system according to the present invention.
Figure 15:
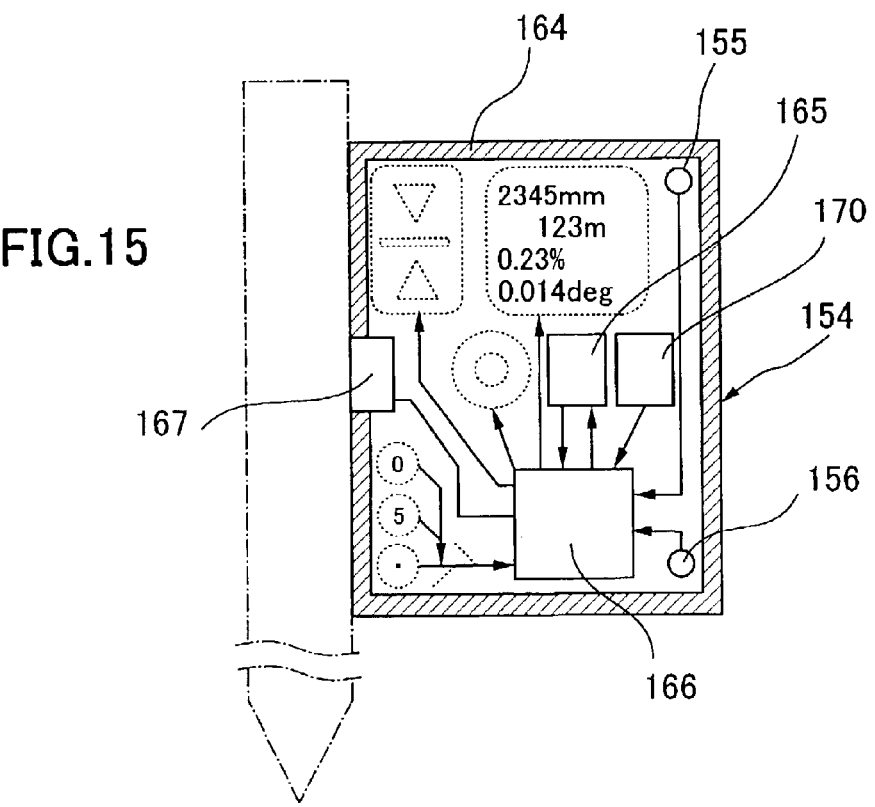
FIG. 15 a sectional mimetic diagram of the optical sensor included in the construction machine control system according to the present invention.

(1.3) Optical Sensor (1.3.1) Optical Sensor for Rotary Laser Apparatus Emitting Two Diverging Laser Beams The optical sensor 154, which is used to receive two of the diverging or fan-shaped beams 152 and 153 emitted respectively from the rotary laser apparatuses 151 will now be described. As shown in FIGS. 14 and 15, light receiving sections 155 and 156, which sense the fan-shaped beams 152 and 153, are fixed to a box 164 of the optical sensor 154. The box 164 includes a display 157, an alarm 161 such as a buzzer, entry keys 162, and an index 163. Additionally, the box 164 is incorporated with a memory 165, an arithmetic operation unit 166 determining a state of received light, and a scale reader 167, and is fixed to a pole 506 having a scale 160. The display 157 gives an elevation from the horizontal reference plane to the optical sensor 154 and a distance between the rotary laser device 151 and the optical sensor 154.

(1.3.1.1) Principle of Measuring Angles by Means of Optical Sensor

As stated above, the rotary laser apparatus 151 emits the diverging or fan-shaped beams 152 and 153 while rotating about the center C. As shown in FIG. 3, the fan-shaped beam 152 is emitted, meeting the horizontal plane at an angle β. An intersecting line of the fan-shaped beam 152 with the horizontal plane meets an intersecting line of the fan-shaped beam 153 with the horizontal plane at an angle δ. The two fan-shaped beams 152 and 153 spin under such conditions, and hence, those diverging beams sweep the light receiving section in the optical sensor 154 one after another with some delay of time.

Figure 16A:
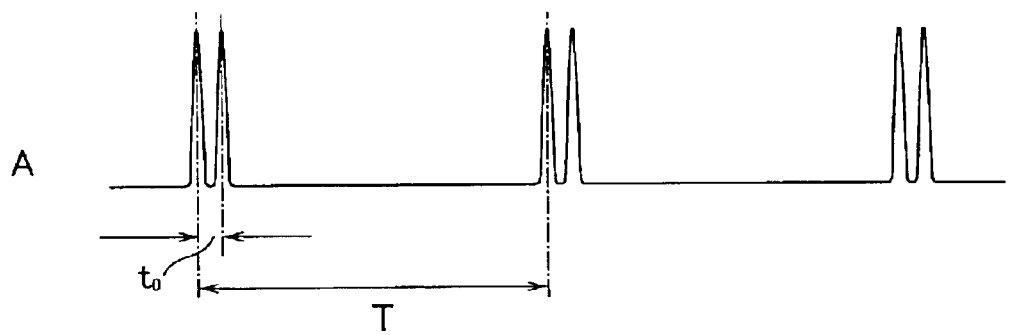
FIGS. 16A, 16B are graphs of signals detected by the optical sensor in the construction machine control system according to the present invention.

When the light receiving section in the light sensor 154 is in a position A within the horizontal plane, light detected by the optical sensor 154 can be depicted as in FIG. 16A. Otherwise, when the light receiving section 156 is in a position B translated vertically upward from the position A, the fan-shaped beams can resultantly be detected as in FIG. 16B. As illustrated in FIG. 16A, assuming now that the fan-shaped beams are sequentially detected with a time delay of $t_o$ when the light receiving section is located in the point A and that the rotary laser apparatus 151 rotates at cycle T, the time delay between detections of the two beams is given by the following equation (1):

$$t_o = T\frac{\delta}{2\pi} \tag{1}$$

When the light receiving section 156 is in the position B at an arbitrary elevation, the time delay t from one detection to another is in proportion to $\angle BCA = \gamma$ that is an angle at which a straight line passing the position B of the light receiving unit 156 and the laser beam emitting point C meets the horizontal plane, and hence, as $\gamma$ takes a larger value, the time delay t becomes accordingly longer. Thus, determining the time delay t in the position B, the angle $\gamma$ defined by the strait line passing the position B and point C and the horizontal plane can be expressed by the following formulae (2) and (3):

$$\gamma = \frac{t - t_0}{T\left(\frac{1}{2\pi\tan(\pi - \beta)} + \frac{1}{2\pi\tan(\alpha)}\right)} \tag{2}$$

$$\gamma = \frac{(t - t_0)\pi\tan(\alpha)}{T} \text{ (where, especially, } \pi - \beta = \alpha) \tag{3}$$

The value of $\gamma$ can be computed by the arithmetic operation unit 166 where the angle $\gamma$ is arithmetically obtained from the delay between times when the two fan-shaped beams 152 and 153 sweep the light receiving section one after another and the rotation cycle T of the rotary laser apparatus 151, and the display 157 indicates the computation result.

Figure 17:
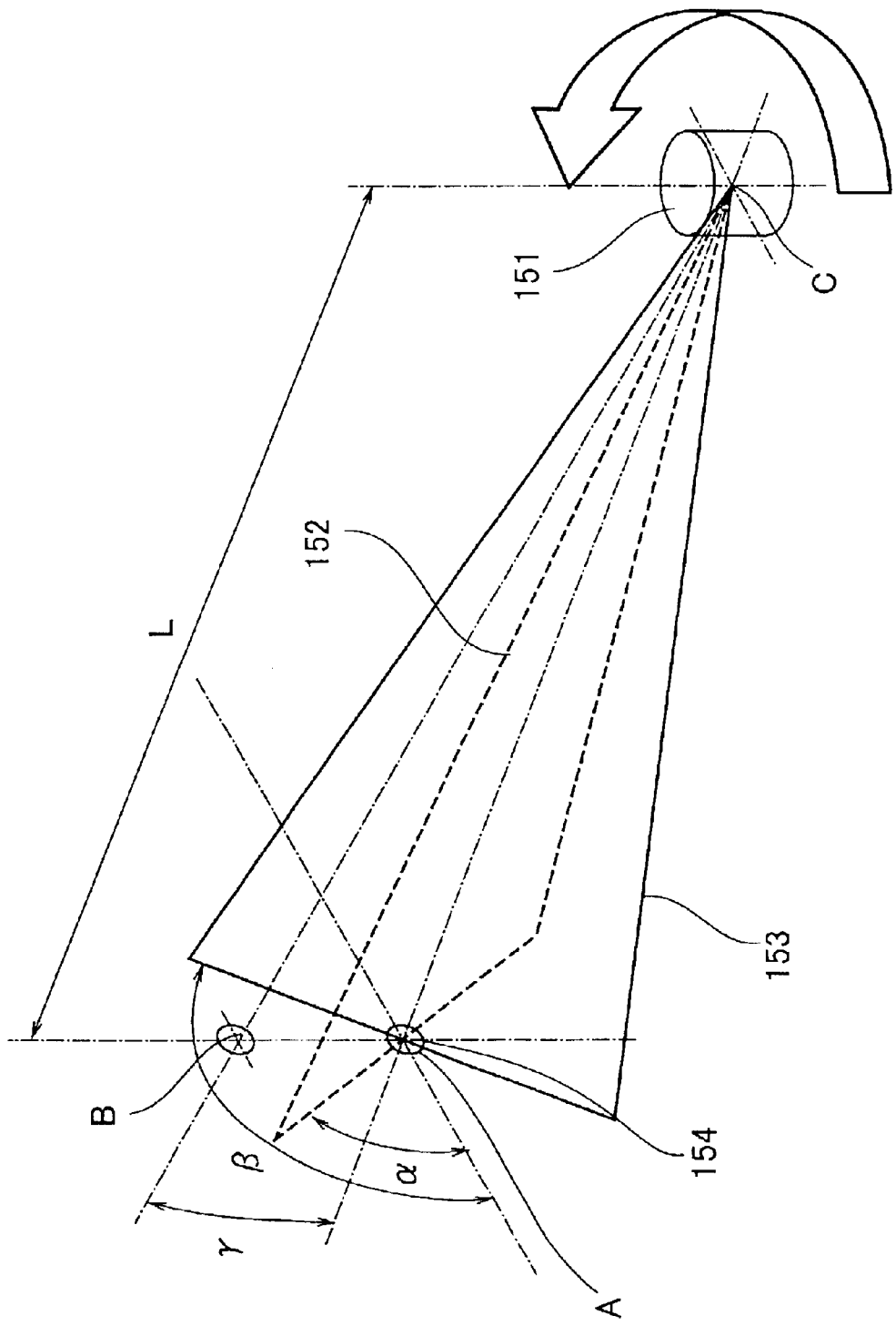
FIG. 17 is a perspective view illustrating the rotary laser apparatus that emits two fan-shaped laser beams intersecting with each other within horizontal plane.

Discussed below will be a case where the rotary laser apparatus 151 emits the two fan-shaped beams that intersect with each other in the horizontal plane, or a case under the condition that the angle $\delta$ in FIG. 2 is equal to 0°. This is illustrated in FIG. 17.

When the light receiving section of the optical sensor is in the position A within the horizontal plane, the revolving two fan-shaped beams 152 and 153 sweep the optical sensor 154 at the same time, which is represented as $t_0=0$. Thus, $\angle BCA = \gamma$, which is an angle at which a straight line passing the position B at an arbitrary elevation and the point C or the center of rotation of the rotary laser apparatus meets the horizontal plane, can be obtained by substituting $t_0=0$ in the formulae (2) and (3) as in the following equations (4) and (5):

$$\gamma = \frac{t}{T\left(\frac{1}{2\pi\tan(\pi - \beta)} + \frac{1}{2\pi\tan(\alpha)}\right)} \tag{4}$$

$$\gamma = \frac{t\pi\tan(\alpha)}{T} \text{ (where, especially, } \pi - \beta = \alpha) \tag{5}$$

As is recognized from the equations (4) and (5), $\alpha$ and $\beta$ are constants, and therefore, the angle $\gamma$ is expressed as a function of the rotation cycle T of the rotary laser apparatus 151 and the time delay between detections of the two fan-shaped laser beams. If rotation of the rotary laser 151 is somewhat irregular and this causes an error for the predetermined rotation cycle T, or rather, if some irregularity takes place in a single rotation whereas there is no error of the predetermined rotation cycle T, the time delay t between detections also has an error, which results in computing $\gamma$ with an error. In a measurement of the horizontal plane where the two fan-shaped beams 152 and 153 intersects with each other within the horizontal plane as in FIG. 17, t=0 is satisfied for given $\gamma=0$, and an error due to irregular rotation would not affects the measurement.

In a real construction site, the horizontal plane is often used for a reference plane, the arrangement in FIG. 17 where an error associated with the measurement in the horizontal reference plane is minimized is preferable to the arrangement in FIG. 2 where the fan-shaped beams 152 and 153 do not intersect with each other in the horizontal plane.

The aforementioned principle of measuring angles by the optical sensor 154 can apply to the optical sensor 154a that is designed to receive the fan-shaped beams 152a and 153a of different polarization.

Figure 18:
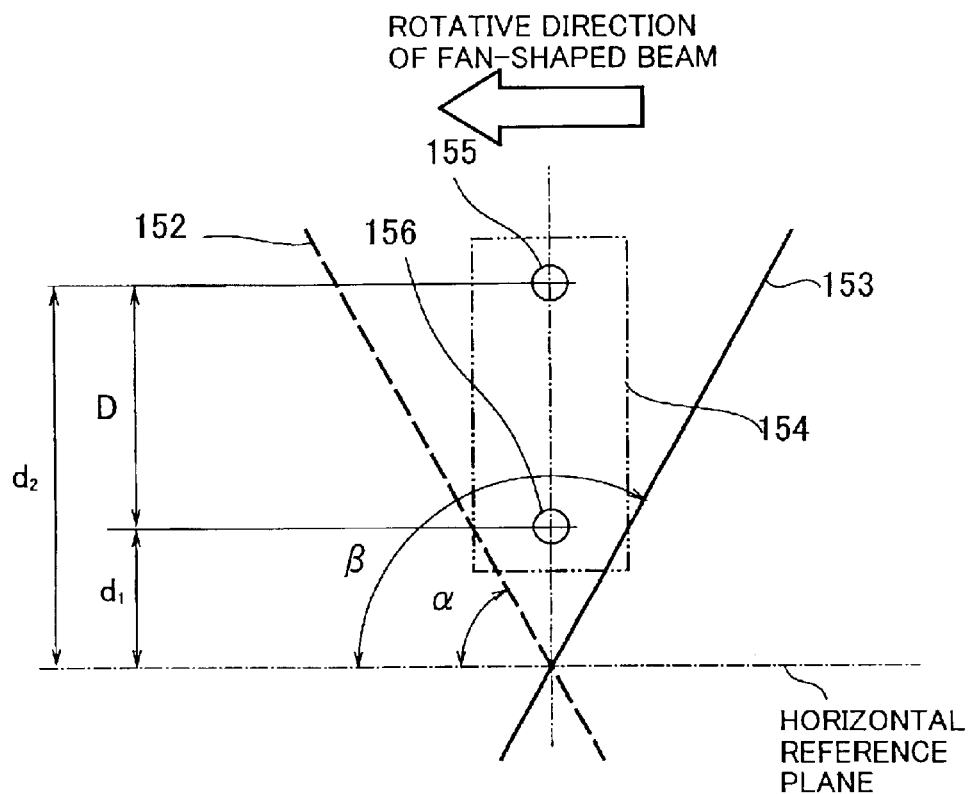
FIG. 18 is a diagram showing a positional relation of two light receiving sections to two fan-shaped beams in the construction machine control system according to the present invention.

(1.3.1.2) Principle of Measuring Angles by Means of Two Light Receiving Sections in Optical Sensor Discussed below will be a principle of measuring angles by two of the light receiving sections of the optical sensor 154. With the two light receiving sections, a relative elevation of the optical sensor 154 to the rotary laser apparatus 151 and a distance between them can be obtained. As shown in FIG. 18, the light receiving sections are positioned vertically in series in the optical sensor 154.

Figure 19:
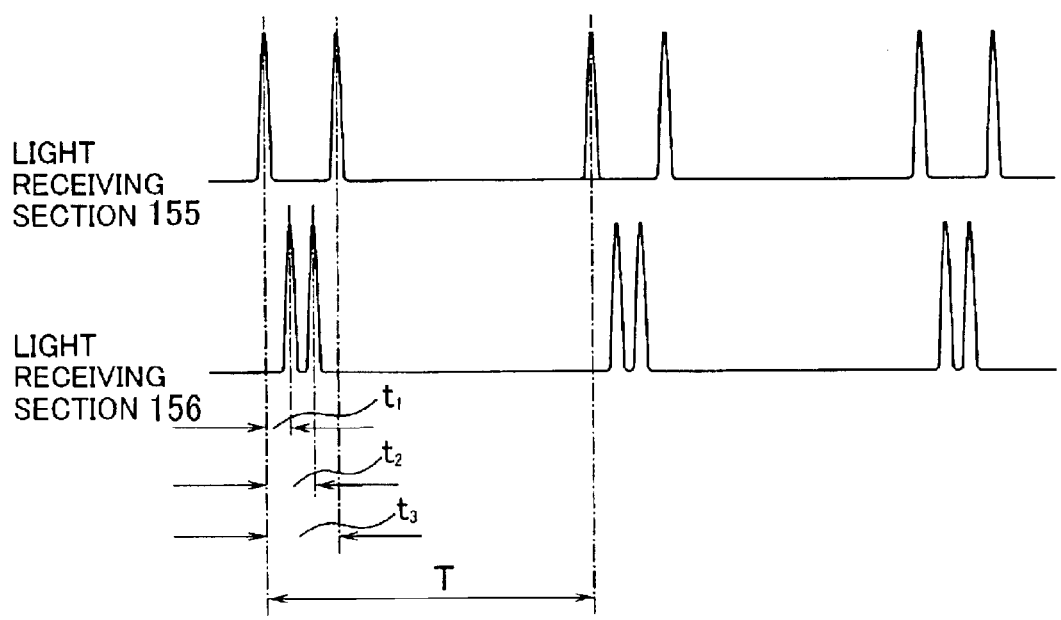
FIG. 19 is a graph of signals detected in a moment conditioned by the positional relation in FIG. 18.

The two diverging or fan-shaped beams 152 and 153 are emitted so that they intersect with each other in the horizontal plane, and the beam 152 circularly sweeps at angle $\alpha$ to the horizontal plane while the beam 153 does at angle $\beta$ to the same. The light receiving sections 155 and 156 are spaced from each other at a vertical interval D. The two fan-shaped beams 152 and 153 revolve under the conditions as mentioned above, and hence, the light receiving sections 155 and 156 in the optical sensor 154 detect a delay between times when the fan-shaped beams 152 and 153 respectively sweep the optical sensor 154, as depicted in FIG. 19.

From the time delays $t_1$, $t_2$, $t_3$, and T detected in this way and constants $\alpha$, $\beta$, and D, an elevation $d_1$ of the light receiving section 155 from the horizontal reference plane is given by the following equation (6) while an elevation $d_2$ of the light receiving section 156 is obtained by the following equation (7):

$$d_1 = \frac{D(t_2 - t_1)}{(t_3 - t_2 + t_1)} \tag{6}$$

$$d_2 = \frac{D(t_2 - t_1)}{(t_3 - t_2 + t_1)} + D \tag{7}$$

Assuming now that $\gamma_2$ is an angle at which a straight line passing the light receiving section 155 and the point C of emission of the fan-shaped laser beams meets the horizontal plane while $\gamma_1$ is an angle at which a straight line passing the light receiving section 156 and the point C meets the horizontal plane, $\gamma_2$ and $\gamma_1$ are obtained from the formula (4) as in the following equation (8):

$$\gamma_1 = \frac{t_2 - t_1}{T\left(\frac{1}{2\pi\tan(\pi - \beta)} + \frac{1}{2\pi\tan(\alpha)}\right)} \quad (8)$$

$$\gamma_2 = \frac{t_3}{T\left(\frac{1}{2\pi\tan(\pi - \beta)} + \frac{1}{2\pi\tan(\alpha)}\right)} \quad (9)$$

On the other hand, a distance L from the rotary laser apparatus 151 to the optical sensor 154 is expressed with the terms $\gamma_2$, $\gamma_1$, $d_1$, and $d_2$ as in the equations (10) and (11) as follows:

$$L = \frac{d_1}{\tan(\gamma_1)} \quad (10)$$

$$L = \frac{d_2}{\tan(\gamma_2)} \quad (11)$$

Substituting the formulae (6) to (9) into the equations (10) and (11), the equations (12) and (13) are obtained as follows:

$$L = \frac{\left\{\frac{D(t_2 - t_1)}{(t_3 - t_2 + t_1)}\right\}}{\tan\left[\frac{t_2 - t_1}{T\left(\frac{1}{2\pi\tan(\pi - \beta)} + \frac{1}{2\pi\tan(\alpha)}\right)}\right]} \quad (12)$$

$$L = \frac{\left\{\frac{D(t_2 - t_1)}{(t_3 - t_2 + t_1)} + D\right\}}{\tan\left[\frac{t_3}{T\left(\frac{1}{2\pi\tan(\pi - \beta)} + \frac{1}{2\pi\tan(\alpha)}\right)}\right]} \quad (13)$$

Although either the equation (12) or the equation (13) can give the distance from the rotary laser apparatus 151 and the optical sensor 154, with given $t_2-t_1=0$, there is an operation of dividing zero in the equation (12) while, with given $t_3=0$, there is an additional operation of dividing zero in the equation (13), and in either case, the formula including no such operation may be used.

Figure 20:
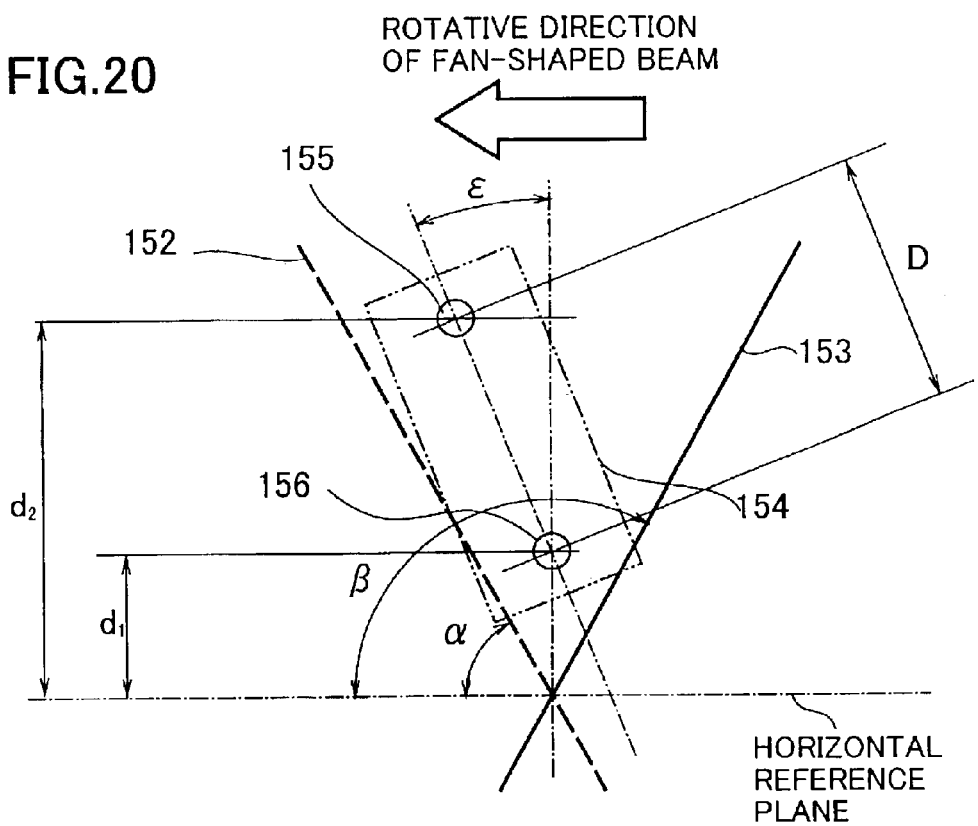
FIG. 20 illustrates a positional relation of two light receiving sections to two fan-shaped beams in a situation where the optical sensor is inclined in the construction machine control system according to the present invention.

Then, referring to FIG. 20, a case where the optical sensor 154 is inclined at only an angle of $\epsilon$ will be simulated. In such a case, the time delays $t_1$, $t_2$, and $t_3$ and the rotation cycle T are used to correct the inclination, and thus, the relative elevation of the optical sensor 154 to the rotary laser apparatus 151 and the distance between them can be obtained.

Under the condition of $\alpha+\epsilon<90°$, the fan-shaped beams are detected at the light receiving sections 155 and 156 in the optical sensor 154 in the same procedure as in FIG. 19. With given conditions of the time delays $t_1$, $t_2$, and $t_3$, the rotation cycle T, the constants $\alpha$ and $\beta$, and the distance D between the two light receiving sections 155 an 156, vertical distances $d_1$ and $d_2$ from the horizontal reference plane to the light receiving sections 155 and 156 are obtained by the formulae (14) and (15) as follows:

$$d_1 = \cos(\epsilon) \cdot \frac{D(t_2 - t_1)}{(t_3 - t_2 + t_1)} \quad (14)$$

$$d_2 = \cos(\epsilon) \cdot \frac{D(t_2 - t_1)}{(t_3 - t_2 + t_1)} + D \quad (15)$$

The inclination angle $\epsilon$ of the optical sensor 154 is obtained by the following formula (16):

$$\epsilon = \tan^{-1}\left(\frac{(t_3 - t_2)\tan(\pi - \beta) - t_1\tan(\alpha)}{(t_3 + t_1 - t_2)\tan(\alpha)\tan(\pi - \beta)}\right) \quad (16)$$

The distance L is obtained by substituting $d_1$, $d_2$, $\gamma_1$, and $\gamma_2$ as given in the formulae (14), (15), (8), and (9) into the formulae (10) and (11).

Figure 21:
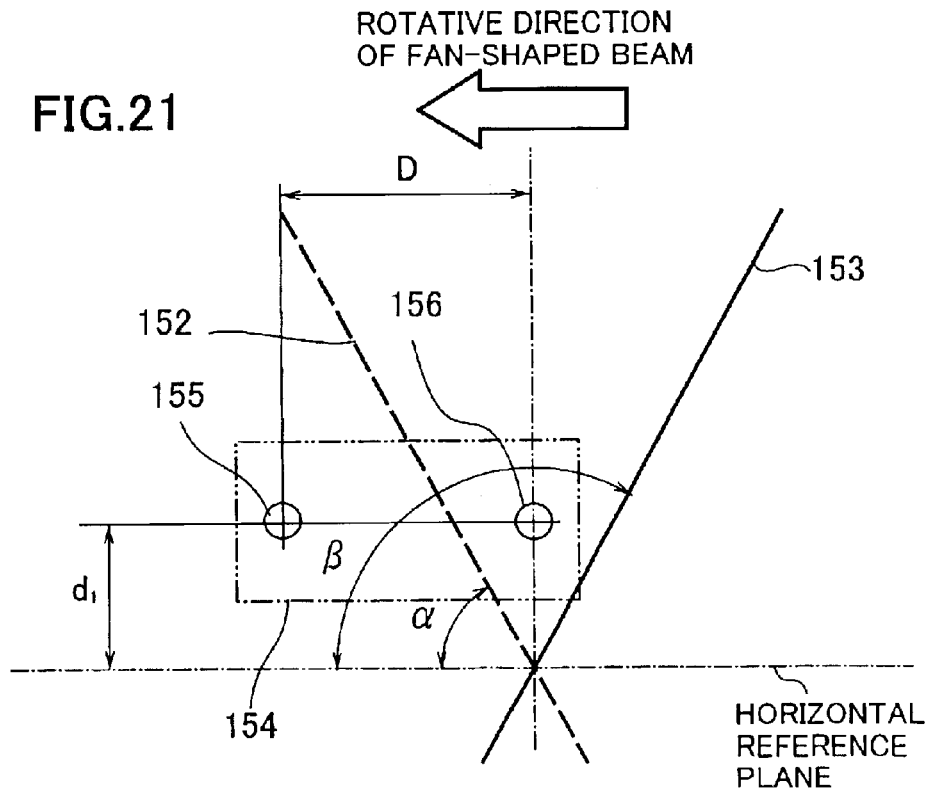
FIG. 21 illustrates a positional relation of two light receiving sections to two fan-shaped beams in a situation where the light receiving sections are kept horizontal in the construction machine control system according to the present invention.
Figure 22:
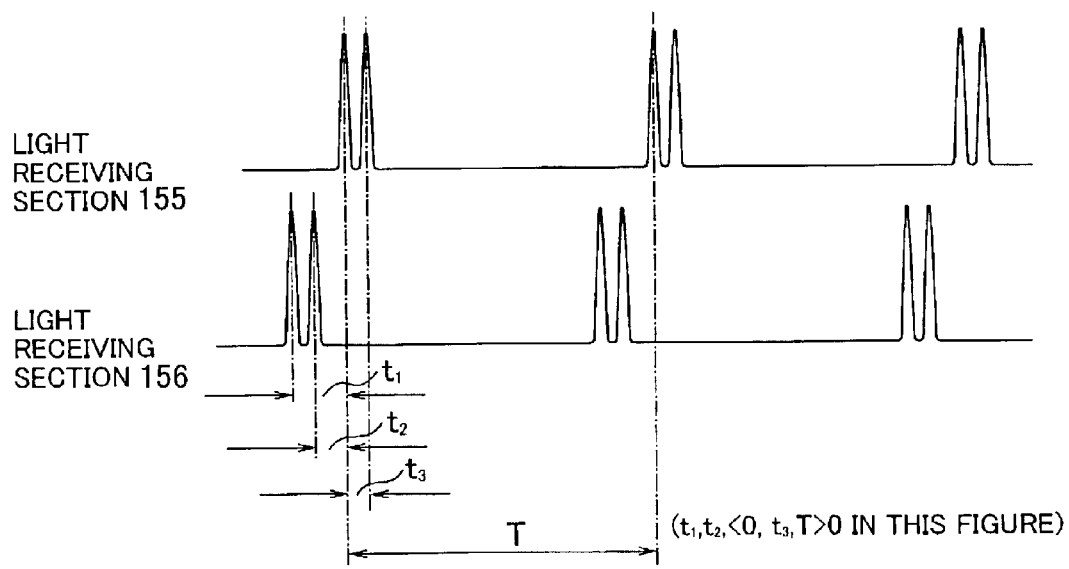
FIG. 22 is a graph of signals detected in a moment conditioned by the positional relation in FIG. 21.

With referring to FIGS. 21 and 22, discussed below will be a case where the light receiving sections 155 and 156 are located horizontally in series to detect the fan-shaped beams.

The two fan-shaped beams 152 and 153 are emitted so that they intersect with each other within the horizontal plane, and the beam 152 circularly sweeps at an angle $\alpha$ to the horizontal plane while the beam 153 does at an angle $\beta$ to the same. The optical sensor 154 includes the two light receiving sections 155 and 156 horizontally spaced apart from each other at an interval D to detect the fan-shaped beams The fan-shaped beams, revolving under the conditions as mentioned above, are detected as illustrated in FIG. 22 when they sweep the light receiving sections 155 and 156 in the optical sensor 154. From the time delays $t_1$, $t_2$, $t_3$, and T detected in this way and constants $\alpha$, $\beta$, and D, a horizontal distance from the rotation center C of the rotary laser apparatus 151 to the light receiving sections 155 and 156 of the optical sensor 154 can be given in the formula (17) as follows:

$$L = \frac{DT}{\pi(t_3 - t_2 - t_1)} \quad (17)$$

where $t_1=t_3-t_2$.

The vertical distances d1 and d2 from the horizontal reference plane to the light receiving sections 155 and 156, respectively, are given by transforming the formulae (10) and (11) to the equations (18) and (19) as follows:

$$d_1 = L \tan(\gamma_1) \quad (18)$$

$$d_2 = L \tan(\gamma_2) \quad (19)$$

Substituting the equations (8), (9) and (17) into the formulae (18) and (19) leads to the formulae (20) and (21) as follows:

$$d_1 = \frac{DT}{\pi(t_3 - t_2 - t_1)}\tan\left(\frac{t_2 - t_1}{T\left(\frac{1}{2\pi\tan(\pi - \beta)} + \frac{1}{2\pi\tan(\alpha)}\right)}\right) \quad (20)$$

$$d_2 = \frac{DT}{\pi(t_3 - t_2 - t_1)}\tan\left(\frac{t_3}{T\left(\frac{1}{2\pi\tan(\pi - \beta)} + \frac{1}{2\pi\tan(\alpha)}\right)}\right) \quad (21)$$

With given $\gamma_2 \approx 0$ and $\gamma_1 \approx 0$, $\tan(\gamma) \approx \gamma$ is satisfied, and therefore, the following formulae (22) and (23) are true:

$$d_1 = \frac{2D(t_2 - t_1)\tan(\alpha)\tan(\pi - \beta)}{(t_3 - t_2 - t_1)\{\tan(\alpha) + \tan(\pi - \beta)\}} \quad (22)$$

$$d_2 = \frac{2Dt_3\tan(\alpha)\tan(\pi - \beta)}{(t_3 - t_2 - t_1)\{\tan(\alpha) + \tan(\pi - \beta)\}} \quad (23)$$

In the formulae (14), (15), (16), (22), and (23) where d1, d2 and ε are obtained includes, none of operation elements of terms include the rotation cycle T. This means that even if the rotation of the rotary laser apparatus 151 is irregular and the predetermined rotation cycle T includes an error, the results of measurement would not be affected by such an error. Thus, when rotation irregularities that might affect the time delays $t_1$, $t_2$, and $t_3$, do not take place in a short period of time when both the fan-shaped beams 152 and 153 sweep the light receiving sections 155 and 156 in the optical sensor 154, measurements are accomplished without error.

This principle of measuring angles can apply to the fan-shaped beams 152a and 153a of different polarizations that are received at the optical sensor 154a.

(1.3.1.3) Principle of Measuring Positions of Optical Sensor

When the optical sensor 154 has the single light receiving section or two of the light receiving sections horizontally spaced from each other and when the two fan-shaped beams intersect with each other in the horizontal reference plane, detection of the time delay is insufficient to identify two positions that are vertically aligned and spaced equally from the horizontal reference plane. In this situation, in order to learn which side the optical sensor 154 is located above or below the horizontal reference plane, the optical sensor 154 must be moved up and down to check the state of receiving light. Specifically, if moving the optical sensor upward causes an increase in the time delay, the optical sensor 154 is above the horizontal reference plane while, if moving the optical sensor downward causes a reduction of the time delay, the optical sensor 154 is under the horizontal reference plane. When there are two or more of the light receiving sections spaced apart from one another at varied levels, respectively, it is possible to determine whether the optical sensor is located above or below the horizontal reference plane without the above-mentioned procedure. When properties such as polarization direction and frequency are useful to identify the two fan-shaped beams 152 and 153, either the single light receiving section or two of the light receiving sections horizontally spaced apart permits a recognition of whether the optical sensor is above or below the horizontal reference plane, depending upon which one of the fan-shaped beams is detected first.

Figure 23A:
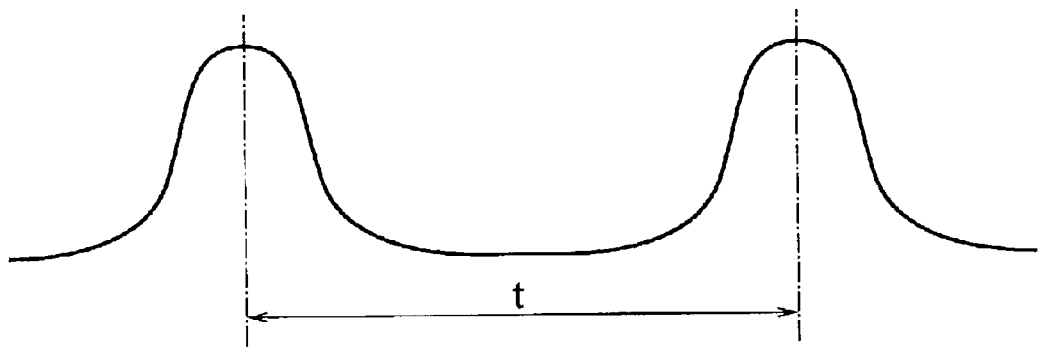
FIGS. 23A to 23C are graphs of signals detected at the light receiving sections where two fan-shaped laser beams are respectively received one after another at short delay in the rotary laser apparatus.

(1.3.1.4) Measurement Principle in the Event of Short Delay Between Detections of Diverging Beams As mentioned above, from the results of measurement and arithmetic operation on the delay t between times when two of the fan-shaped beams sweep the optical sensor 154, a relative elevation of the optical sensor to the rotary laser apparatus 151, a distance between them, and an inclination angle of the optical sensor are computed. When the light receiving section receives the two fan-shaped beams 152 and 153 with a longer delay of time as illustrated in FIG. 23A, the measurement result of the delay t is more accurate. In contrast, when the delay of time between detections of the two fan-shaped beams 152 and 153 is short, and additionally, when signals produced due to received light interfere each other, it is impossible to determine the delay accurately. Thus, distinguishing the signals derived from the two fan-shaped beams from their respective polarizations and identifying them separately, it becomes possible to obtain an accurate delay of time if it is short.

(1.3.2) Optical Sensor for Rotary Laser Apparatus Emitting Two Diverging Laser Beams of Different Polarizations Now discussed will be the optical sensor 154a designed to receive the two diverging or fan-shaped laser beams 152a and 153a of different polarizations. A configuration of a unit that identifies the laser beams from their respective varied polarizations will be detailed. Other components, and the principles of determining the relative elevation of the optical sensor to the rotary laser apparatus and determining the distance between them are similar to those of the aforementioned optical sensor 154.

Figure 24A:
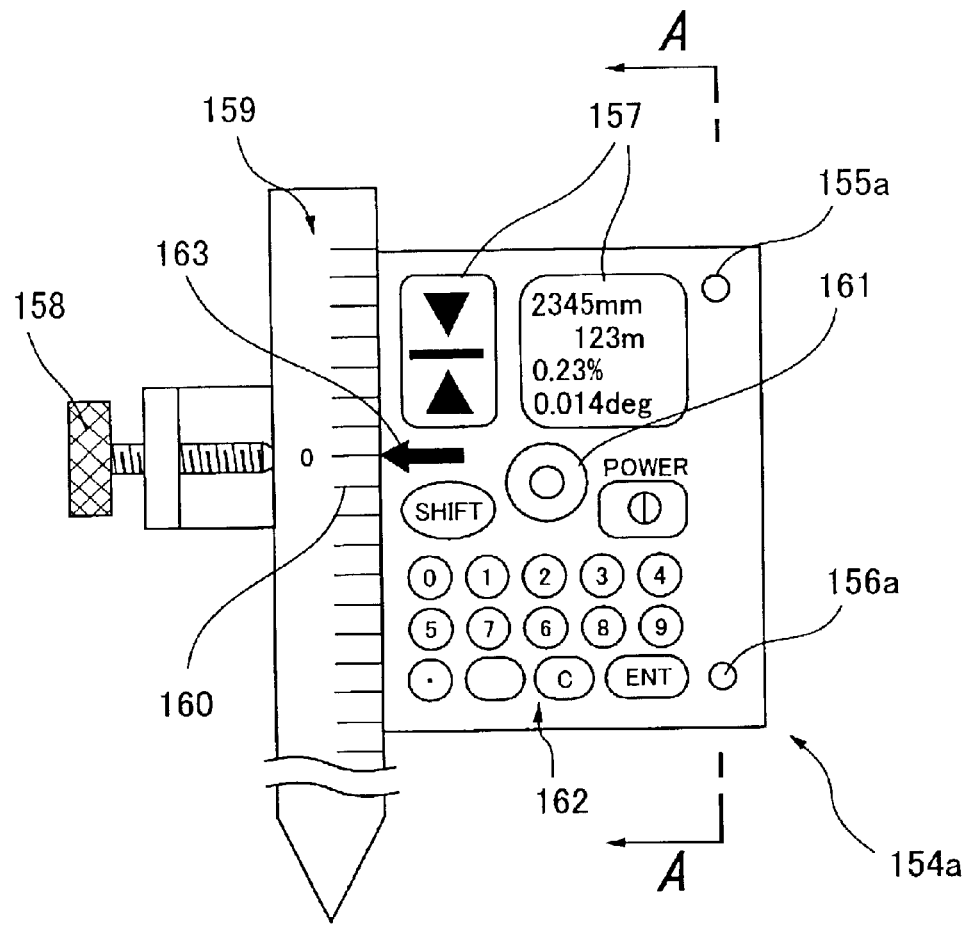
FIGS. 24A, 24B depict an arrangement of the optical sensor at which two fan-shaped laser beams of different polarizations are received in the construction machine control system according to the present invention.
Figure 24B:
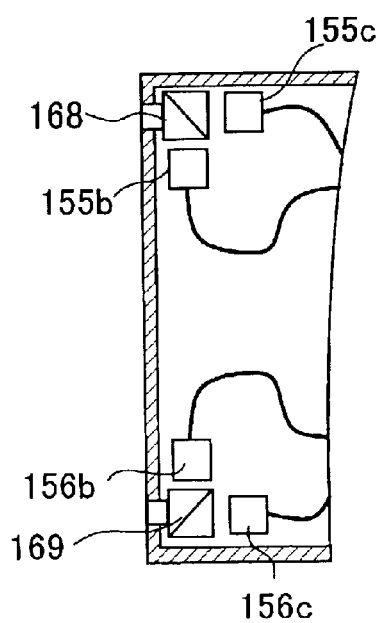

FIG. 24A is a front view of the optical sensor 154a while FIG. 24B is a sectional view of the same, taken along the line A—A of FIG. 24A. As shown in FIGS. 24A, 24B, a light receiving section 155a of the optical sensor 154a includes light receiving members 155b and 155c and a polarized beam splitter 168 located in a previous stage to them while a light receiving section 156a includes light receiving members 156b and 156c and a polarized beam splitter 169 located in a previous stage to them. The polarized beam splitters 168 and 169 transmit or reflect laser beams, depending upon a polarization direction of incident light. The light receiving members 155b and 156b are dedicated to reflected light while the light receiving members 155c and 156c are dedicated to transmitted light, and thus, the polarization direction of the incident light can be determined. In this way, in the event that the two fan-shaped laser beams 152a and 153a fall on the light receiving members 155a and 156a one after another at short delay of time, the light receiving members 155b and 156b detect the fan-shaped beam 152a while the light receiving members 155c and 156c detect the fan-shaped beam 153a, and thus, the delay of time can be accurately determined.

Alternatively, a one-quarter (¼) wave plate (not shown) may be added to a trailing end of the optical path of the rotary laser apparatus 151a to emit circularly polarized laser beam while another one-quarter wave plate (not shown) may be placed in a previous stage to the polarized beam splitters 168 and 169 in the light receiving sections 155 and 156, so that in the event that the optical sensor 154 is inclined, the beam splitters 168 and 169 accurately split the two fan-shaped beams.

(1.3.3) Optical Sensor Having a Single Light Receiving Section

One of the light receiving sections in the optical sensor 154 or 154a may be omitted. In such a case, after a single measurement by the optical sensor having the single light receiving section, the optical sensor is moved upward or downward to take a next measurement. For example, when the optical sensor is moved upward, an increase in the delay of time between detections of fan-shaped beams received at the light receiving section proves that the optical sensor is above the horizontal reference plane, but a reduction of the delay proves that the optical sensor is under the same. After the confirmation of the relative location of the optical sensor to the horizontal reference plane, the first or the second of the measurements is used to determine a distance between the horizontal reference plane and the optical sensor, and then, the elevation of the optical sensor can be obtained.

When the construction machine control system assuredly having its optical sensor always located above or below the horizontal reference plane is used, the above-mentioned procedure can be omitted. In this case, almost all the components of the optical sensor are similar to the aforementioned embodiments except that the single light receiving section is used.

(1.3.4) Optical Sensor Having Three or More Light Receiving Sections

Figure 23B:
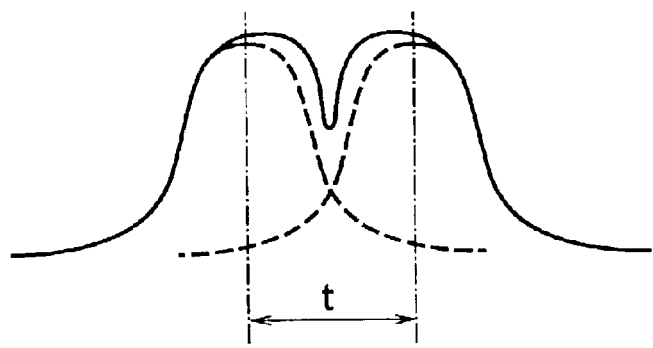
Figure 23C:
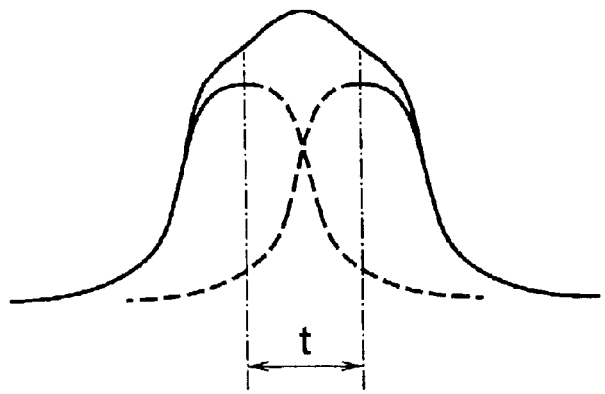

Alternatively, there are three or more light receiving sections in the optical sensor 154 or 154a. This embodiment is configured similar to the above-mentioned optical sensor except for the number of the light receiving sections. In this case, if interference of the signals due to the two fan-shaped beams takes place in one of the light receiving section as explained in conjunction with FIGS. 23A to 23C, the same would not simultaneously occur in the remaining two or more light receiving sections. Thus, the measurement taken at the light receiving section where the interference is caused is abandoned, but instead the measurements at the remaining light receiving sections are validly used to accomplish an accurate determination if the two fan-beams cannot be identified from their respective polarizations.

Figure 25A:
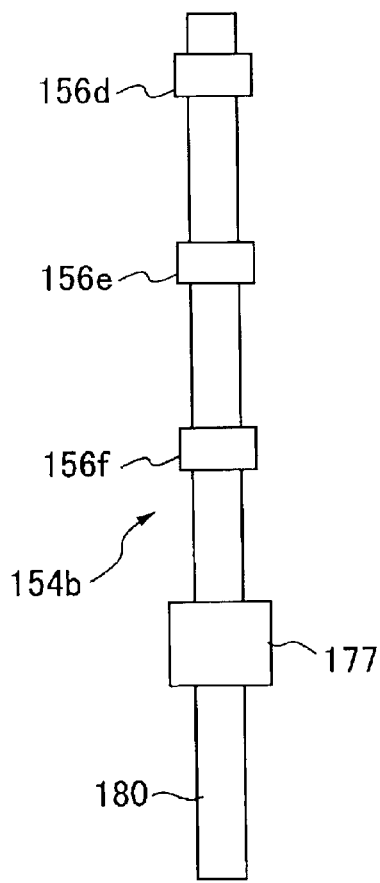
FIGS. 25A to 25F illustrate an embodiment of an omnidirectional optical sensor in the construction machine control system according to the present invention.
Figure 25B:
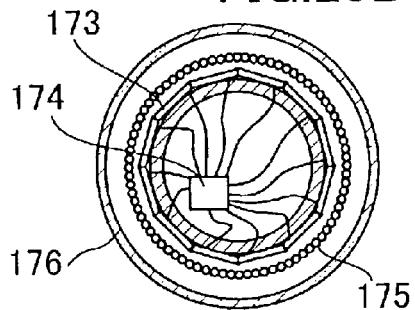
Figure 25C:
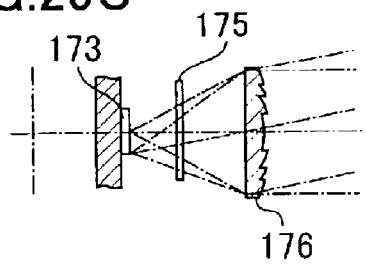
Figure 25D:
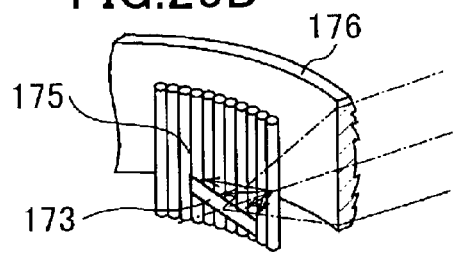
Figure 25E:
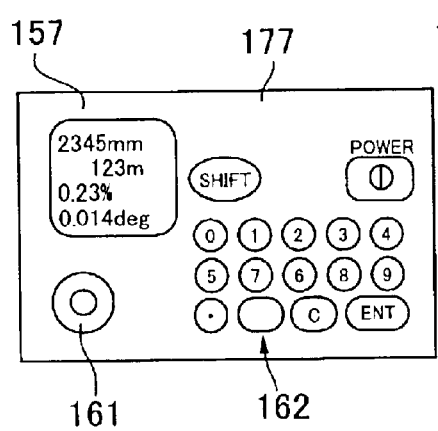
Figure 25F:
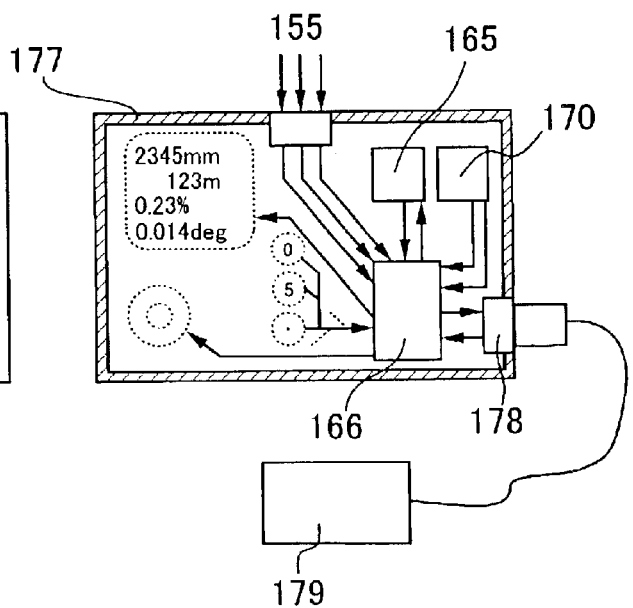

FIGS. 25A to 25F illustrate an embodiment of an omnidirectional optical sensor 154b. As can be seen in FIG. 25A, the omnidirectional optical sensor 154b is comprised of a hole 180, three light receiving sections 155d, 155e and 155f, and an optical sensor controller 177. The three light receiving sections 155d, 155e and 155f are respectively attached to the pole 180 equidistant to each other, and the optical sensor controller 177 is attached to a lower part of the pole. As recognized in FIGS. 25B to 25D, each of the light receiving sections 155d, 155e and 155f has an annular Fresnel lens 176, an annular fiber sheet 175, and annularly chained light receiving elements 173, and these components are all concentrically deployed. Inside the annularly chained light receiving elements 173, a light receiving element controller 174. As shown in FIGS. 25E and 25F, the optical sensor controller 177 has a display 157, an alarm 161 such as a buzzer, entry keys 162, a memory 165, an arithmetic operation unit 166 determining a state of received light, and a transmitter 178 for external communication.

When the fan-shaped laser beam sweeps any of the light receiving sections, the cylindrical Fresnel lens focuses incident light onto the light receiving elements 173 through the fiber sheet 175. Upon receiving the light, the light receiving elements 173 transmit a signal due to the light to the light receiving element controller 174. The light receiving element controllers 174 built in any of the light receiving sections 155d, 155e and 155f transfer the signal to the optical sensor controller 177. The optical sensor controller 177 processes the signal as the optical sensor 154 does.

Figure 26:
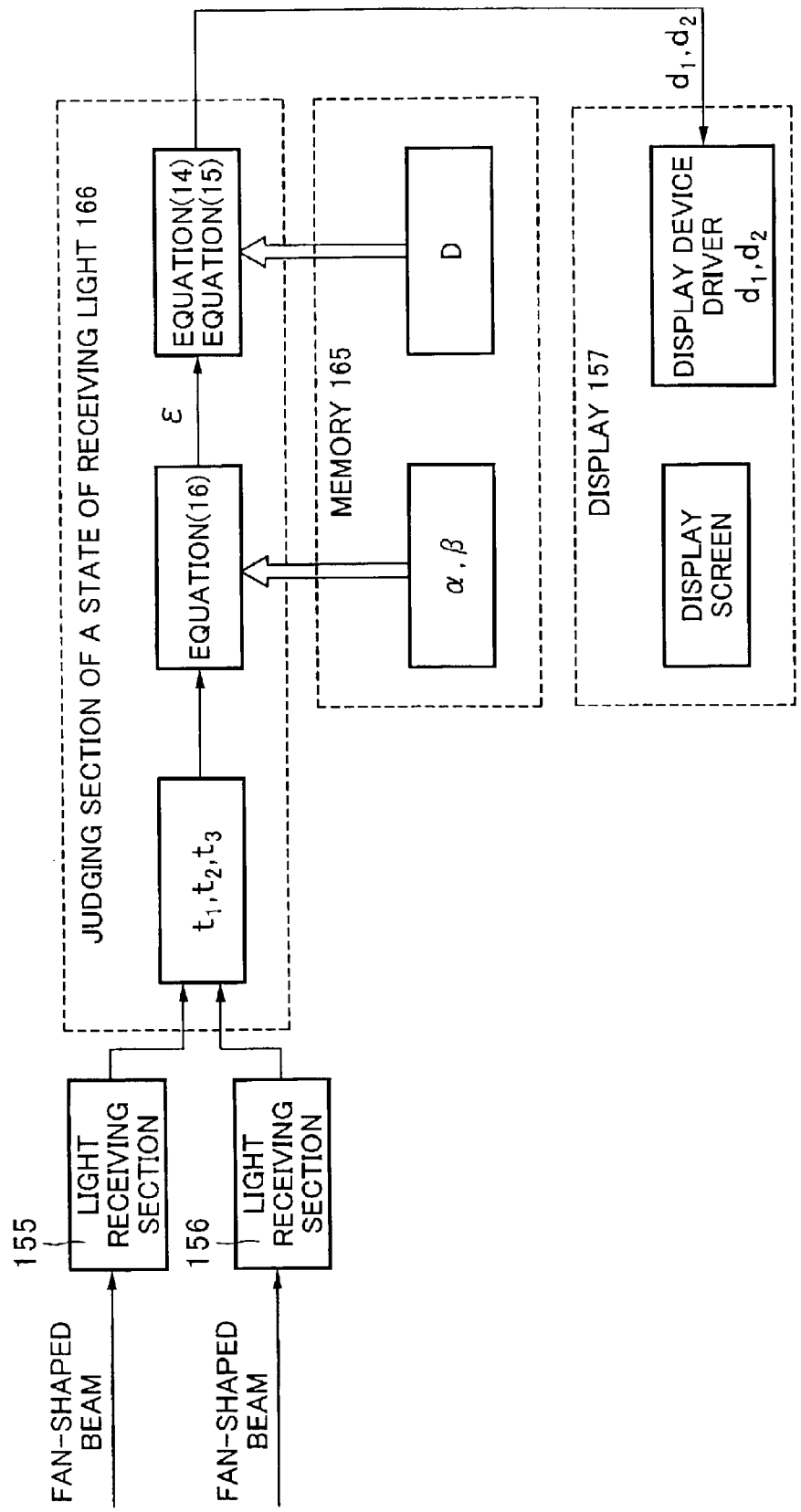
FIG. 26 is a block diagram showing a stepwise procedure of determining an elevation in the construction machine control system according to the present invention.

(1.4) Operation of Construction Machine Control System
(1.4.1) Measurement of Elevations by Optical Sensor
(1.4.1.1) Measurement by Means of Optical Sensor Having Two Light Receiving Sections A procedure of determining the relative elevation of the optical sensor to the rotary laser apparatus 151 will be described. The elevation of the optical sensor 154 is determined in the procedure as illustrated in FIG. 26. The fan-shaped beams 152 and 13 emitted from the rotary laser apparatus 151 are received at the light receiving sections 155 and 156. Upon receiving the beams, the light receiving sections 155 and 156 generate signals as depicted in FIG. 19. The signals are transmitted to the arithmetic operation unit that determines a state of received light in the optical sensor 154, so as to compute the time delays $t_1$, $t_2$ and $t_3$.

In the arithmetic operation unit 166 determining a state of received light, the formula (16) is solved for the inclination angle $\epsilon$ from the elevation or depression angles $\alpha$ and $\beta$ of the fan-shaped beams 152 and 153 and the time delays $t_1$, $t_2$ and $t_3$. The arithmetic operation unit 166 further uses the equations (14) and (15) to obtain vertical distances $d_1$ and $d_2$ between the horizontal reference plane and the light receiving sections 156 and 156 from the distance D between the light receiving sections 155 and 156 which is stored in the memory 165, the time delays $t_1$, $t_2$ and $t_3$, and the inclination angle $\epsilon$ previously computed.

The computation results $d_1$ and $d_2$ are transferred to the display 157 for indication, and thus, measurement of the relative elevation of the optical sensor 154 to the rotary laser apparatus 151 is accomplished.

Figure 16B:
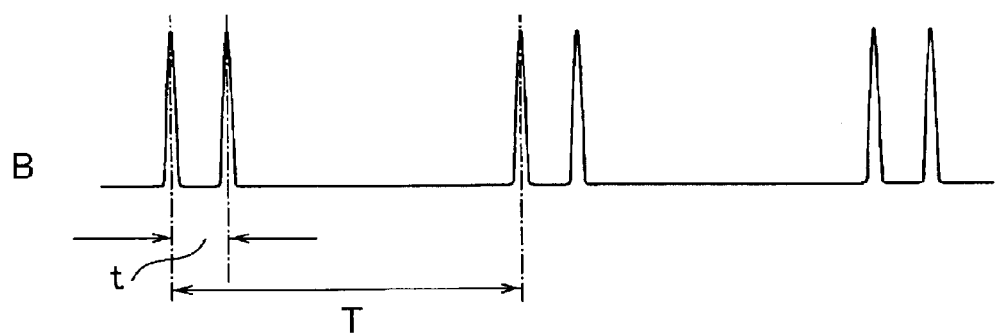
Figure 27:
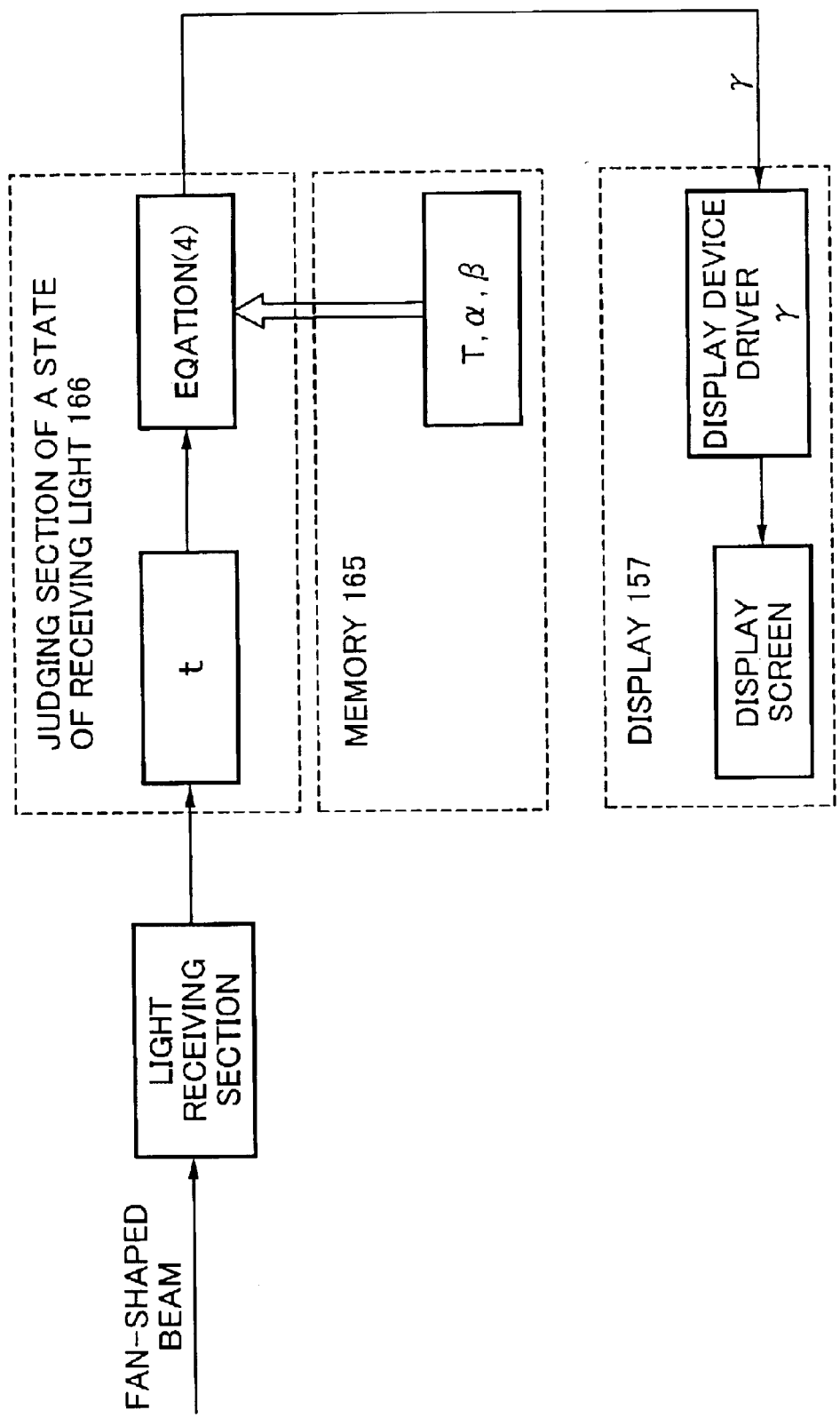
FIG. 27 is a block diagram showing a stepwise procedure of determining an elevation with the optical sensor having a single light receiving section in the construction machine control system according to the present invention.

(1.4.1.2) Measurement of an Elevation by Means of Optical Sensor Having a Single Light Receiving Section With reference to FIG. 27, discussed now will be a procedure of determining an elevation of the optical sensor having only a single light receiving section. When the fan-shaped beams 152 and 153 are received at the light receiving section, signals as depicted in FIGS. 16A, 16B are generated. The signals are transferred to the arithmetic operation unit 166 to compute the time delay t between detections of the beams. Substituting the time delay t, the rotation cycle T of the fan-shaped laser beams 152 and 153, and the elevation or depression angles $\alpha$ and $\beta$ of the same into the formula (4), the angle $\gamma$ is obtained. As mentioned above, the angle $\gamma$ is an angle at which a straight line passing the point B of the light receiving section and the rotation center C of the fan-shaped laser beams meets the horizontal plane. The results of the angle $\gamma$ is transferred to the display 157 for indication. A vertical distance or an elevation between the light receiving section and the horizontal plane is computed by the equation (18) and the distance L (a horizontal distance from the light receiving section to the rotation center C) that is obtained by the GPS as mentioned later.

(1.4.1.3) Measurement of an Elevation by Means of Optical Sensor Having Three or More Light Receiving Sections In the alternative embodiment where there are three or more light receiving sections, three of them receive the fan-shaped beams at the same time. Then, among data of received light, selected are two sets of the data characterized by no signal interference because of a sufficiently long delay of time between the detected fan-shaped beams. Computation after the selection of two sets of the data of received light is completely the same as the procedure illustrated in FIG. 26. In this case, however, the distance D between two of the selected light receiving sections is used.

An alternative rotary laser apparatus 151a emits two laser beams of different polarizations, and an alternative optical sensor 154a is capable of distinguishing the fan-shaped laser beams of different polarizations one from another. Hence, in the event of a short delay of time between detections of the laser beams, measurement can be accomplished with high accuracy. In this case, also, the measuring procedure is the same as that in the aforementioned embodiment.

(1.4.2) Measurement of Positions by Means of GPS

Figure 28:
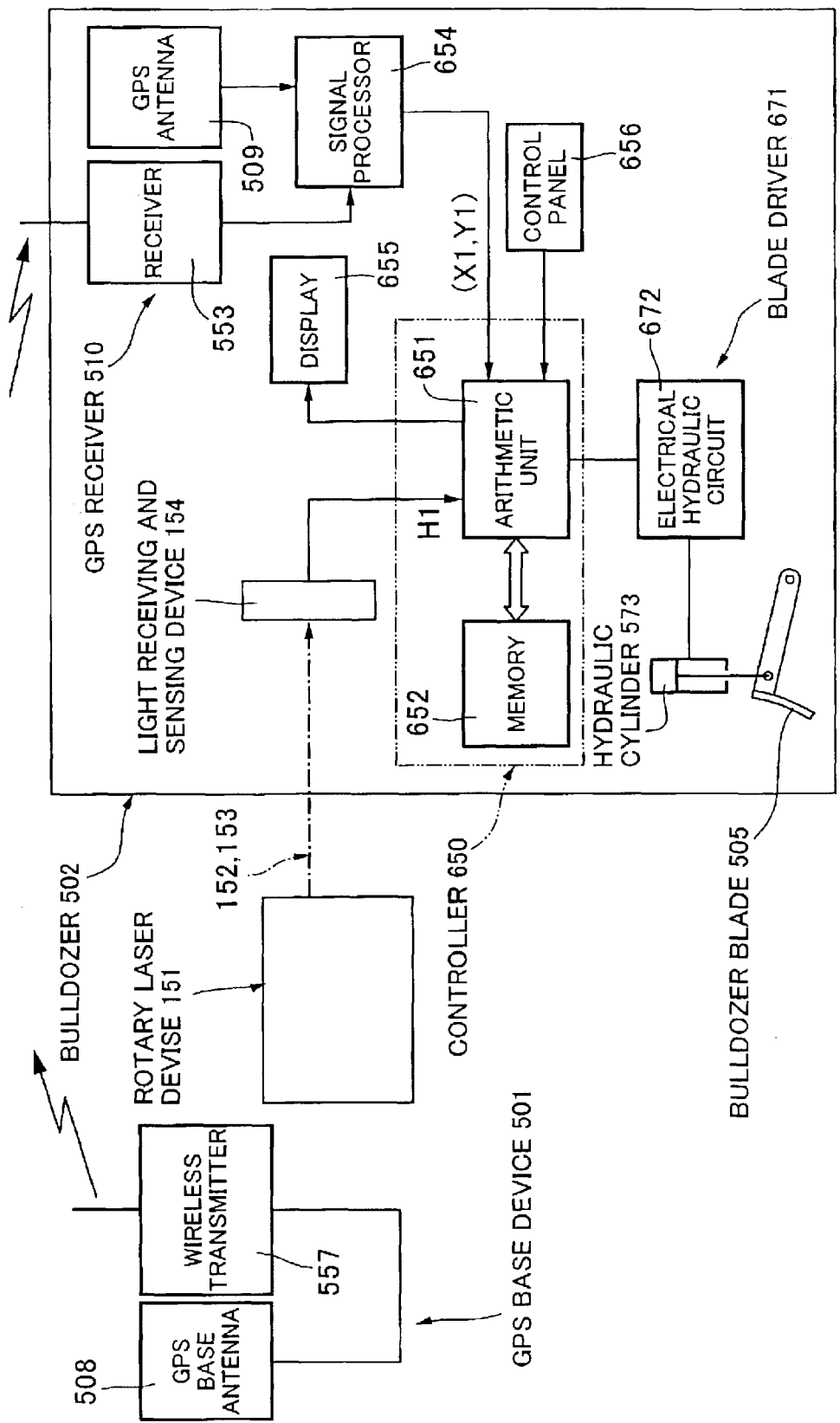
FIG. 28 is a block diagram showing an operation of the construction machine control system according to the present invention.

With reference to FIG. 28, a method of determining positions by means of a GPS will be described. A construction machine such as a bulldozer 502 has the optical sensor 154, a GPS receiver 510, a controller 650, a display 655, a control panel 656, a blade actuator 671, a hydraulic cylinder 573, and an attachment for leveling such as a blade 505. The GPS receiver 510 is provided with a GPS antenna 509, a receiver 553, and a signal processor 654. The controller 650 includes an arithmetic operation unit 651 and a memory 652. The blade actuator 671 includes an electrical hydraulic circuit 672 and an electromagnetic valve (not shown). The GPS base device 501 has a GPS base antenna 508 and a wireless transmitter 557 and is located adjacent to the rotary laser apparatus 151.

The GPS antenna 509, which receives radio waves from a satellite, is attached to a place such as a roof of the bulldozer which is exposed to the radio waves without shield. On the other hand, the GPS base antenna 508 mounted on the GPS base device 501 also receives radio waves from the satellite. The radio waves receives at the GPS base antenna 508 is converted and then transmitted to the receiver 553 mounted on the construction machine 502 via the wireless transmitter 557. The radio waves received at the GPS antenna 509 and the receiver 553, respectively, are transferred to the signal processor 654, amplified therein, and then, converted to a signal of a predetermined form. The signal processor 654 processes the radio waves received at the GPS antenna 509 and the GPS base antenna 508 and computes positions of those antennas in the horizontal plane and a distance between the antennas. From the computation results of the positions and distance, a distance from the rotary laser apparatus 151 and the optical sensor 154 mounted on the construction machine 502 is obtained through arithmetic operations.

Measurement of positions by means of the GPS includes kinematics, and any other methods of detecting a moving point on the real time basis.

(1.4.3) Control of Construction Machine

With reference to FIG. 28, control of the construction machine will be described.

The memory 652 incorporated in the controller 650 stores various data such as a landform based upon builder's working drawing, altitudes of the ground relative to two-dimensional coordinates, a position of the rotary laser apparatus 151 in the horizontal plane, an elevation of the rotary laser apparatus 151, and a height from the edge 505a of the attachment blade to the reference position of the optical sensor 154. The memory 652 also stores a program of controlling the blade 505 in relation with the data on the position of the construction machine 502 within the horizontal plane, the elevation of the same, and the landform derived from the working drawing. If it is desirable to perform the above-mentioned arithmetic operations in some part of the controller 650 to obtain the elevation of the optical sensor 154 from the time delay between detections of the fan-shaped beams, the arithmetic operations should be stored in the memory 652. The controller 650 may be any device as represented by personal computer.

Position data (X1, Y1) of the construction machine 102 and the elevation data H1 are input to the arithmetic operation unit 651 in the controller 650, where the former data is transferred from the signal processor 654 and the latter data is received from the optical sensor. The control program of the blade 505 takes the input position data (X1, Y1) and the altitude data of the ground relative to the two-dimensional coordinates which is stored in the memory in advance, and then computes the desired ground level H2 in the position (X1, Y1). The optical sensor 154 is attached to the pole 506, and the optical sensor 154 and the pole 506 together move upward and downward along with the blade 505. A distance H3 from the optical sensor 14 to the edge 505a of the blade is preliminarily stored in the memory 652. Subtracting the distance H3 from the elevation data H1, a current height H4 of the edge 505a of the blade is obtained. After that, the desired ground level H2 and the height H4 of the blade edge 505a are compared to calculate a displacement of the blade 505.

The displacement of the blade 505 computed by the controller 650 is transferred to the blade actuator 671. The blade actuator 671 opens and closes the electromagnetic valve of the electrical hydraulic circuit 671, depending upon an input of the displacement. Specifically, the arithmetic operation unit 651 gives the electrical hydraulic circuit 672 a control command of opening or closing the electromagnetic valve in accordance with a required sequence. Opening and closing the electromagnetic valve permits pressure oil to be supplied to or evacuated from the hydraulic cylinder 573, or rather is adjusts a flow rate of the pressure oil to move the hydraulic cylinder 573 in a required direction at a required speed, thereby moving the blade 505 up and down in any desired direction at any desired speed. A position of the blade 505 or a state of excavation is represented on the display 655.

The actuation of the blade 505 may be manually performed in some direct fashion. For instance, a difference of the position data (X1, Y1) of the construction machine 502, the height H4 of the blade edge 505a, or the desired ground level H2 from the current height of the edge is represented on the display 655. The operator of the construction machine manipulates the control panel 656 while watching the display 655, and hence, he or she can maneuver the blade 505 to level H4 to H2. In response to entries on the control panel 656, entry signals are transferred to the arithmetic operation unit 651, which forces the electrical hydraulic circuit 672 and hydraulic cylinder 573 to move the blade 505. Without an aid of the arithmetic operation unit 651, the operator himself or herself may manipulate the blade actuator.

In the above embodiment, the optical sensor 154 is attached to the pole 506 coupled to the blade 505, or alternatively, the optical sensor 154 may be mounted on the body of the construction machine. In this situation, the distance H3 between the optical sensor 154 and the blade 505 is varied, and hence, after determining extension and retraction of the hydraulic cylinder 573 or measuring a rotation angle of an arm supporting the blade 505, the distance H3 from the optical sensor to the blade 505 must be calculated again. The updated distance H3 is used in the arithmetic operations in the arithmetic operation unit 651 to renew the height H4.

Although the blade control of the bulldozer has been described, any other attachment such as roller may be used to reshape the ground.

The control procedure as mentioned above may be effective without change in applications of the optical sensor 154a designed to receive the two fan-shaped laser beams of different polarizations and the optical sensor having three or more light receiving sections.

As has been described, with the construction machine control system according to the present invention, a task of leveling the ground is automated as required in the blueprint data, and the data represented on the display 655 is useful to manual operation of leveling the ground. This enables any worker of poor expertise to easily manipulate the leveling machine in a construction site.

(1.4.4)

In the aforementioned embodiment of the present invention, determination of positions in the horizontal plane by the GPS is performed on both the construction machine 502 and the GPS receiver 510. In an ordinary use, however, the rotary laser 151 is located in a fixed position without moving frequently, and therefore, once the position of the rotary laser apparatus 151 is determined and entered as input data to the signal processor 654 or the arithmetic operation unit 651 of the construction machine 502, the GPS 501 is needless or even may be omitted.

(1.4.5) Control over More than One Construction Machines

Discussed below will be simultaneous use of more than one bulldozers to level the ground. As shown in FIG. 1, the rotary laser apparatus 151 just emits the fan-shaped laser beams 152 and 153 while the GPS 501 simply transmits position data received at the GPS antenna 508, and installing an additional construction machine 502b with the same apparatuses enables the construction machine 502b can be put under control in the same manner. Specifically, the optical sensor 154b mounted on the construction machine 502b receives the fan-shaped laser beams 152 and 153, the receiver 553b receives radio wave from the wireless transmitter 557, the GPS antenna 509b receives radio waves from a satellite, and so forth, and thus, completely the same control is attained. Similarly, a further increased number of the construction machine can be manipulated at the same time under control.

(1.4.6) Operation of Rotary Laser Apparatus

The rotary laser apparatus 151 does not have to emit fan-shaped laser beam through the whole circumferential trajectory of the revolution. In the above discussion, the rotary laser apparatus 151 emits the laser beam throughout the circumferential trajectory, but the laser emission may be limited to a range defined by a working area of the construction machine 502 that receives the beam. In such a case, the laser illuminator 132 (see FIG. 5) should sometimes continually irradiate, but it may come up only for a restricted period of time when laser beam has to be directed to the construction machine, which leads to a reduced power consumption in the rotary laser apparatus.

To complete the above mentioned system structure, a communication means must be mounted on the construction machines 502 to transmit position information of the construction machines to the rotary laser apparatus 151. The rotary laser apparatus 151 should have a means for receiving the position information that is used to compute directions of the deployed construction machines 502. Laser beam should be emitted for a restricted period of time when the rotary unit 105 of the projector 103 (see FIG. 4) turn to face a range covering the above mentioned directions, and for that purpose, a controller is provided to control rotation of the motor 106 and irradiation of the laser illuminator 132. The laser emission range of the rotary unit 105 is given by the encoder 117 (see FIG. 5).

With a similar system structure, the motor 106 of the rotary laser apparatus 151 may be activated so that the fan-shaped laser beams 152 and 153 sweep reciprocally only in the working area of the deployed construction machines 502.

(1.5) Other Advantages of the Construction Machine Control System of the Invention In a construction machine control system incorporated with the prior art rotary laser apparatus, it is merely determined whether the light receiving section is located in the horizontal plane onto which laser beams are directed or it is in an inclined plane, and therefore, the single laser projector is insufficient to level simultaneously two or more areas of different plane. On the contrary, the rotary laser apparatus used in the construction machine control system according to the present invention is capable of determining elevations in relation with the fan-shaped laser beams, and therefore, it enables more than one construction machines each having the optical sensor 154 to simultaneously level the ground in several positions for any elevation as desired in a single circular sweep of the laser beams.

Moreover, with the construction machine control system according to the present invention, not only the ground of horizontal surfaces but of slopes or contours can be leveled easily and assuredly without expertise skills of the worker. Additionally, since the identical rotary laser apparatus controls more than one construction machines, undesired functions or malfunctions of the construction machines due to interference by other laser apparatus can be advantageously avoided.

(2) Embodiment 2

In the following discussion, varied or modified points of a second preferred embodiment of the present invention from the first embodiment will be emphasized. Thus, any of particulars and details omitted herein has already been discussed in terms of the first embodiment.

(2.1) Entire Structure of the Construction Machine Control System

Figure 29:
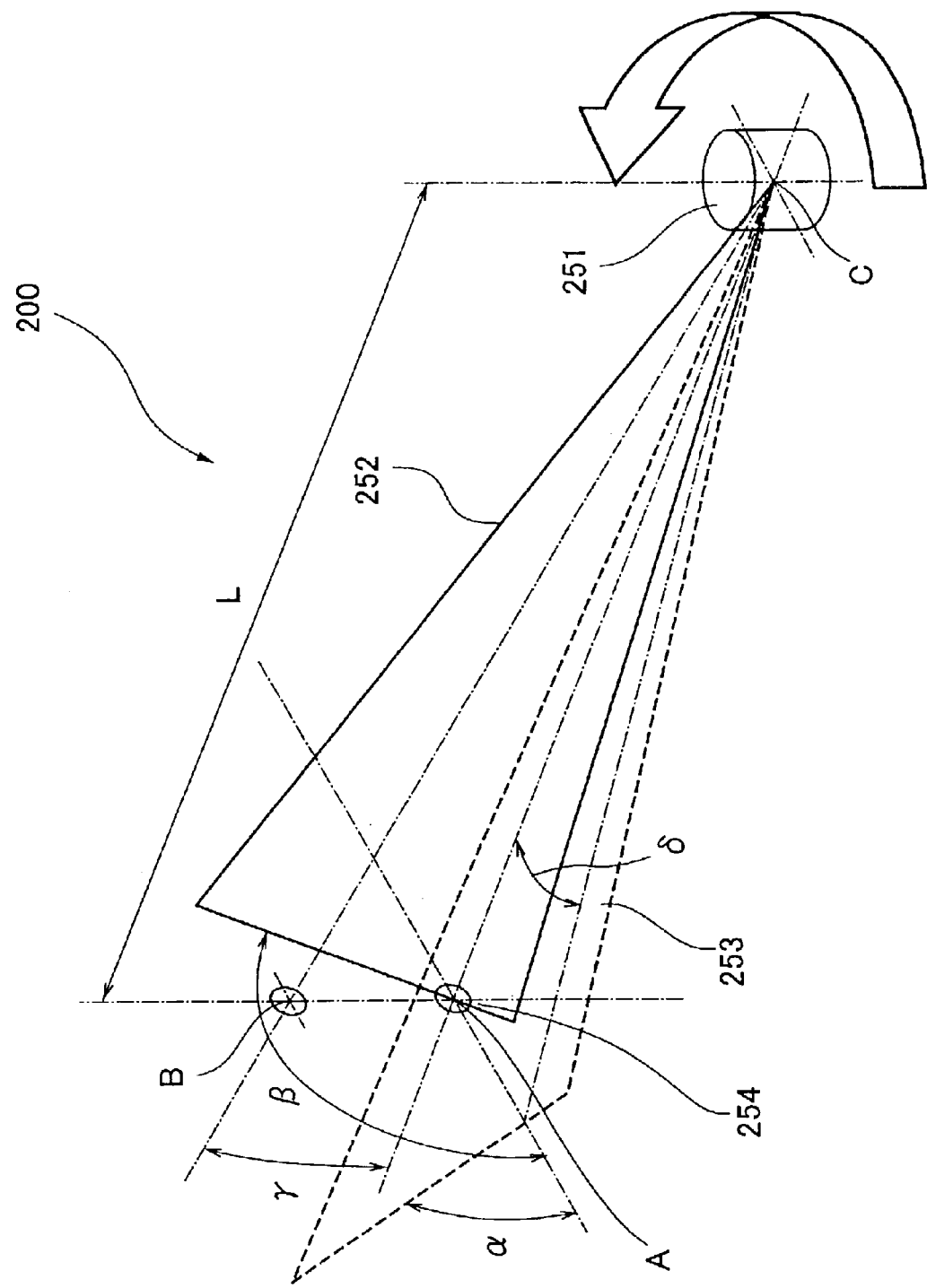
FIG. 29 illustrates a positional relation of the rotary laser apparatus to the optical sensor in a second preferred embodiment of the construction machine control system according to the present invention.

In the second preferred embodiment according to the present invention, as shown in FIG. 29, the rotary laser apparatus 151 used in the first preferred embodiment is replaced with a rotary laser apparatus 251 that emits two diverging or fan-shaped laser beams 252 and 253 of different wavelengths, and the optical sensor 154 in the first embodiment is replaced with an optical sensor 254 that is capable of identifying the two fan-shaped laser beams of different wavelengths. Other components are almost the same as those in the first preferred embodiment.

(2.2)

Figure 30:
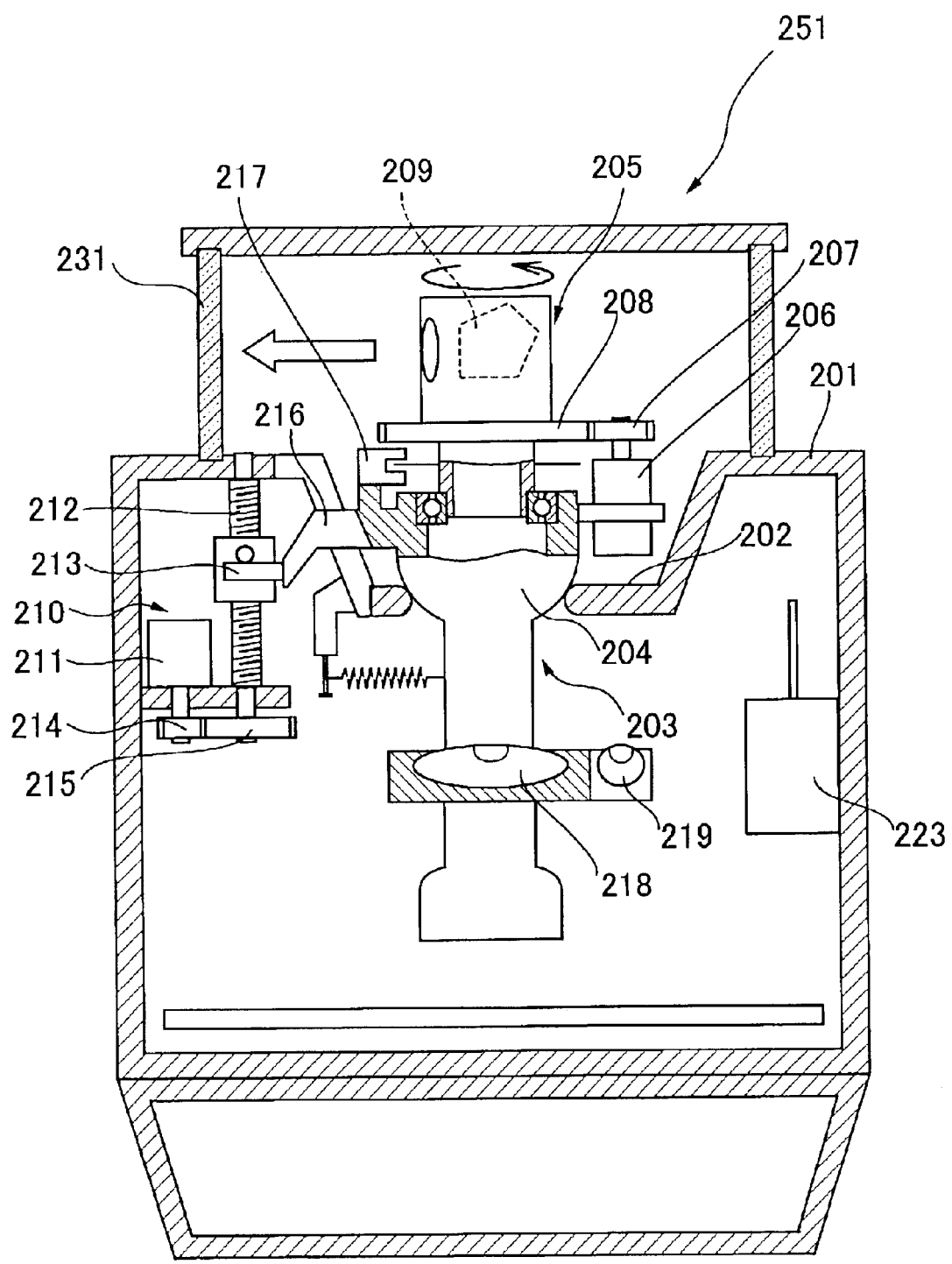
FIG. 30 is a sectional view showing a rotary laser apparatus in the second preferred embodiment of the present invention.

FIG. 30 shows the second preferred embodiment of the rotary laser apparatus 251 that emits the fan-shaped laser beams of different wavelengths. In the second preferred embodiment of the present invention, components other than a laser projector 203 and its rotary unit 205 are similar to those in the first embodiment. All the remaining components shown in FIG. 30 corresponding to their counterparts in the first embodiment are denoted by reference numerals all of which have a prefixed 2 to lower two digits instead of 1.

Although two fan-shaped beams of different polarities are used in the first embodiment, two fan-shaped beams of different wavelengths are used in the second embodiment.

In the second embodiment, two fan-shaped beams 252 and 253, before emitted from the rotary laser apparatus, are modulated to be different in wavelength from each other so that they can be distinguished from each other. With such a configuration, the similar effect to that attained with two differently polarized fan-shaped laser beams can be obtained.

Figure 31:
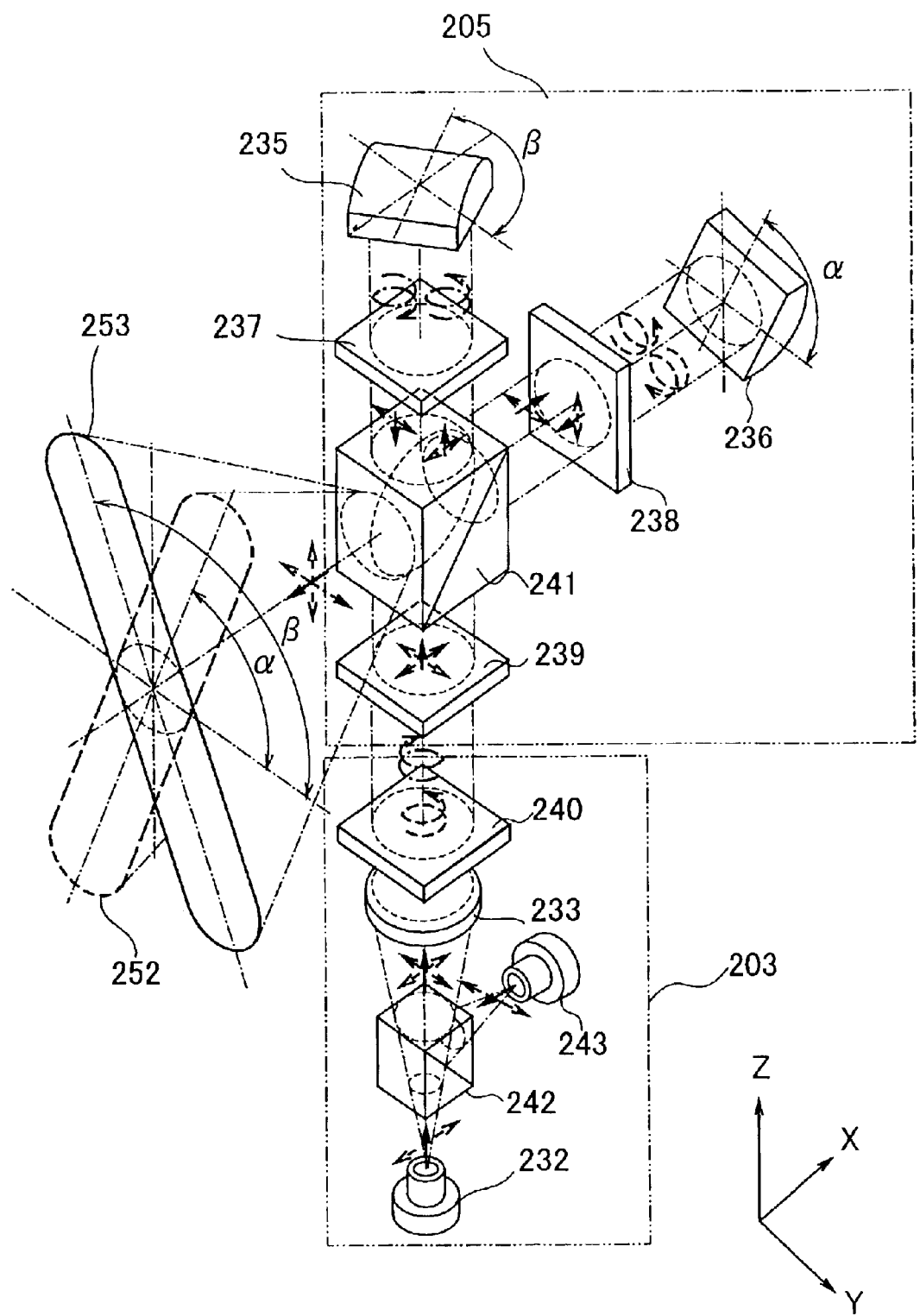
FIG. 31 is an exploded view of the rotary laser apparatus that emits two laser beams of different wavelengths in the second preferred embodiment of the present invention.

FIG. 31 depicts the laser projector 203 and the rotary unit 205 in the rotary laser apparatus 251 according to the present invention. As shown in FIG. 31, the laser projector 203 is incorporated with two laser illuminators 232 and 243, which emit light of different wavelengths. When laser illuminators 232 and 243 are laser diodes, the emitted laser beams are linearly polarized. In FIG. 31, a direction of polarization of the laser beam from the laser illuminator 232 is denoted by broken line while a direction of polarization of the laser beam from the laser illuminator 243 is designated by dot-dash line. The laser beams are guided into a polarized beam splitter 242. The polarized beam splitter 242 transmits laser light that is emitted from the laser illuminator 232 and polarized in an X-direction, and it reflects laser light that is emitted from the laser illuminator 243 and polarized in a Y-direction orthogonal to the X-direction. The laser beams transmitted through or reflected from the polarized beam splitter 242, after collimated by a shared collimator lens 233, fall upon a one-quarter (¼) wave plate 240. The one-quarter wave plate 240 is oriented so that the laser beams from the laser projector 203 are of reversely circular polarization to each other. The laser beams transmitted through the one-quarter wave plate 240 are, after falling on a one-quarter wave plate 239, linearly polarized.

Although the rotary unit 205 is rotatably supported, this does not affect the laser beams emitted therefrom since they are circularly polarized, and the beams transmitted through the additional one-quarter wave plate 239 assume linear polarizations of which directions are determined by the one-quarter wave plate 239. The laser beams transmitted through the one-quarter wave plate 239 fall on the polarized beam splitter 241. The beam splitter 241 reflects the laser light from the laser illuminator 232 and transmits the laser light from the laser illuminator 243.

Falling on the one-quarter wave plate 238, the reflected laser light is circularly polarized and then reflected by a cylinder mirror 236. The cylinder mirror 236 is oriented so that the laser beam emitted from the rotary unit 205 meets the horizontal plane at angel α. The laser light reflected from the cylinder mirror 236 is transmitted through the one-quarter wave plate 238 again, and when exiting, the resultant light is polarized in a direction turned by 90° from the light incident upon the plate Thus, the laser light is, after transmitted through the one-quarter wave plate 238, transmitted through the polarized beam splitter 241 and then projected out of the rotary unit 205.

The laser light transmitted through the polarized beam splitter 241 is, after falling on the one-quarter wave plate 237, circularly polarized and then reflected from the cylinder mirror 235. The cylinder mirror 235 is oriented so that the laser beam projected out of the rotary unit 205 meets the horizontal plane at an angle β. The laser light reflected from the cylinder mirror 235 is transmitted through the one-quarter wave plate 237 again, and when exiting, the resultant light is polarized in a direction turned by 90° from the laser light incident upon the plate. In this way, the laser light is, after transmitted through the one-quarter wave plate 237, reflected by the polarized beam splitter 241 and then projected out of the rotary unit 205.

The polarized beam splitter 242 may be a die clock mirror.

(2.3) Optical Sensor

Figure 32A:
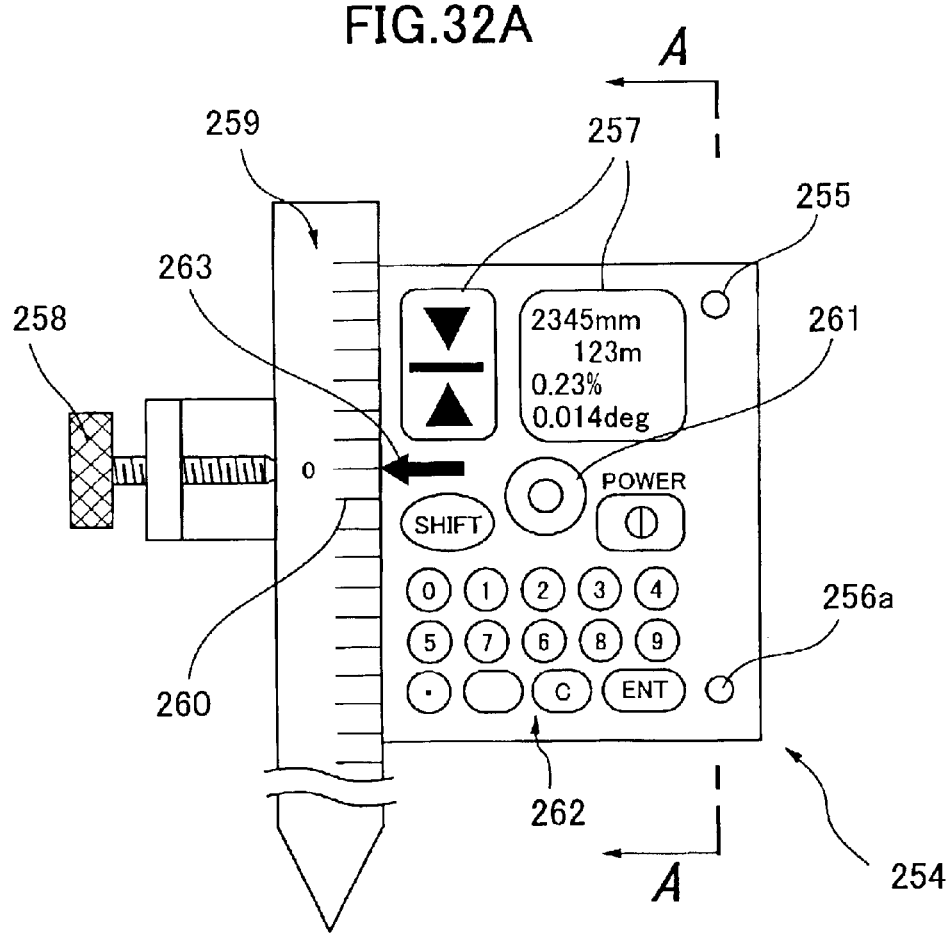
FIGS. 32A, 32B depict an arrangement of the light receiving section of the optical sensor in the second preferred embodiment of the present invention.
Figure 32B:
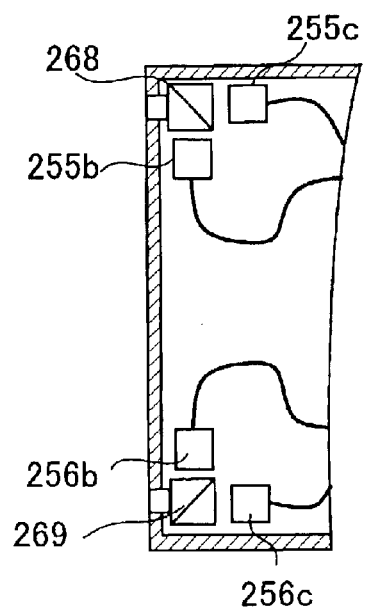

FIG. 32A is a front view showing an optical sensor 254 in the second embodiment of the present invention, and FIG. 32B is a sectional view taken along the line A-A of FIG. 32A. All the components are similar to those in the first embodiment except the light receiving section which identifies light from different wavelengths. All the remaining components shown in FIGS. 32A, 32B corresponding to their counterparts in the first embodiment are denoted by reference numerals all of which have a prefixed 2 to lower two digits instead of 1.

As shown in FIGS. 32A, 32B, the optical sensor 254 in the second embodiment identifies and distinguishes the fan-shaped beams 252 and 253 incident upon the light receiving sections 255 and 256 from their respective wavelengths. The light receiving sections 255 and 256 have die clock mirrors 268 and 269, respectively, that transmit or reflect laser light, depending upon the wavelengths of the incident laser beams. Light receiving sections 255c and 256c are provided for light transmitted through the die clock mirrors 268 and 269 while light receiving sections 255b and 256b are provided for light reflected from the mirrors, thereby distinguishing the wavelengths of the incident laser light.

(2.4) Operation of the Second Embodiment of the Construction Machine Control System The measurement procedure explained in terms of the first embodiment of the present invention may be used without change and modification in an application of the second embodiment of the present invention, namely, a construction machine control system 200.

(3) Embodiment 3

In the following discussion, varied or modified points of a second preferred embodiment of the present invention from the first embodiment will be emphasized. Thus, any of particulars and details omitted herein has already been discussed in terms of the first embodiment.

(3.1) Entire Structure of the Construction Machine Control System

Figure 33:
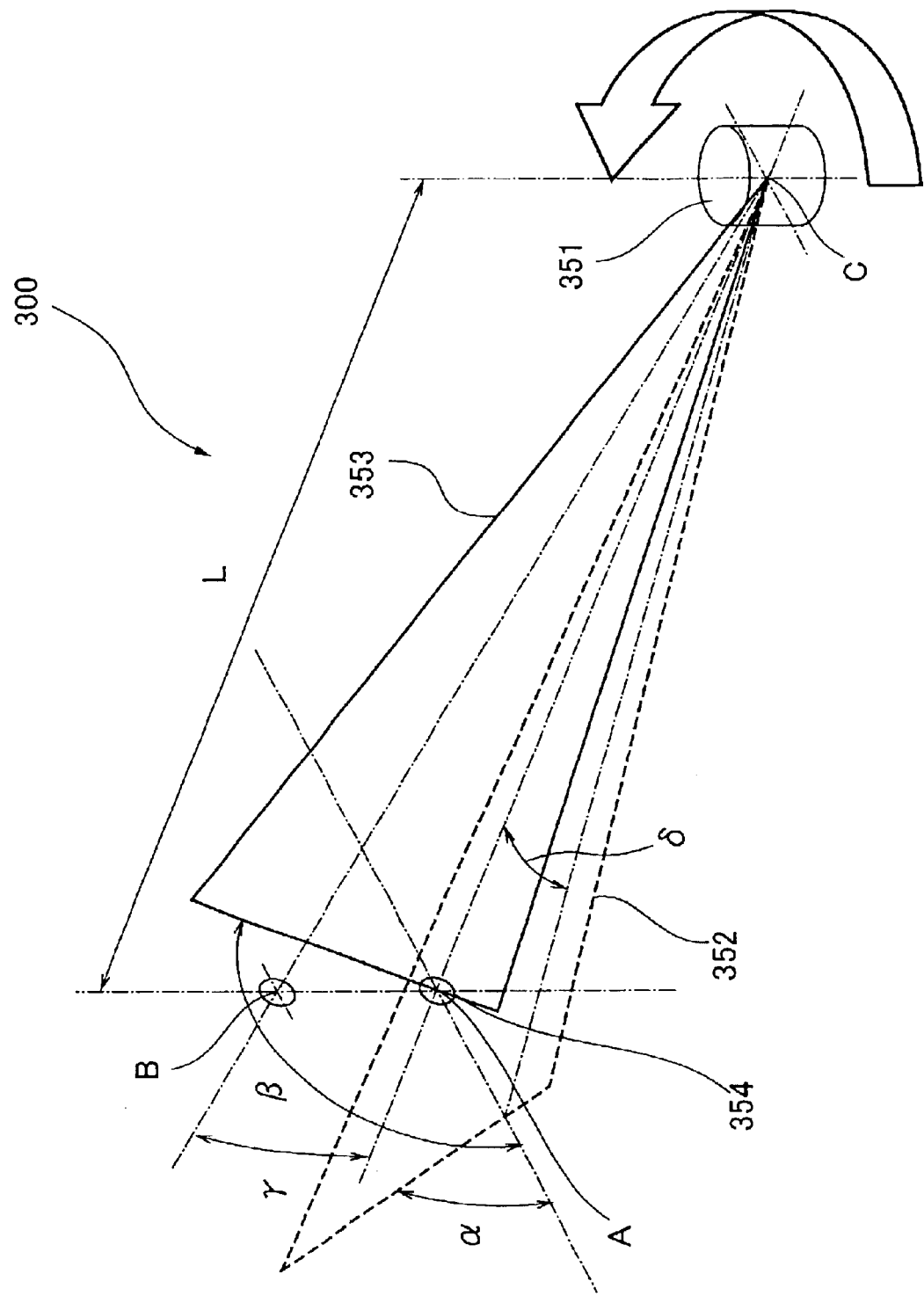
FIG. 33 illustrates a positional relation of the rotary laser apparatus to the optical sensor in a third preferred embodiment of the construction machine control system according to the present invention.

The third embodiment of the construction machine control system according to the present invention will be outlined. As shown in FIG. 33, the third preferred embodiment, namely, a construction machine control system 300 includes the rotary laser apparatus 351 and the optical sensor 354. The rotary laser apparatus 351 rotates about the point C while emitting diverging or fan-shaped beams 352 and 353, and the optical sensor 354 receives the fan-shaped beams 352 and 353. Details such as emission angles of the fan-shaped beams are all similar to those in the first embodiment.

Figure 34:
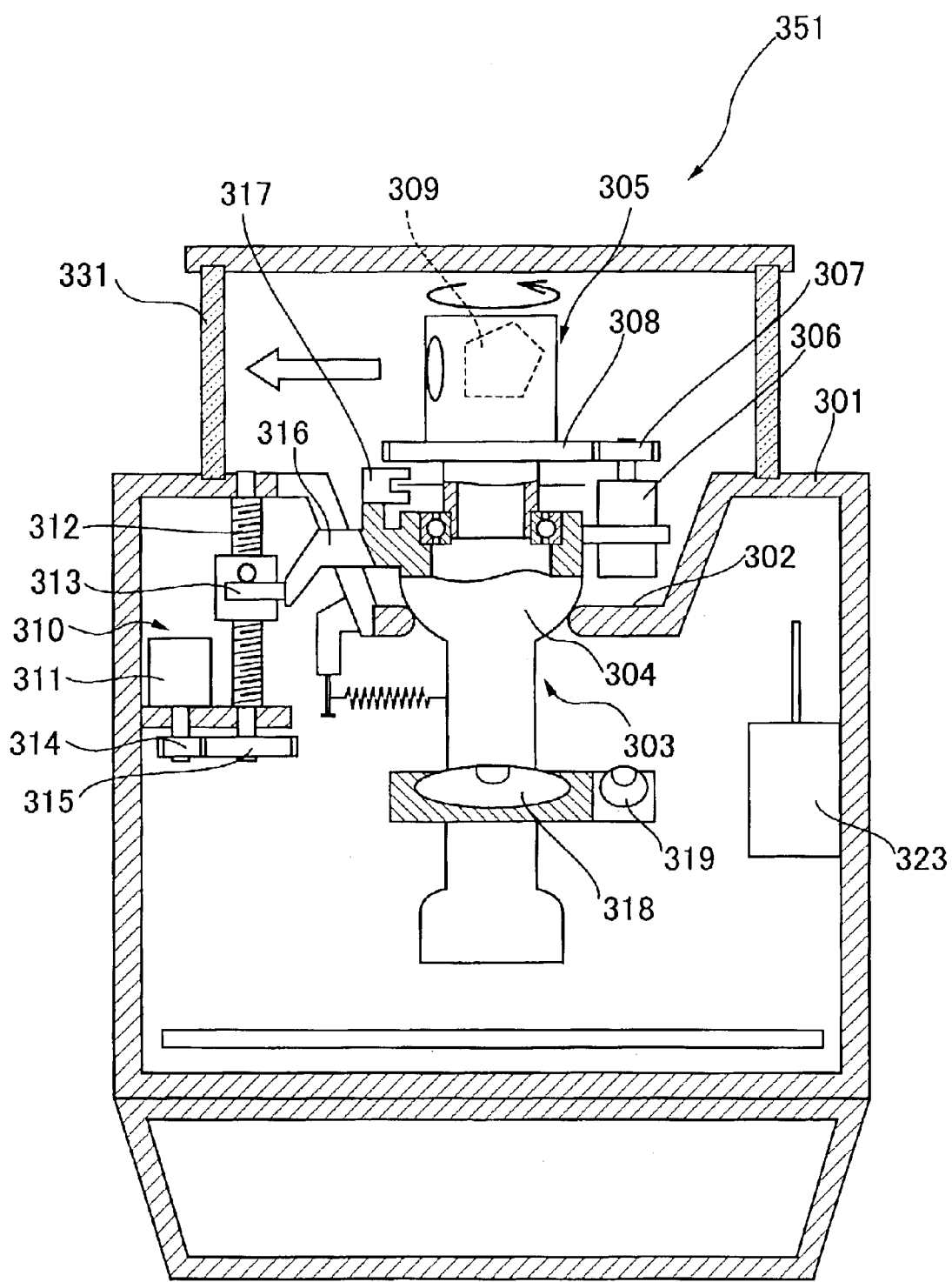
FIG. 34 is a sectional view of the rotary laser apparatus in the third preferred embodiment of the present invention.

(3.2) Rotary Laser Apparatus Emitting Two Fan-Shaped Laser Beams Modulated into Different Frequencies The third preferred embodiment, or namely, the rotary laser apparatus 351 is shown in FIG. 34. All the other components other than a laser projector 303 and a rotary unit 305 are similar to those in the first embodiment. In the third embodiment, all the remaining components shown in FIG. 33 corresponding to their counterparts in the first embodiment are denoted by reference numerals all of which have a prefixed 3 to lower two digits instead of 1.

Although the two fan-shaped beams of different polarizations are used in the first embodiment, two fan-shaped beams modulated into different frequencies are used in the third embodiment.

In the third embodiment, two fan-shaped beams 352 and 353 emitted from the rotary laser apparatus 351 are modulated to be different in frequency, so that the two beams can be distinguished from each other. Modified in this fashion, the similar effects to those attained by using the two fan-shaped beams of different polarizations can be obtained.

Figure 35:
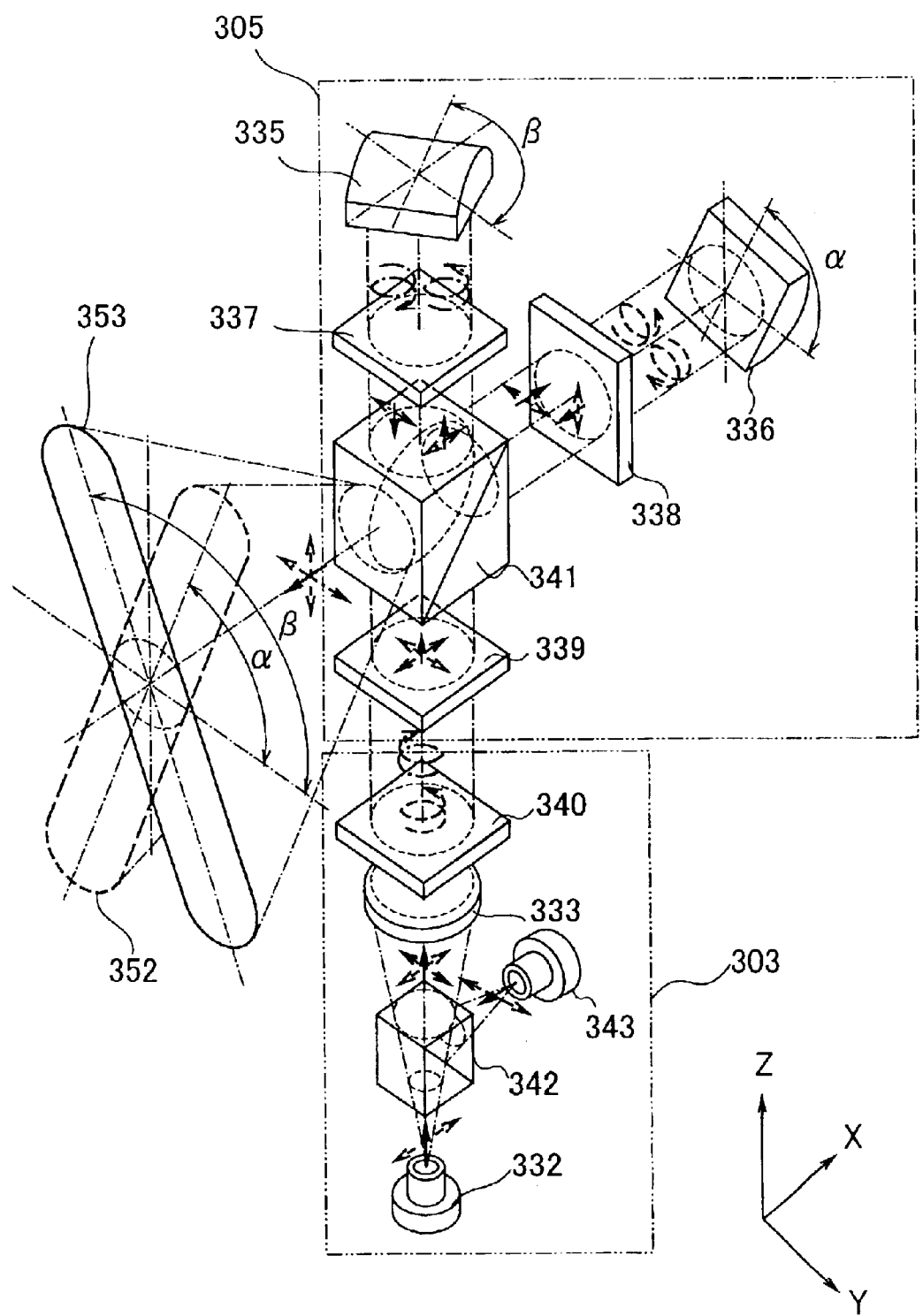
FIG. 35 is an exploded view of the rotary laser apparatus that emits two laser beams modulated into different frequencies in the third preferred embodiment of the present invention.

The laser projector 303 and the rotary unit 305 of the rotary laser apparatus 351 are shown in FIG. 35. As can be seen in FIG. 35, the laser projector 303 has two laser illuminators 332 and 343 which emit beams modulated into different frequencies. When the laser illuminators 332 and 343 are laser diodes, laser beams from them are linearly polarized. In FIG. 35, a polarization direction of laser light emitted from the laser illuminator 332 is denoted by broken line while a polarization direction of laser light emitted from the laser illuminator 343 is designated by dot-dash line. Optical system projecting laser light from the laser illuminators 332 and 343 is similar to that of the second embodiment.

(3.3) Optical Sensor

Figure 36A:
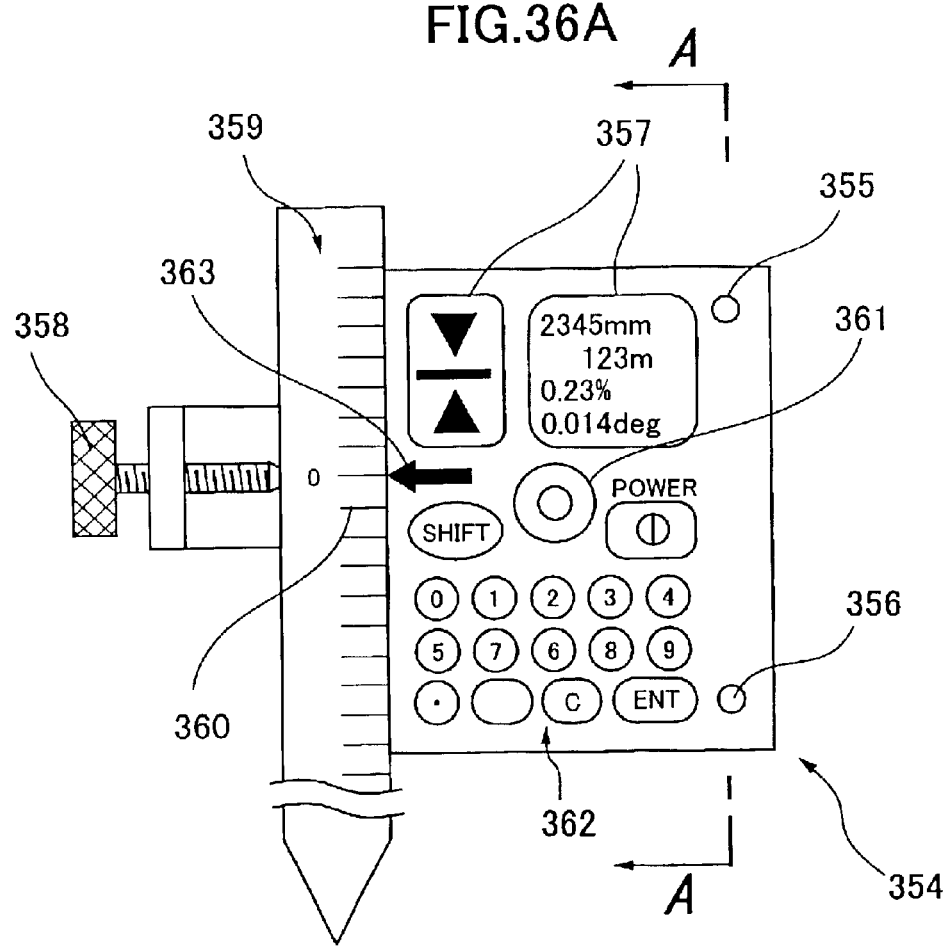
FIGS. 36A, 36B depict an arrangement of the light receiving section of the optical sensor in the third preferred embodiment of the present invention.
Figure 36B:
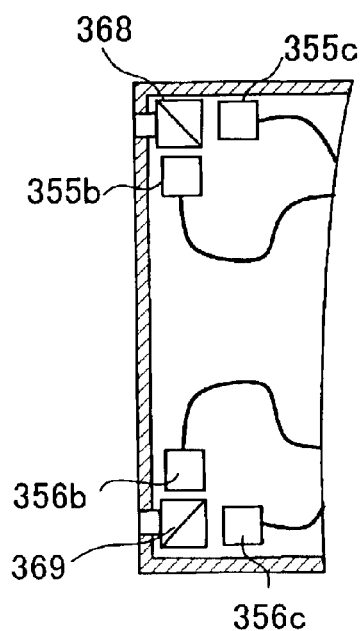

FIG. 36A is a front view showing an optical sensor 354 in the third embodiment of the present invention, and FIG. 36B is a sectional view taken along the line A—A of FIG. 36A. All the components are similar to those in the first embodiment except the light receiving section which identifies light from varied frequencies. All the remaining components shown in FIGS. 36A, 36B corresponding to their counterparts in the first embodiment are denoted by reference numerals all of which have a prefixed 3 to lower two digits instead of 1.

As shown in FIGS. 36A, 36B, the optical sensor 354 in the third embodiment has an arithmetic operation unit 366 that judges a state of received light, and it is used to identify and distinguish the fan-shaped beams 352 and 353 incident upon the light receiving sections 355 and 356 from their respective frequencies. The light receiving sections 355 and 356 have beam splitters 368 and 369, respectively, that transmit or reflect laser light, depending upon the frequencies of the incident laser beams. Light receiving sections 355c and 356c are provided for light transmitted through the beam splitters 368 and 369 while light receiving sections 355b and 356b are provided for light reflected from the splitters, thereby distinguishing the frequencies of the incident laser light.

(3.4) Operation of the Third Embodiment of the Construction Machine Control System The measurement procedure explained in terms of the first embodiment of the present invention may also be used without change and modification in an application of the third embodiment of the present invention, namely, a construction machine control system 300.

(3.4.1) Modulation of Diverging Beams and Detection of Modulated Beams

Figure 38:
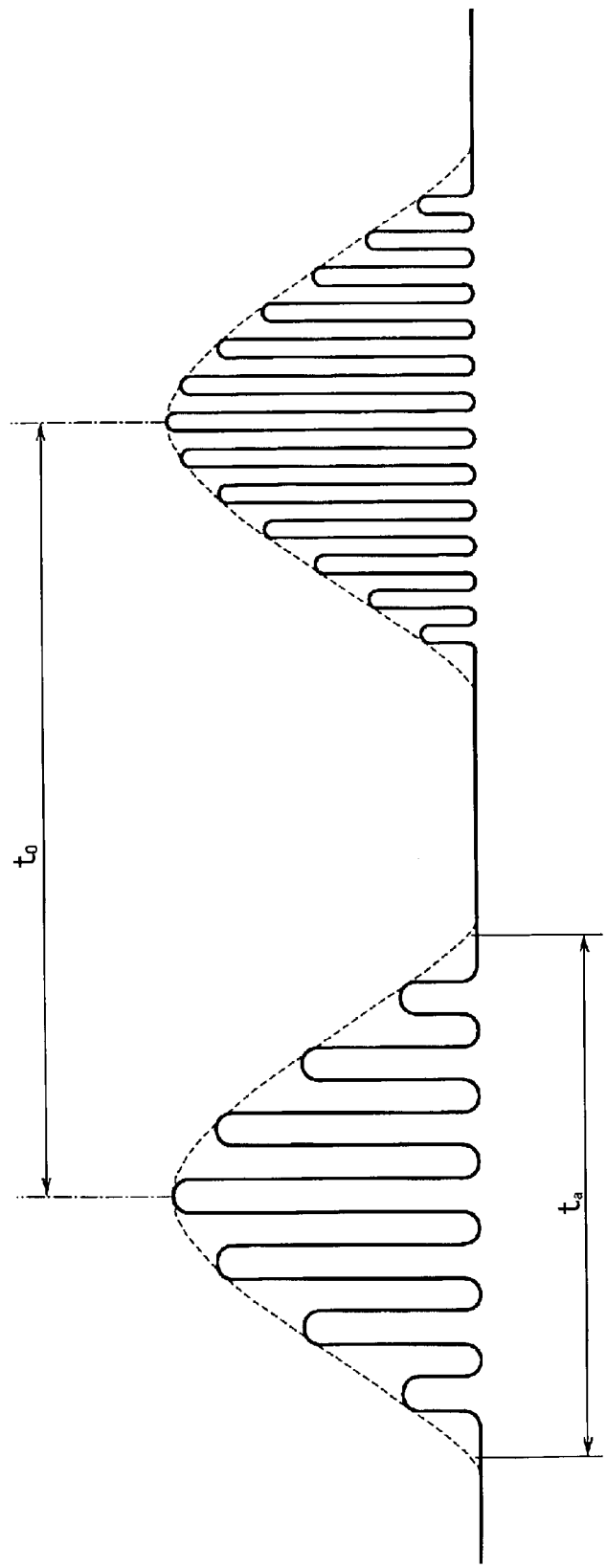
FIG. 38 depicts an example of two fan-shaped laser beams of different modulated frequencies detected at the light receiving section.

A manner of modulation of the two diverging or fan-shaped beams 352 and 353 will be described. The fan-shaped beams are, as illustrated in FIG. 37, modulated to come up and out in frequencies varied from each other. FIG. 38 shows an example of the fan-shaped beams 352 and 353 detected at the light receiving sections, respectively. Cycles of the flickering fan-shaped beams must be sufficiently varied from each other to distinguish the fan-shaped beams from each other. The cycles of the flickering should be sufficiently shorter than a period of time $t_a$ required to make the fan-shaped beams 352 and 353 sweep the light receiving sections 355 and 356 in the optical sensor 354. Detection signals of the fan-shaped beams 352 and 353 received at the light receiving sections are processed into expanded waves as represented by broken line in FIG. 38 so as to obtain a delay of time $t_0$ between detections of the fan-shaped beams 352 and 353.

The optical sensor is provided with a modulated frequency determining circuit, and the fan-shaped beams 352 and 353 are distinguishably detected. The modulated frequency determining circuit counts the number of pulses of each laser beam detected in a predetermined period of time to determine the modulated frequencies with which the two fan-shaped beams are identified. Distinguishing the two fan-shaped beams 352 and 353 upon detections permits a determination of whether the optical sensor is above or below the horizontal reference plane by a single measurement even if the optical sensor has only one light receiving section.

Figure 39:
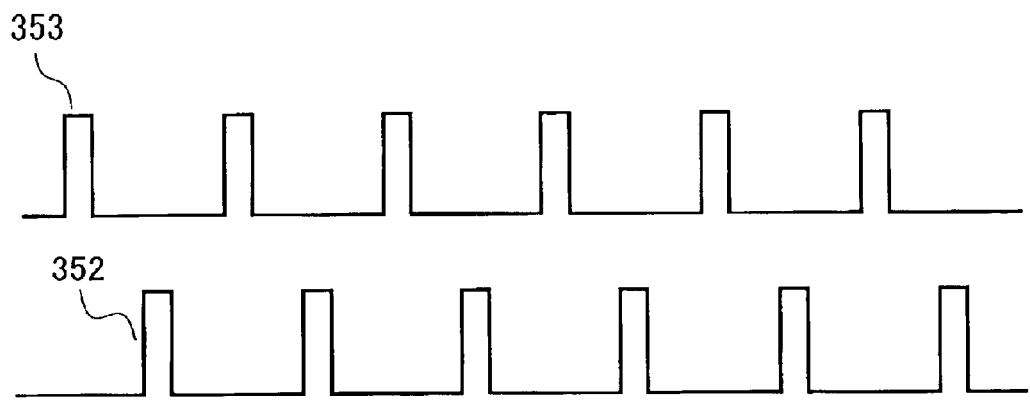
FIG. 39 depicts an example of two laser beams modulated to come up alternately.
Figure 40:
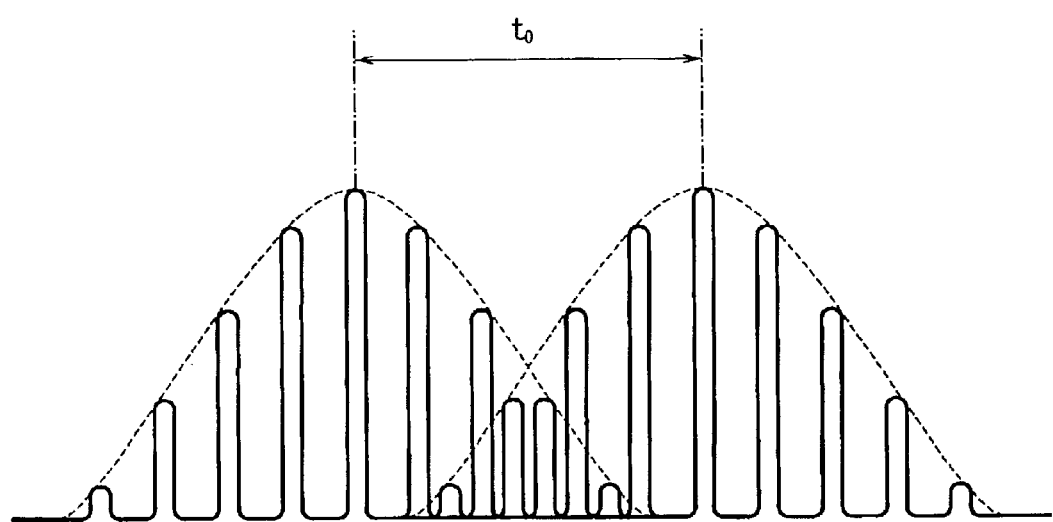
FIG. 40 depicts an example of signals produced in a situation where the light receiving section receives two laser beams modulated to come up alternately.

Alternatively, as shown in FIG. 39, the fan-shaped beams 352 and 353 may be modulated to illumine alternately. Modulated in this manner, the two fan-shaped beams, if detected one after another with a short delay of time, can be distinguished as can be seen in FIG. 40, and the time delay $t_0$ can be determined with accuracy.

Figure 41:
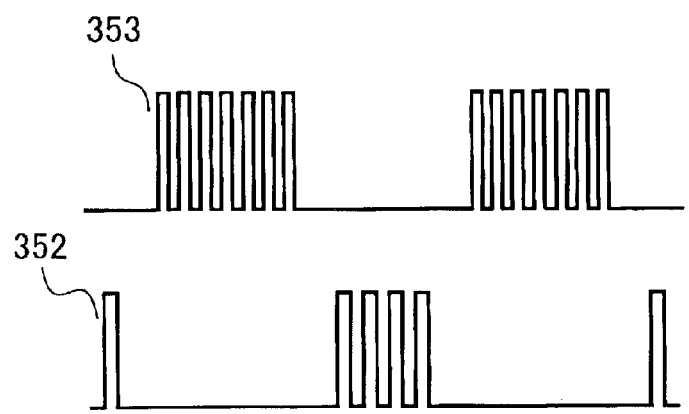
FIG. 41 depicts an example of two laser beams modulated to come up alternately and modulated to be of different frequencies.

Further alternatively, a modulation of combined modulation properties as in FIGS. 37 and 39 may be applied. Specifically, as shown in FIG. 41, the fan-shaped beams 352 and 353 are first modulated to illumine alternately and thereafter further modulated to flicker at fractions of cycles during which the fan-shaped beams continue to illumine. The cycles of the alternate lighting superposed with the fractions of the cycles of the flickering span alternate between the two fan-shaped beams 352 and 353. Modulated in this manner, the two fan-shaped beams 352 and 353 are distinguishable from each other, which enables a determination if the optical sensor is above or below the horizontal reference plane. Moreover, the time delay $t_0$ between detections of the fan-shaped beams, if short, can be determined accurately.

(4) Other Embodiments (4.1) Variations of the Fan-Shaped Beams

Although in all the aforementioned embodiments, the rotary laser apparatus that emits two fan-shaped beams is used, the construction machine control system may be completed with an alternative rotary laser apparatus that emits three or more fan-shaped laser beams simultaneously. In such a situation, two of the fan-shaped beams are appropriately selected to take a measurement in completely the same manner as in the aforementioned embodiments.

FIGS. 42A to 42J depict exemplary emission patterns of the fan-shaped beams. FIGS. 42A to 42J show cross sections of the fan-shaped beams viewed from the optical sensor where dot-dash line denotes the horizontal reference plane. In terms of the aforementioned embodiments, FIGS. 42C to 42J depicts various emission patterns of the three or more fan-shaped beams. Intersections of the fan-shaped beams with the horizontal reference plane are preferably spaced equidistant from one another. As for the emission patterns in FIG. 42A to FIG. 42C, the fan-shaped beams are not overlapped when the optical sensor is in the horizontal plane, and hence, the time delay among detections can be accurately determined without modulating the fan-shaped beams into different polarizations from one another.

Also, when emitted in the patterns as in FIGS. 42C to 42G and FIGS. 42I and 42J, three of the fan-shaped beams are sequentially detected one after another with time delays that are equivalent to each other if counted in the horizontal plane, and this is why finding the horizontal reference plane is facilitated. Also, as stated above, two of the fan-shaped laser beams may be appropriately selected among all to take a measurement in completely the same manner as in the aforementioned embodiments; that is, since a rate of the two time delays can be correlated with only one combination of an angular position of the optical sensor relative to the horizontal plane, finding the rate of one of the time delays to the other can directly lead to the angle of the optical sensor relative to the horizontal plane. When only two fan-shaped laser beams are considered, the rotary cycle T is required to obtain the angles, but not if three or more fan-shaped beams are used. This proves that the aforementioned embodiments can attain an accurate measurement without being affected by a rotation error of the rotary laser apparatus.

Figure 42A:
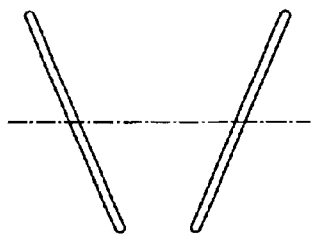
FIGS. 42A to 42J illustrate exemplary emission patterns of fan-shaped laser beams.
Figure 42B:
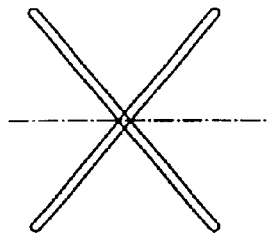
Figure 42C:
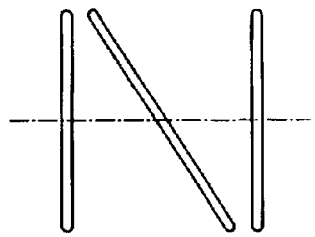
Figure 42D:
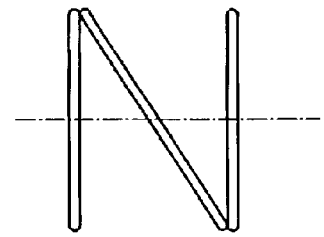
Figure 42E:
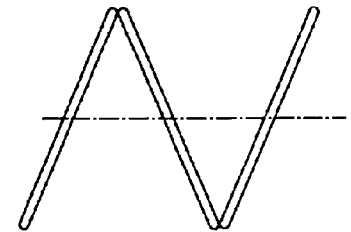
Figure 42F:
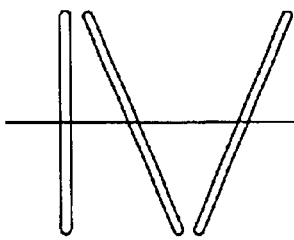
Figure 42G:
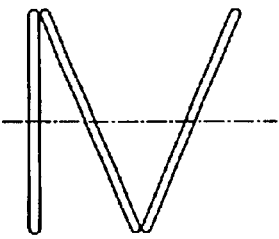
Figure 42H:
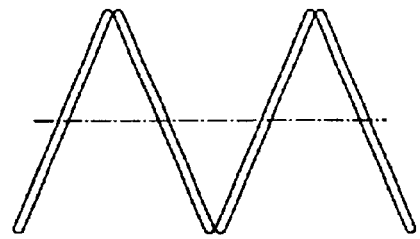
Figure 42I:
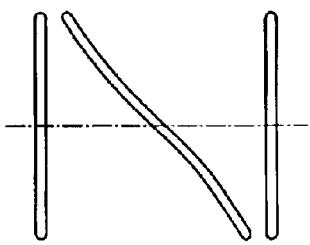
Figure 42J:
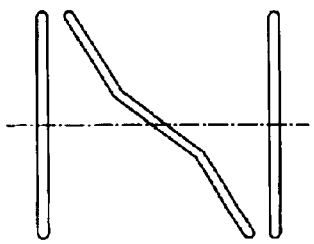

Patterned as in FIG. 42H, a sequential sensing of four of the fan-shaped beams produces three delays of time from one detection to another, and averaging them results in enhancing measurement accuracy. Patterning the beams as in FIGS. 42I and 42J, sensitivity of the optical sensor is varied from detections of light in the vicinity of the horizontal plane to detection in other areas. For instance, although a minor deviation of the optical sensor from the horizontal plane causes a large variation in the time delays between detections in the vicinity of the horizontal plane, a vertical displacement of the optical sensor does not influence the delays so much at levels far apart from the horizontal plane. In this way, the horizontal reference plane can be accurately detected from the time delays between detections at the optical sensor. In this specification, laser beams, like laser beams in the middle in FIGS. 42I and 42J, spreading into a curved or creased plane are referred to as fan-shaped beams. As for curved or creased fan-shaped beams, an inclination angle of the fan-shaped laser beam is an inclination of tangent passing an arbitrary point on the curved or creased plane.

A computation of finding an elevation from the horizontal reference plane based upon the received fan-shaped beams is carried out by repeating the aforementioned computation procedure in terms of arbitrary two of the fan-shaped beams for the emission patterns in FIGS. 42C to 42H. As to the emission patterns in FIGS. 42I and 42J, the computation procedure is appropriately changed to obtain the elevation from the horizontal reference plane.

Figure 43:
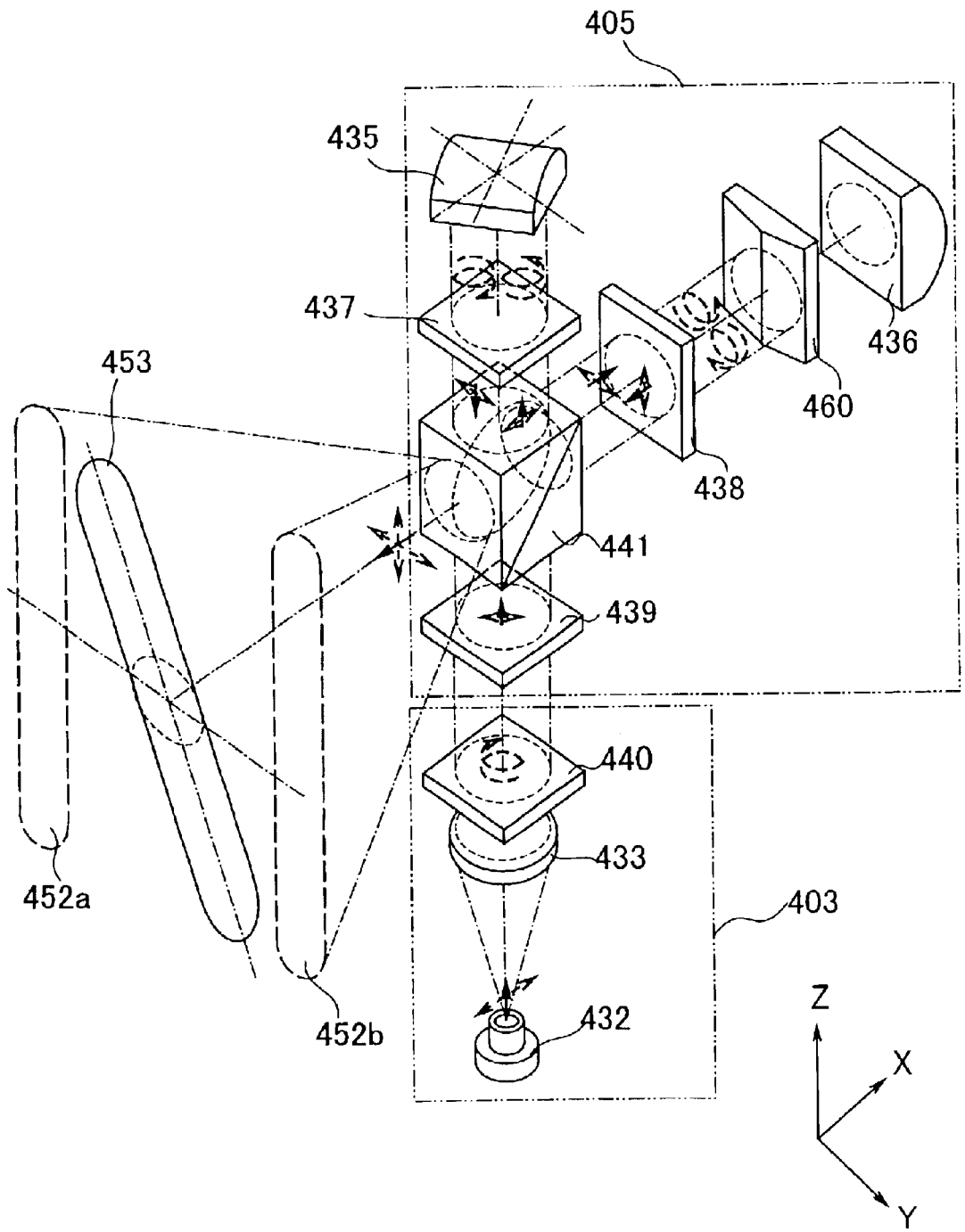
FIG. 43 is an exploded perspective view showing a laser light projector and a rotary unit in combination that rotationally emit three fan-shaped laser beams.

The emission patterns are all implemented, as shown in FIG. 6, by providing an appropriate diffraction grating across an optical path in the optical system emitting the fan-shaped beams. Without the diffraction grating, the aforementioned emission patterns can also be created. FIG. 43 shows an embodiment of a laser projector 403 and a rotary unit 405 of the rotary laser apparatus that produces the fan-shaped beams patterned as in FIG. 42C. In FIG. 43, all the components corresponding to their respective counterparts of the first embodiment are denoted by reference numerals having a prefix 4 to lower two digits instead of 1. Laser beam, after emitted from the laser illuminator, passes a collimator lens 433 and one-quarter (¼) wave plates 440 and 439 and then falls upon a polarized beam splitter 441. The laser beam incident upon the polarized beam splitter 441, which, in part, is transmitted through the same, is transmitted through a one-quarter wave plate 437 and reflected by a cylinder mirror 435, and thereafter, transmitted through the one-quarter wave plate 437 again to fall on the polarized beam splitter 441. The incident laser light is reflected by the beam splitter 441, and thus, a fan-shaped beam 453 is projected, meeting the horizontal reference plane at an inclination of β.

On the other hand, the laser light, which exits the one-quarter wave plate 439 and falls on the polarized beam splitter 441, is in part reflected by the beam splitter 441 and then falls upon a one-quarter wave plate 438. The laser light incident upon the one-quarter wave plate 438, after passing the same, is transmitted through a deflecting prism 460 and then reflected by a cylinder mirror 436. The cylinder mirror 436 is oriented so that it projects fan-shaped beam diverging vertically. The laser light reflected by the cylinder mirror 436 reenters the deflecting prism and is shaped into two fan-shaped beams that diverge vertically. The fan-shaped beams are transmitted through the one-quarter wave plate 438 and the beam splitter 441, and thus, fan-shaped beams 452a and 452ba are projected.

Figure 44:
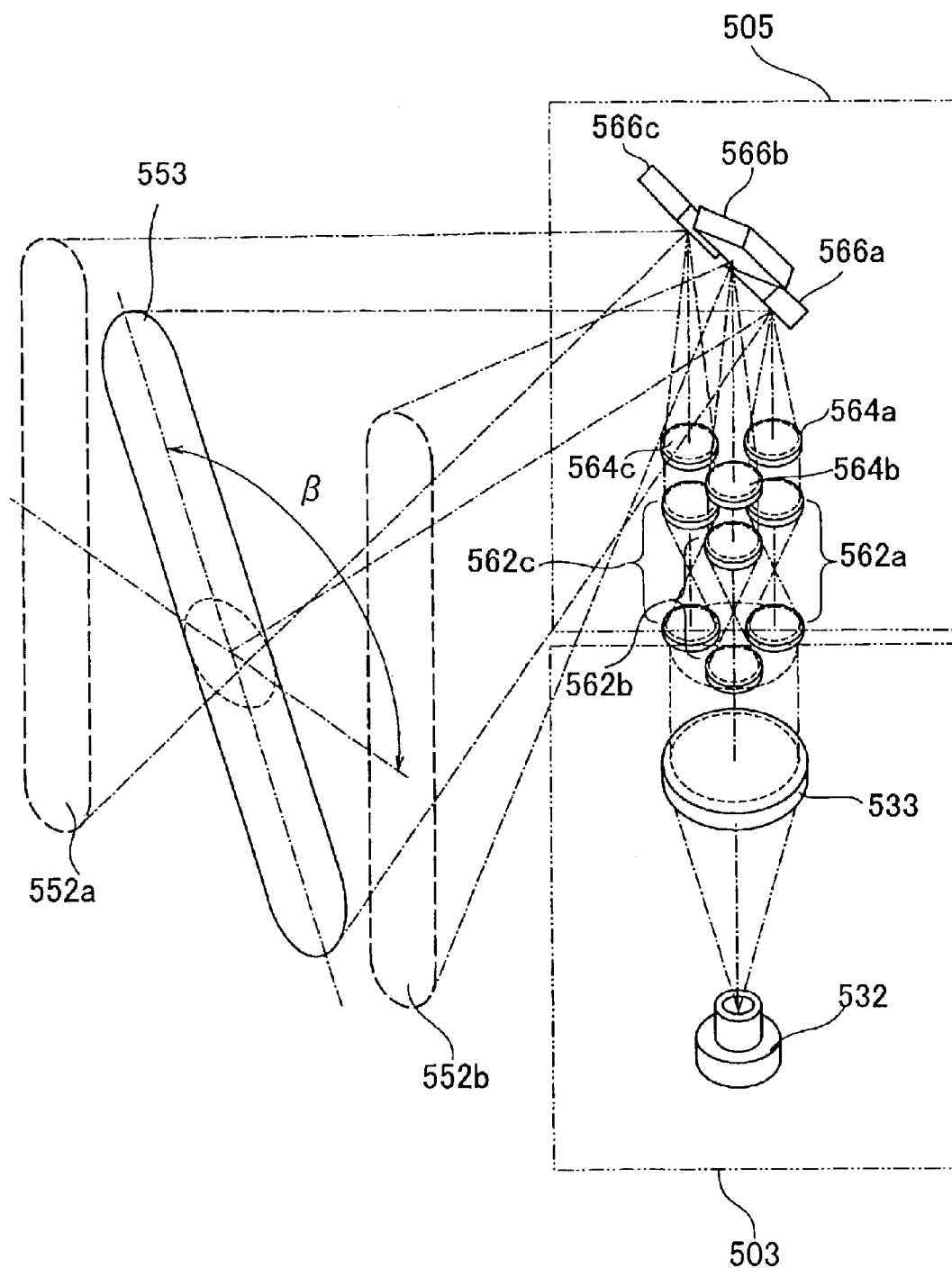
FIG. 44 is an exploded perspective view of another embodiments of the laser light projector and the rotary unit that rotationally emit three fan-shaped laser beams.

With reference to FIG. 44, discussed now will be varied or modified embodiments of the laser illuminator and the rotary unit of the rotary laser apparatus that emits the diverging or fan-shaped beams patterned as in FIG. 42C. A laser projector 503 of this embodiment includes a laser illuminator 532 and a collimator lens 533. A rotary unit 505 of this embodiment has three equi-magnification beam expanders 562a, 562b and 562c, three cylindrical lenses 564a, 564b and 564c, and three mirrors 566a, 566b and 566c.

Laser light emitted from the laser illuminator 532 is collimated by the collimator lens 533. The laser light transmitted through the collimator lens 533 falls on the three equi-magnification beam expander 562a, 562b and 562c of the rotary unit 505. The laser beam incident upon the equi-magnification beam expander 562 is declined at a predetermined ratio. The laser light transmitted through the equi-magnification beam expander 562a, 562b and 562c is split and spread into fan-shaped beams 553, 552b and 552a by the cylindrical lens 564a, 564b and 564c, respectively. The fan-shaped laser beams exiting the cylindrical lens 564a, 564b and 564c are reflected by the mirrors 566a, 566b and 566c, respectively, and projected in directions orthogonal to the rotation axis of the rotary laser apparatus, respectively.

In this situation, since the laser light is once reflected by the mirror 566 after transmitted through the equi-magnification beam expander 562, a deflection angle of the laser beam is simply dependent upon a deflection angle in transmission through the rotary unit 505. Thus, emission directions of the fan-shaped beams 553, 552b and 552a are not influenced by maladjustment between the laser illuminator 503 and the rotary unit 505. In some application, for the purpose of shielding from light other than laser beam emitted from the laser projector 503 and entering the equi-magnification beam expander 562, a shield mask (not shown) may be provided beneath the equi-magnification beam expander 562. Alternatively, for the purpose of shielding from light other than laser beam emitted from the laser illuminator 532 and entering the collimator lens 533, a shield mask (not shown) may be provided between the laser illuminator 532 and the collimator lens 533.

Figure 45:
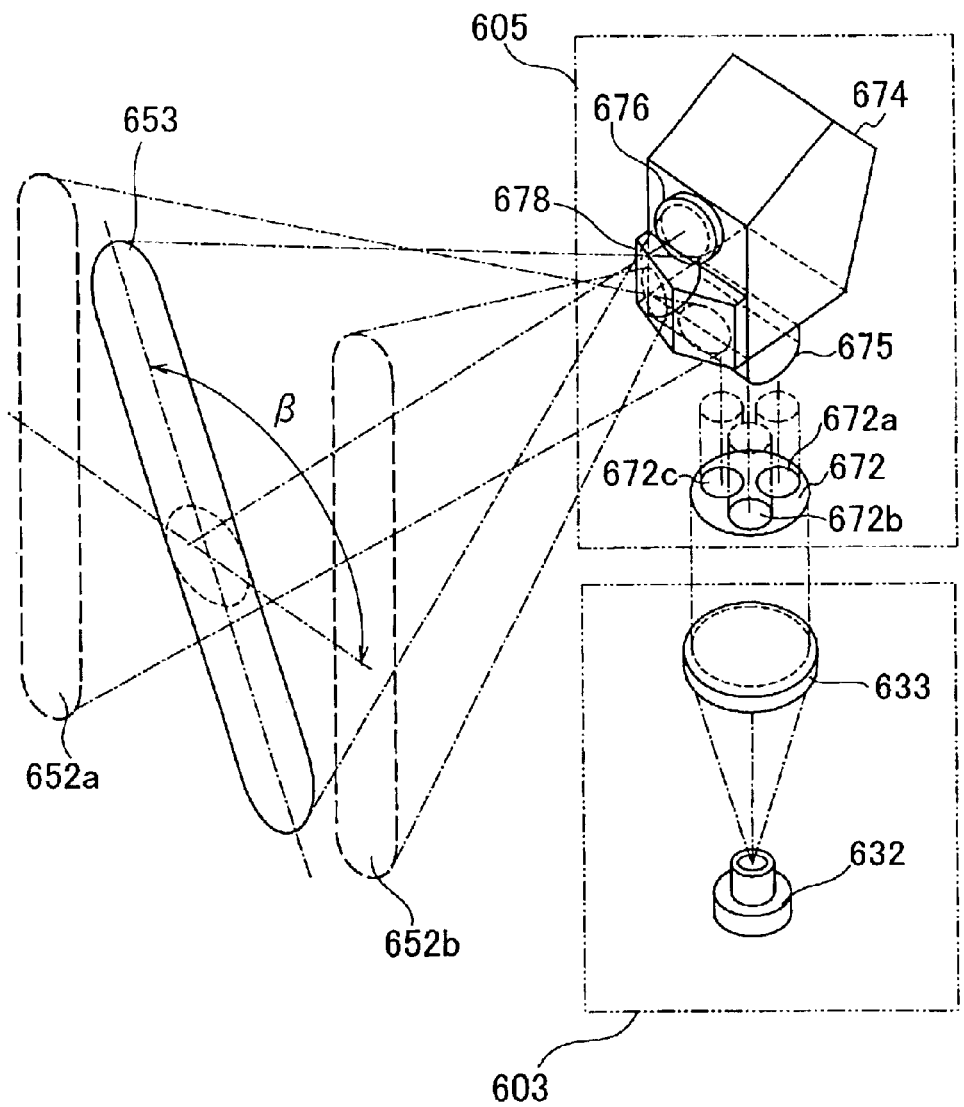
FIG. 45 is an exploded perspective view of still another embodiment of the laser light projector and the rotary unit that rotationally emit three fan-shaped laser beams.
Figure 46:
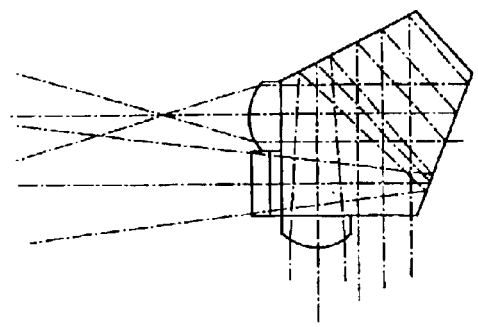
FIG. 46 is a side view showing an optical path in a pentaprism.
Figure 47:
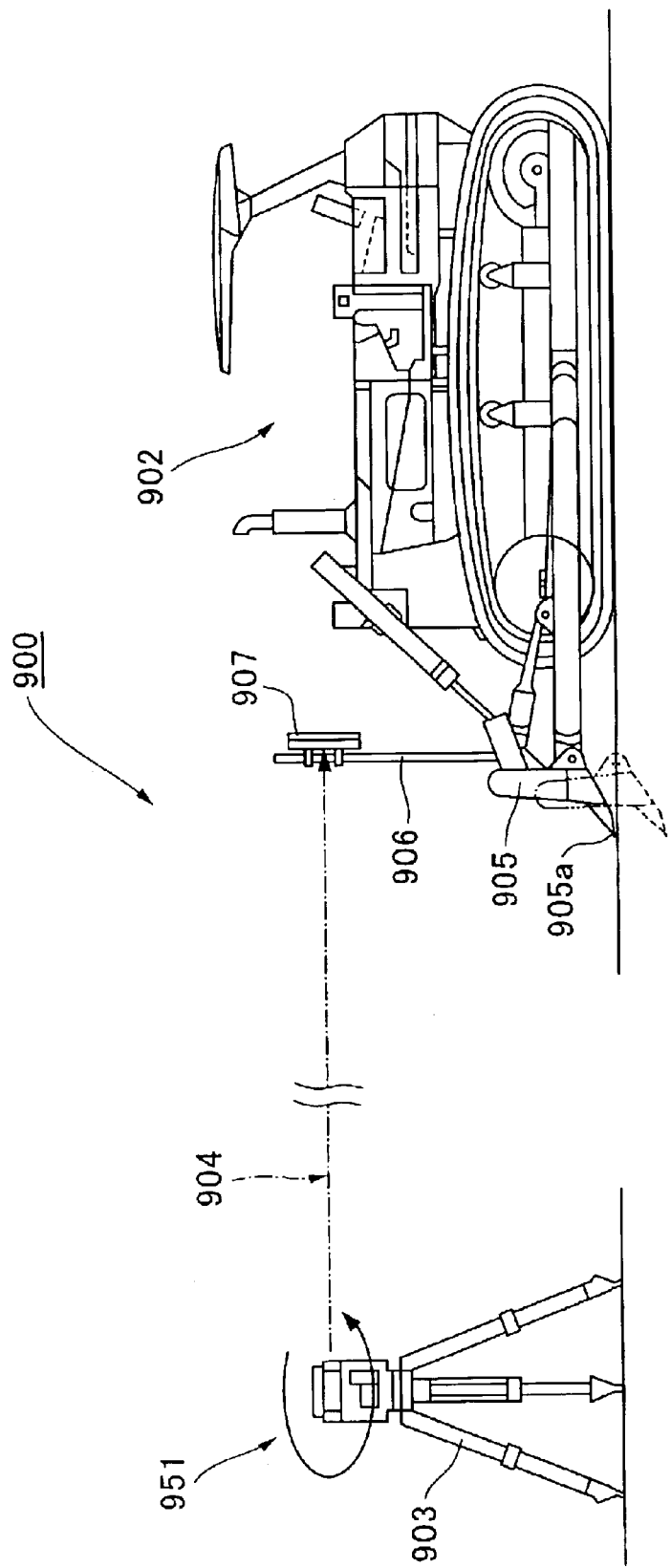
FIG. 47 is a schematic diagram showing a prior art construction machine control system.
Figure 48:
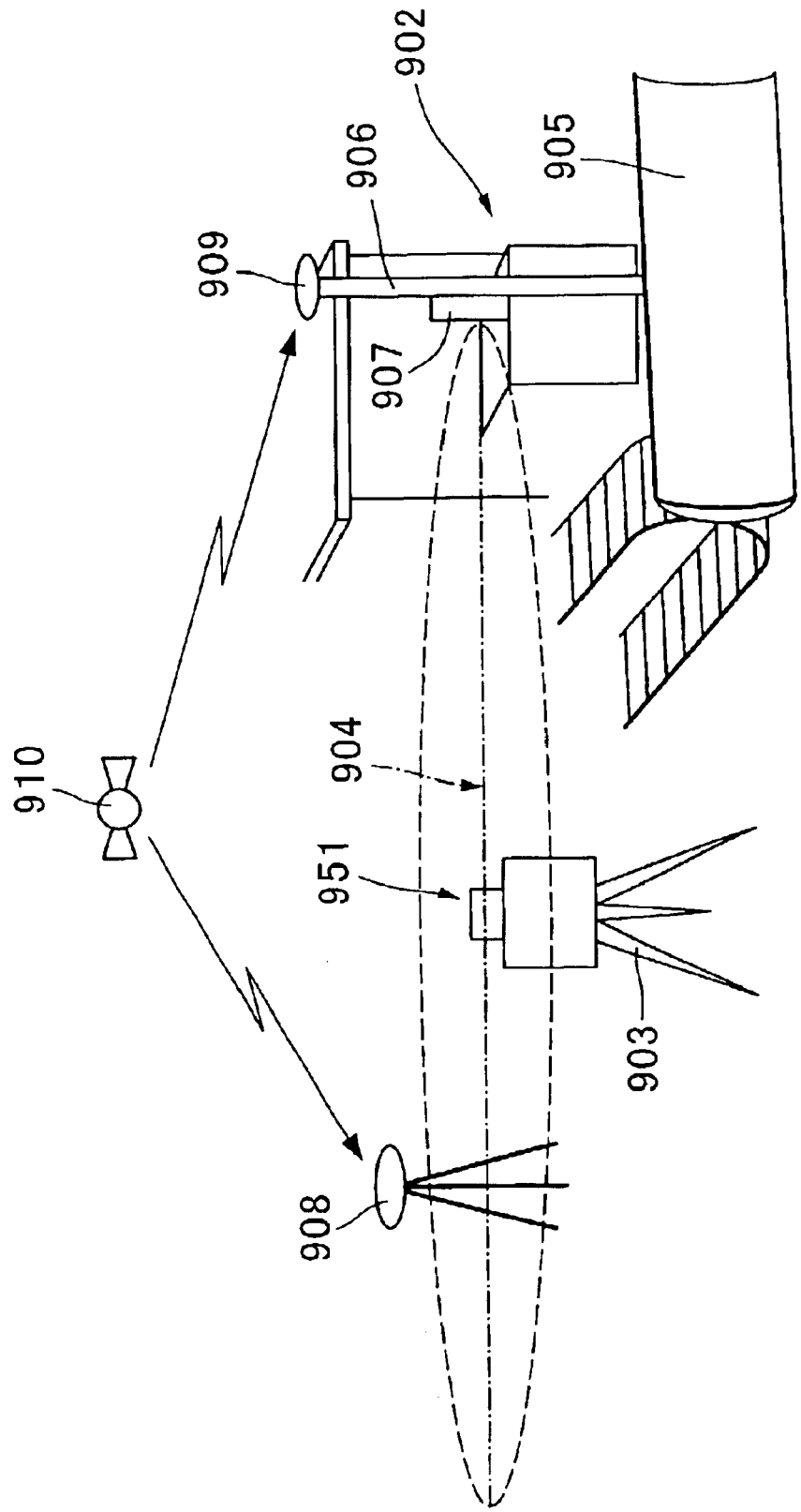
FIG. 48 is a schematic diagram showing the prior art construction machine control system along with a rotary laser apparatus and a GPS.

With reference to FIGS. 45 and 46, described below will be additional varied or modified embodiments of the laser illuminator and the rotary unit of the rotary laser apparatus that emits the fan-shaped laser beams patterned as in FIG. 42C. A laser projector 603 of this embodiment includes a laser illuminator 632 and a collimator lens 633. A rotary unit 605 of this embodiment has a shield mask 672 having three apertures 672a, 672b and 672c, a pentaprism 674 deflecting laser light that has passed the mask 672, cylindrical lenses 675 and 676 attached to the pentaprism 674 to spread beam into diverging fan-like shape, and a wedge prism 678 deflecting and collimating laser beam from the pentaprism 674.

Laser light emitted from the laser illuminator 632 is collimated by the collimator lens 633. The laser light transmitted through the collimator lens 633 falls on the shield mask 672 in the rotary unit 605. The laser beam, after passing the aperture 672a in the mask 672, falls on the pentaprism 674 and is deflected therein. In FIG. 46, the laser beam from the aperture 672a directly falls on the bottom of the pentaprism 674, which deflects the beam by 90° to let it exit from its vertical face. The laser light falls on the cylindrical lens 676 attached to the vertical face of the pentaprism 674, and it is spread into fan-shaped beam 653 which meets the horizontal plane at a predetermined inclination angle. On the other hand, the laser light that passes the aperture 672b and 672c falls on the cylindrical lens 675 attached to the bottom of the pentaprism 674, and the resultant separate laser beams are spread into diverging fan-like shape and then deflected by 90° in the pentaprism 674. The laser beams are directed to the wedge prism 678 that is attached to a lower portion of the cylindrical lens 676 mounted on a vertical face of the pentaprism 674, and then horizontally deflected, and thus, fan-shaped beams 652a and 652b are projected.

In this situation, the laser beams are respectively reflected twice in the pentaprism 674, and angles at which the laser beams are deflected simply depend upon a deflection angle in transmission through the pentaprism 674. Thus, directions of the emergent fan-shaped beams 653, 652b and 652a are not influenced by maladjustment between the laser projector 603 and the rotary unit 605. In some application, for the purpose of blocking light other than the laser beams emitted from the laser illuminator 632 and entering the collimator lens 633, a shield mask (not shown) may be provided between the laser illuminator 632 and the collimator lens 633.

(4.2) Other Variations and Modifications of the Construction Machine Control System Various embodiments of the construction machine control system have been described, emphasizing specific examples such as the construction machine control systems including the rotary laser apparatuses that respectively emit two fan-shaped laser beams intersecting each other in and outside the horizontal reference plane, the rotary laser apparatus that emits three or more fan-shaped laser beams, the rotary laser apparatus that emits two fan-shaped laser beams polarized differently, the rotary laser apparatus that emits laser beams modulated to have different frequencies or wavelengths, respectively, the optical sensor having a single light receiving section, the optical sensor that has more than one light receiving sections located vertically or horizontally, the optical sensor capable of distinguishing differently polarized fan-shaped beams, and an optical sensor capable of distinguishing fan-shaped beams modulated to have different frequencies or wavelengths, respectively. Any person having ordinary skills in the art would envision appropriately combined revisions of the aforementioned embodiments of the construction machine control system without departing true scope of the invention as defined in the appended claims.

In accordance with the present invention, a single rotary laser apparatus permits control over more than one construction machines so that the construction machines can level the ground at varied levels simultaneously. Additionally, it also permits workers to manipulate the construction machines and grade the inclined ground efficiently regardless of their expertise level of conducting such a task, and it further permits control over more than one construction machines to grade or shape slopes of different inclinations simultaneously.

What is claimed is:

1. A system of controlling construction machines, comprising
    a rotary laser apparatus that emits two or more fan-shaped laser beams while rotating the laser beams about a given axis, the two or more fan-shaped laser beams diverging in a plane inclined relative to a horizontal plane,
    an optical sensor mounted on a construction machine for receiving the fan-shaped laser beams and computing an elevation on the basis of a time delay between detections of the fan-shaped laser beams,
    a GPS receiver mounted on the construction machine for determining a position of the construction machine, and
    an arithmetic operation device provided in the construction machine,
    the arithmetic operation device producing a control signal for controlling the construction machine on the basis of the positional data determined by the GPS receiver, the elevation data computed by the optical sensor, and topographic data.

2. A system according to claim 1, wherein the rotary laser apparatus is settled in a known position, and the arithmetic operation device computes a distance between the rotary laser apparatus and the construction machine on the basis of the data of the known position and the positional data of the construction machine determined by the GPS receiver.

3. A system according to claims 1, further comprising a GPS base apparatus determining a position of the rotary laser apparatus, the arithmetic operation device computing a distance between the rotary laser apparatus and the construction machine on the basis of the positional data of the rotary laser apparatus determined by the GPS base apparatus and the positional data of the construction machine determined by the GPS receiver.

4. A system according to claim 1, wherein the rotary laser apparatus emits two or more fan-shaped laser beams that are different in polarization from each other.

5. A system according to claim 1, wherein the rotary laser apparatus emits two or more fan-shaped laser beams that are modulated at different frequencies from one another.

6. A system according to claims 1, wherein the rotary laser apparatus emits two or more fan-shaped laser beams that are different in wavelength from one another.

7. A system according to claim 1, wherein the rotary laser apparatus emits fan-shaped laser beams each of which has an intensity varied from one part to another.

8. A system according to claim 1, wherein the rotary laser apparatus emits three fan-shaped laser beams that intersect with the horizontal plane equidistant from one another.

9. A system according to claim 8, wherein the rotary laser apparatus emits three or more fan-shaped laser beams that would not intersect one another within a range where they are optically received.

* * * * *